United States Patent
Christie et al.

(10) Patent No.: US 12,133,480 B2
(45) Date of Patent: *Nov. 5, 2024

(54) VARIABLE TOOTH COULTER BLADE WITH SIZED INSERTS

(71) Applicant: Prescription Tillage Technology, LLC, Red Oak, IA (US)

(72) Inventors: Richard L. Christie, Clarinda, IA (US); Ryan J. K. Christie, Clarinda, IA (US)

(73) Assignee: PRESCRIPTION TILLAGE TECHNOLOGIES, LLC, Lamoni, IA (US)

( * ) Notice: Subject to any disclaimer, the term of this patent is extended or adjusted under 35 U.S.C. 154(b) by 1308 days.

This patent is subject to a terminal disclaimer.

(21) Appl. No.: 16/273,996

(22) Filed: Feb. 12, 2019

(65) Prior Publication Data

US 2019/0261549 A1    Aug. 29, 2019

Related U.S. Application Data

(63) Continuation-in-part of application No. 16/115,061, filed on Aug. 28, 2018, now Pat. No. 10,820,462, which is a continuation-in-part of application No. 14/998,442, filed on Jan. 4, 2016, now Pat. No. 10,506,754, which is a continuation-in-part of application No. 14/961,849, filed on Dec. 7, 2015, (Continued)

(51) Int. Cl.
*A01B 23/06* (2006.01)
*A01B 15/18* (2006.01)
*A01B 33/10* (2006.01)
*A01C 5/06* (2006.01)

(52) U.S. Cl.
CPC .............. *A01B 23/06* (2013.01); *A01B 15/18* (2013.01); *A01B 33/103* (2013.01); *A01C 5/064* (2013.01)

(58) Field of Classification Search
CPC ......... A01B 7/00; A01B 21/08; A01B 21/083; A01B 21/086; A01B 15/16; A01B 15/18; A01B 23/06; A01B 33/10; A01B 33/103; A01B 35/28; A01C 5/064; A01C 7/006
See application file for complete search history.

(56) References Cited

U.S. PATENT DOCUMENTS

| | | | |
|---|---|---|---|
| 615,005 A | 11/1898 | Walquist | 83/676 |
| 814,716 A | 3/1906 | MacDonell | 111/33 |

(Continued)

FOREIGN PATENT DOCUMENTS

| | | |
|---|---|---|
| DE | 4404654 | 12/1995 |
| FR | 2570317 | 7/1994 |
| SU | 736897 | 5/1980 |

*Primary Examiner* — Jessica H Lutz
(74) *Attorney, Agent, or Firm* — Ernest D. Buff & Associates, LLC; Ernest D. Buff

(57) ABSTRACT

A system and method cuts and increases surface area of surface stubble material while contemporaneously mulching, tilling and aerating the soil. A discoidal coulter blade is configured with sharpened areas at the circumference and one or more inside bevel for cutting the surface stubble as well as reducing the downward pressure required for the blade to enter the type and depth of soil desired. The bevel aids in coulter blade lifespan, ensuring a self-sharpened blade, and allows mating with a second coulter blade.

36 Claims, 87 Drawing Sheets

Related U.S. Application Data now Pat. No. 10,159,171, which is a continuation of application No. 14/590,855, filed on Jan. 6, 2015, now Pat. No. 9,204,588, which is a continuation of application No. 14/162,259, filed on Jan. 23, 2014, now abandoned.

(60) Provisional application No. 61/756,841, filed on Jan. 25, 2013.

(56) References Cited

U.S. PATENT DOCUMENTS

| | | | | |
|---|---|---|---|---|
| 994,707 | A | 6/1911 | Meissner | 111/84 |
| 1,186,880 | A | 6/1916 | Canda | 172/555 |
| 1,873,128 | A * | 8/1932 | Johnson | A01C 5/062 |
| | | | | 111/163 |
| 2,084,055 | A | 6/1937 | Cascadden | 172/144 |
| 2,357,528 | A | 9/1944 | Lutes | 172/144 |
| 2,596,574 | A | 5/1952 | Lutes | 172/555 |
| 3,559,748 | A | 2/1971 | Shelton | 172/604 |
| 3,995,699 | A * | 12/1976 | Blucher | A01C 5/064 |
| | | | | 172/120 |
| 4,059,161 | A * | 11/1977 | Smith | A01C 5/064 |
| | | | | 172/120 |
| 4,891,885 | A * | 1/1990 | Fischer | B24B 3/58 |
| | | | | 83/676 |
| 5,197,453 | A | 3/1993 | Messina | 125/15 |
| 5,285,768 | A | 2/1994 | Messina | 125/15 |
| 5,346,020 | A * | 9/1994 | Bassett | A01C 7/006 |
| | | | | 172/555 |
| 5,704,431 | A * | 1/1998 | Lefebvre | A01C 5/068 |
| | | | | 111/194 |
| 5,884,547 | A | 3/1999 | Carlsen | 83/835 |
| 6,425,445 | B1 * | 7/2002 | Tarver, III | A01C 5/062 |
| | | | | 172/166 |
| 6,427,573 | B1 | 8/2002 | Carlsen | 83/835 |
| 7,055,515 | B2 | 1/2006 | Bishop | 125/13.01 |
| 7,575,066 | B2 | 8/2009 | Bauer | 172/540 |
| 7,832,345 | B2 * | 11/2010 | Whalen | A01C 7/006 |
| | | | | 172/603 |
| 7,856,913 | B2 * | 12/2010 | Matzunsky | B26D 1/0006 |
| | | | | 83/342 |
| 8,186,450 | B2 | 5/2012 | Bauer | 172/540 |
| 8,627,898 | B2 | 1/2014 | Nance | 172/146 |
| 9,517,571 | B2 * | 12/2016 | Wilhelm | B26D 1/0006 |
| 10,506,754 | B2 * | 12/2019 | Christie | A01B 23/06 |
| 2006/0283609 | A1 * | 12/2006 | Hansen | A01B 35/28 |
| | | | | 172/604 |
| 2008/0173220 | A1 | 7/2008 | Wertz | 111/22 |
| 2008/0245440 | A1 | 10/2008 | Paumier | 144/235 |
| 2011/0147018 | A1 * | 6/2011 | Bruce | A01B 23/06 |
| | | | | 172/120 |
| 2011/0240319 | A1 | 10/2011 | Sanderson | 172/604 |
| 2014/0345893 | A1 | 11/2014 | Christie et al. | 172/599 |

* cited by examiner

1300
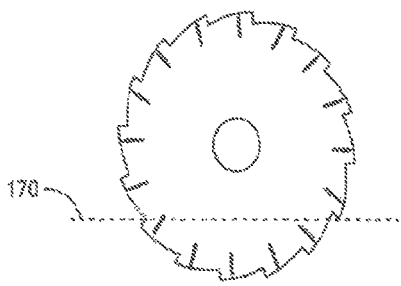
FIG.13A
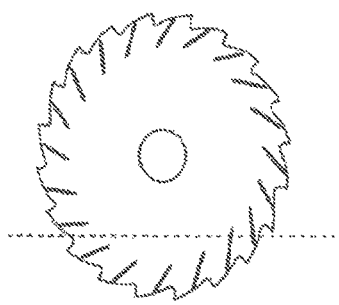
FIG.13B
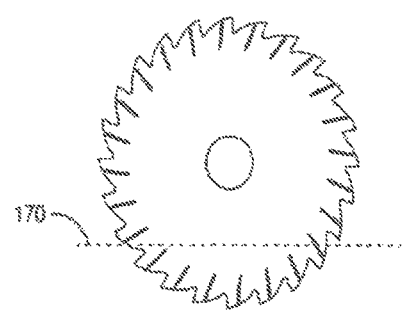
FIG.13C
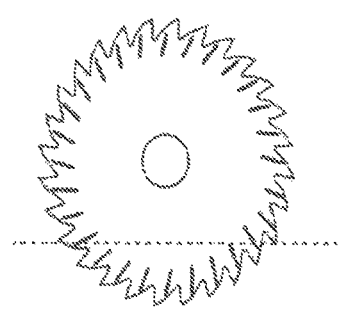
FIG.13D
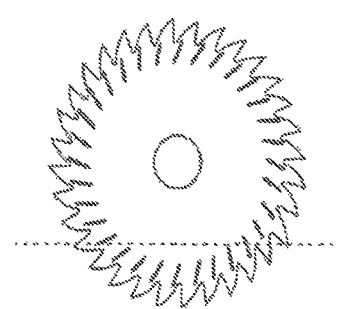
FIG.13E
FIG. 13

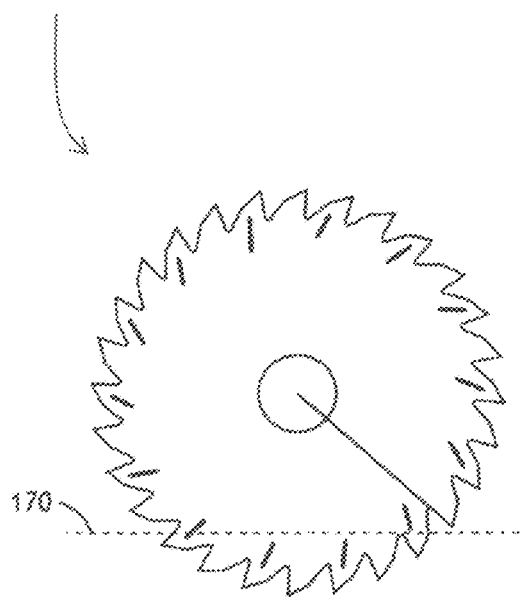
FIG.15A
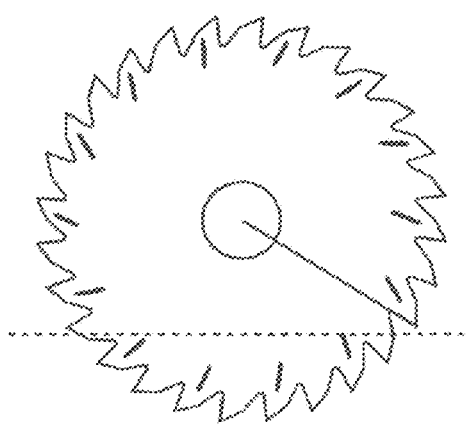
FIG.15B
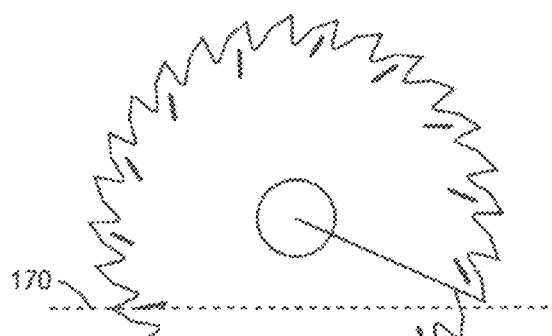
FIG.15C
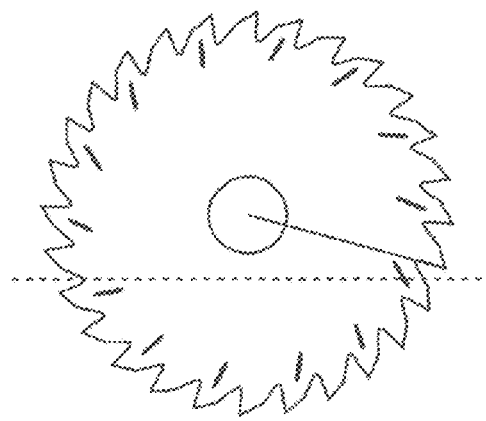
FIG.15D
FIG. 15

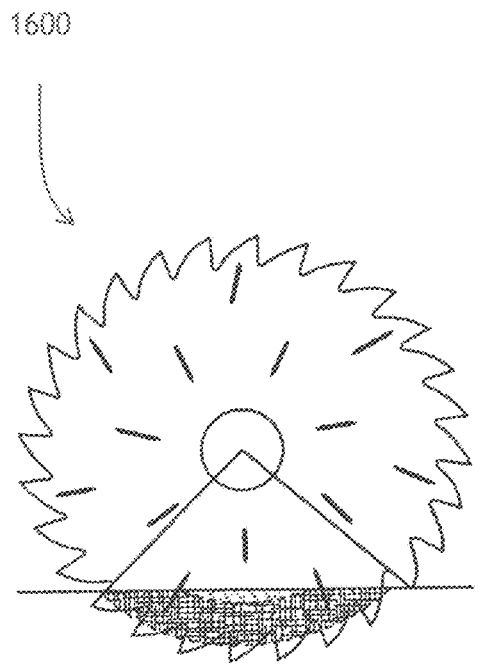
FIG.16A
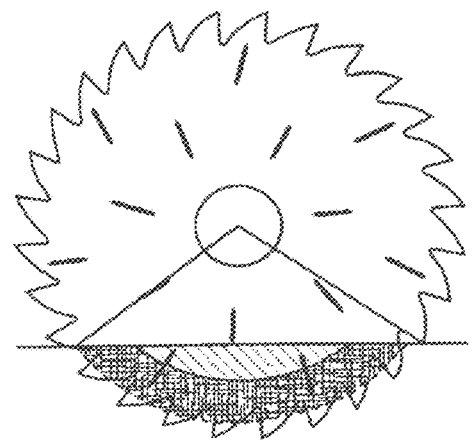
FIG.16B
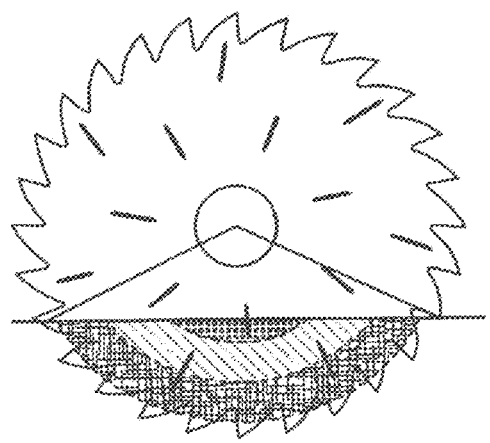
FIG.16C
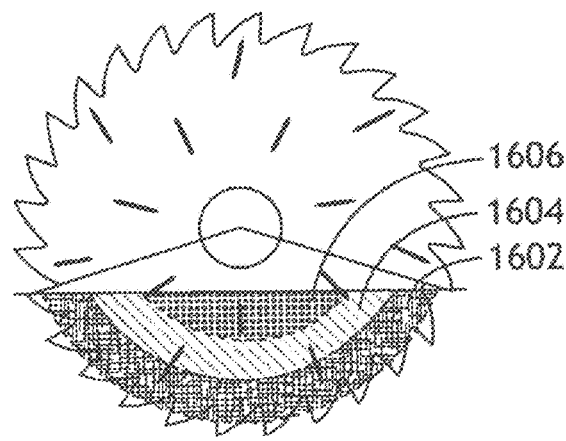
FIG.16D
FIG. 16

2800
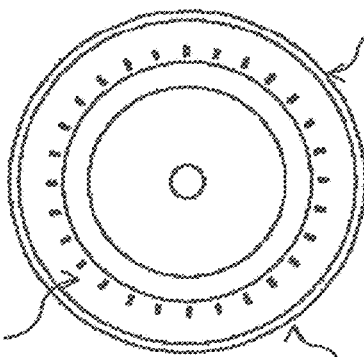
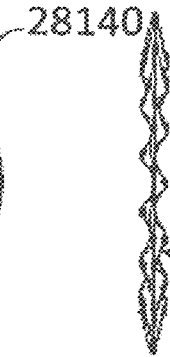
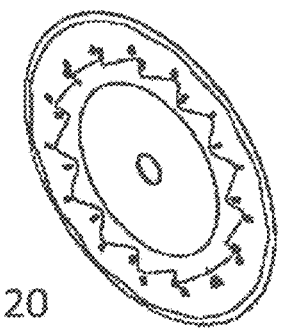
FIG. 28A    FIG. 28B    FIG. 28C
FIG. 28D    FIG. 28E    FIG. 28F
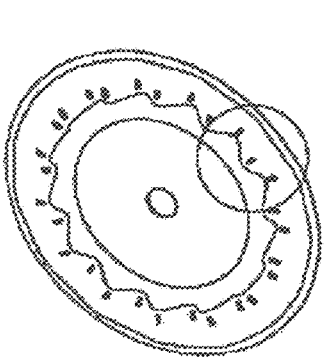
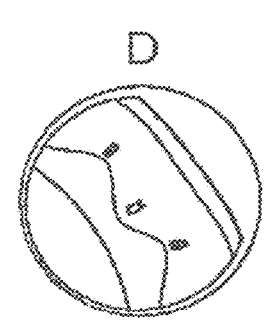
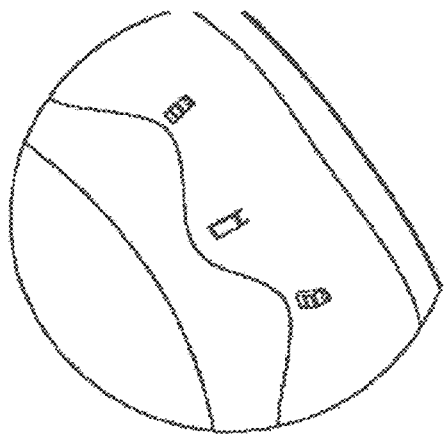
FIG. 28G    FIG. 28H    FIG. 28I

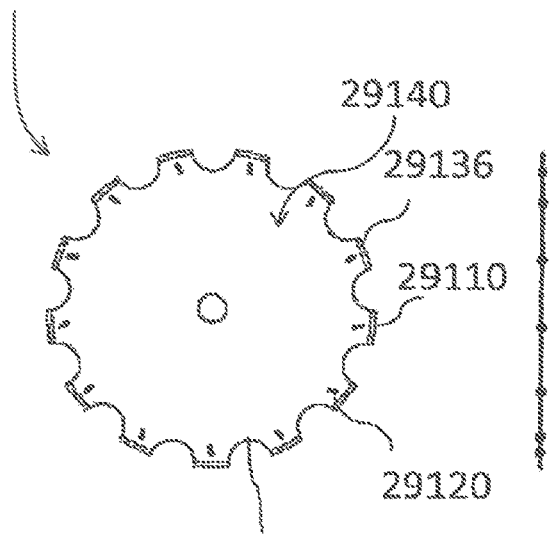
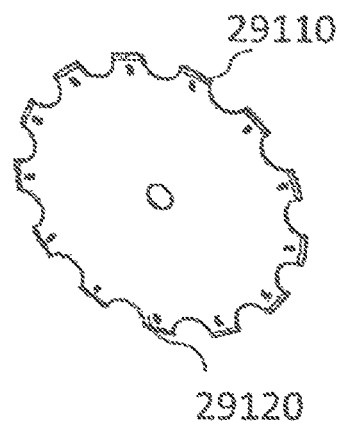
FIG. 29A     FIG. 29B     FIG. 29C
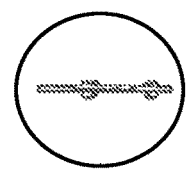
FIG. 29D     Front View 1     Front View 2
                FIG. 29E         FIG. 29F
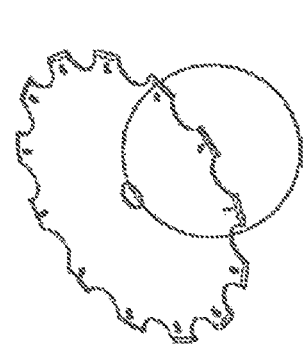
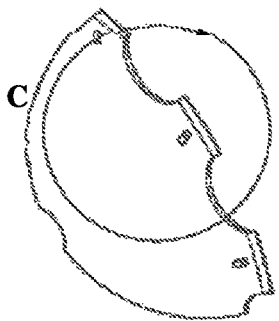
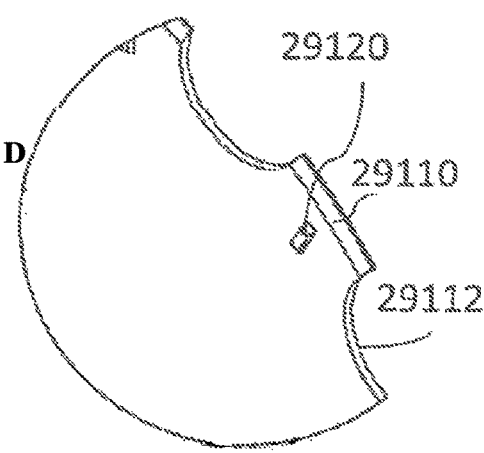
FIG. 29G     Side View 1     Side View 2
               FIG. 29H         FIG. 29I

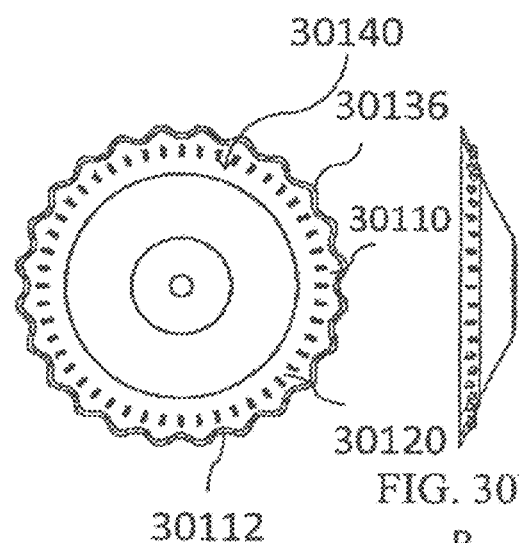
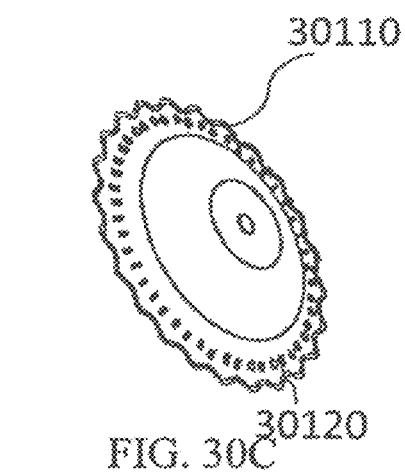
FIG. 30A  FIG. 30B  FIG. 30C
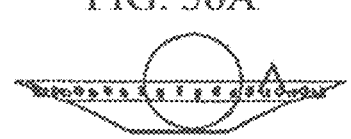
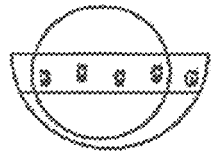
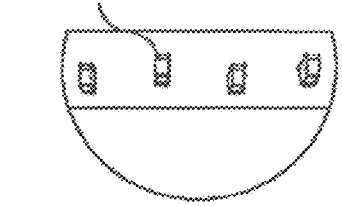
FIG. 30D  Front View 1
FIG. 30E  Front View 2
FIG. 30F
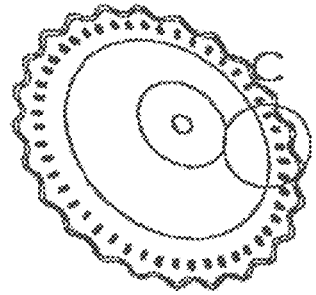
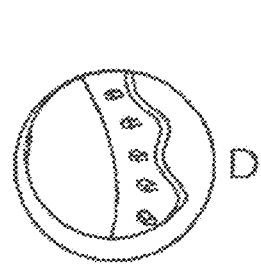
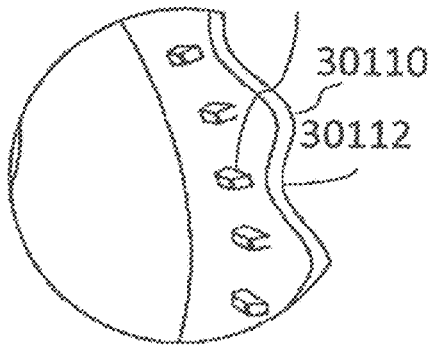
FIG. 30G  Side View 1
FIG. 30H  Side View 2
FIG. 30I

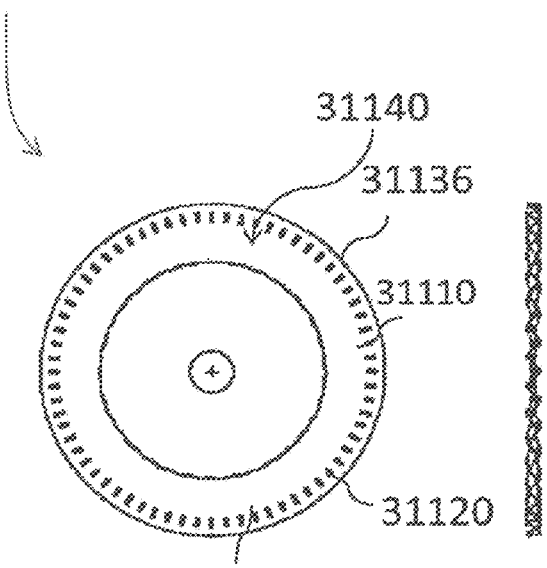
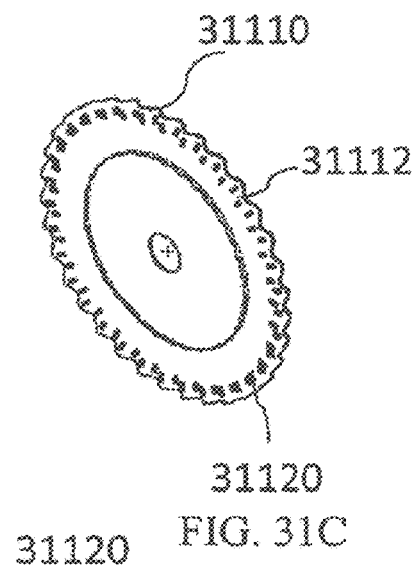
FIG. 31A  FIG. 31B  FIG. 31C
FIG. 31D  FIG. 31E  FIG. 31F
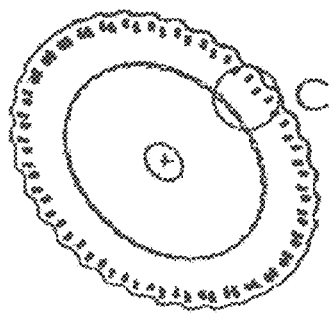
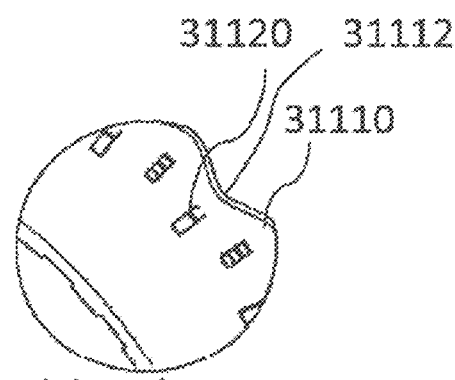
FIG. 31G  FIG. 31H  FIG. 31I

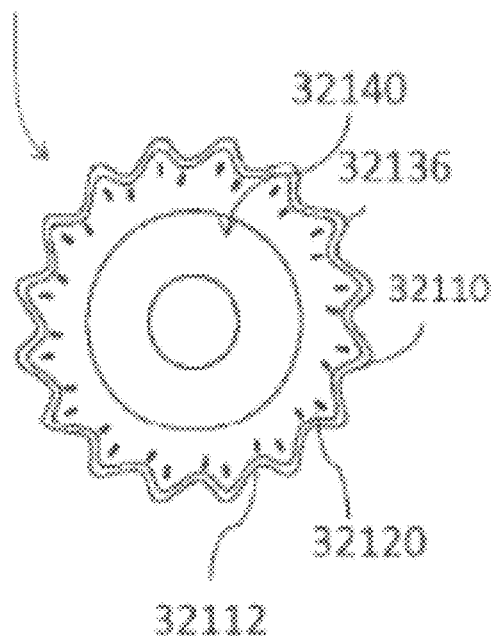
FIG. 32A
FIG. 32B
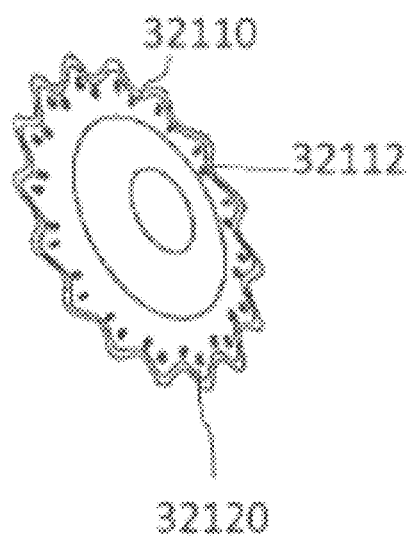
FIG. 32C
FIG. 32D
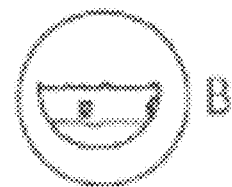
FIG. 32E
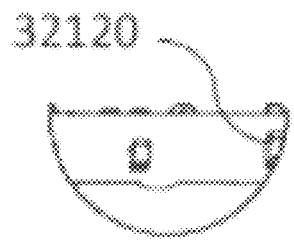
FIG. 32F FIG. 33B Side View1
FIG. 33C Side View 2

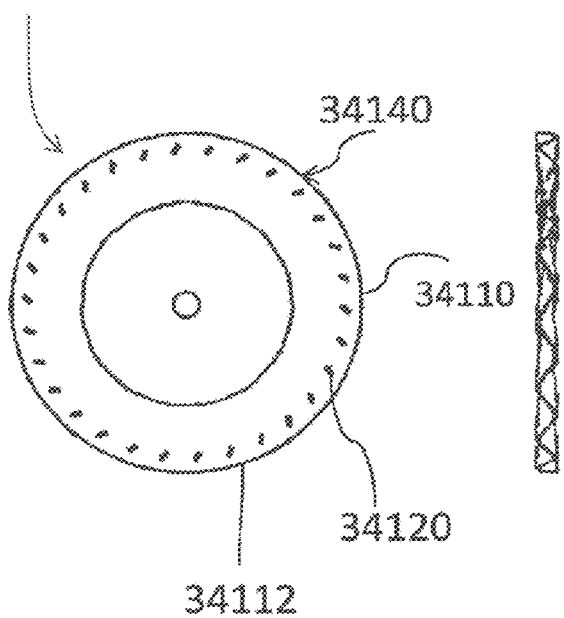
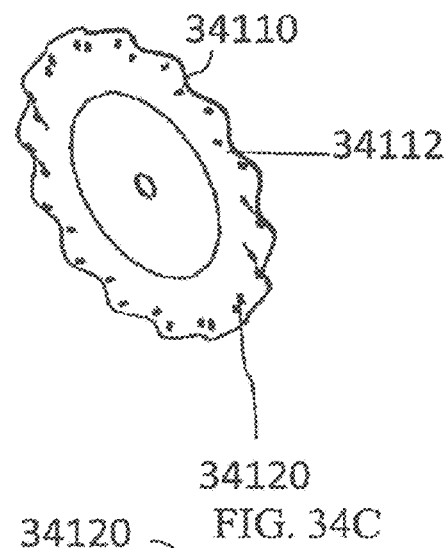
FIG. 34A
FIG. 34B
FIG. 34C
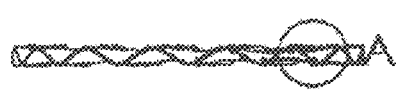
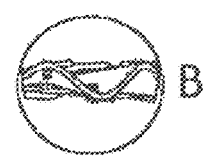
FIG. 34D
FIG. 34E
FIG. 34F
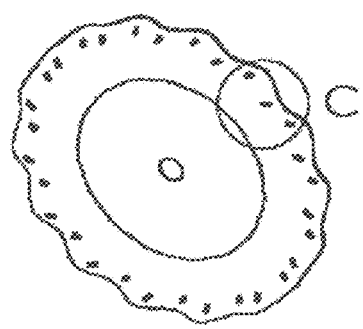
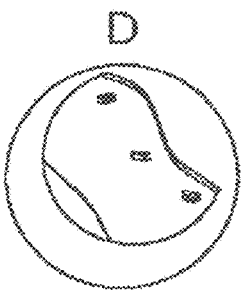
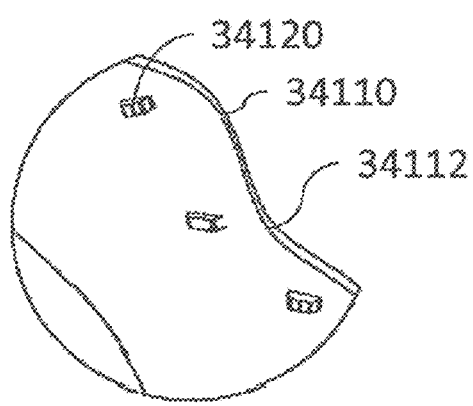
FIG. 34G
Side View 1
FIG. 34H
Side View 2
FIG. 34I

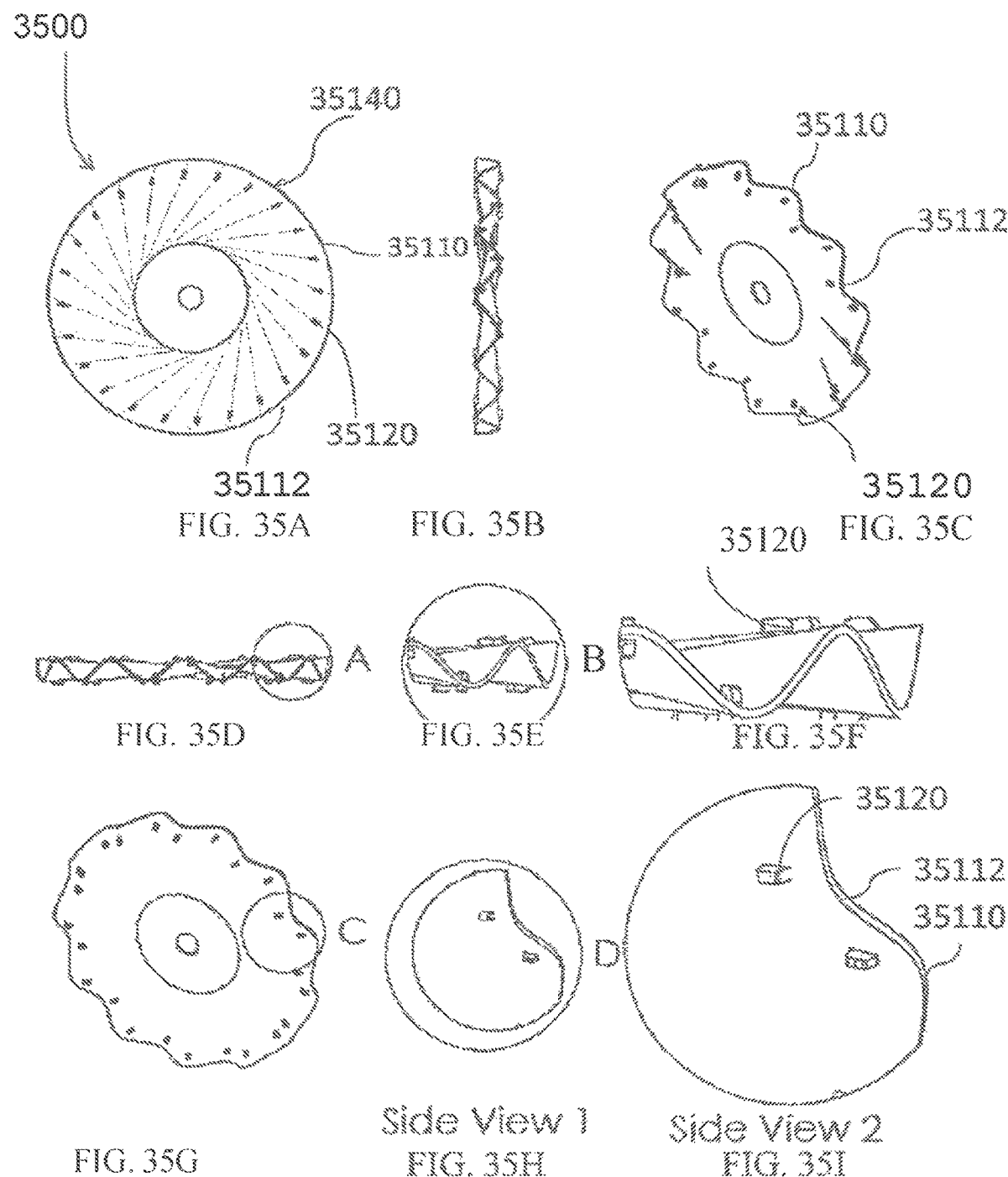

3600
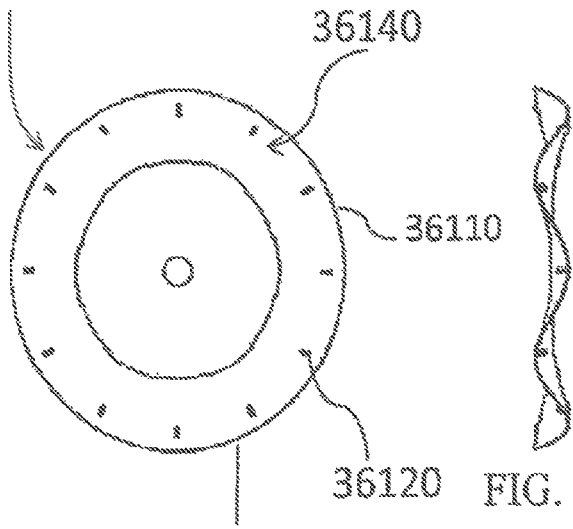
FIG. 36A
FIG. 36B
FIG. 36C
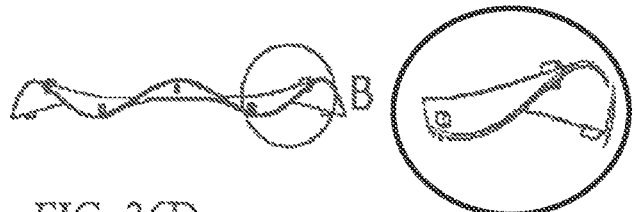
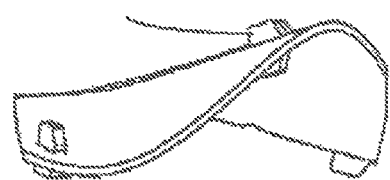
FIG. 36D
Front View 1
FIG. 36E
FIG. 36F
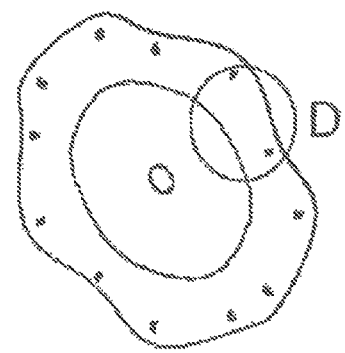
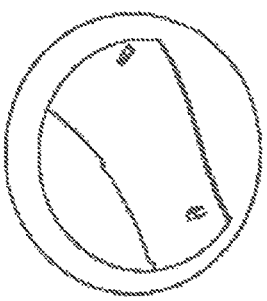
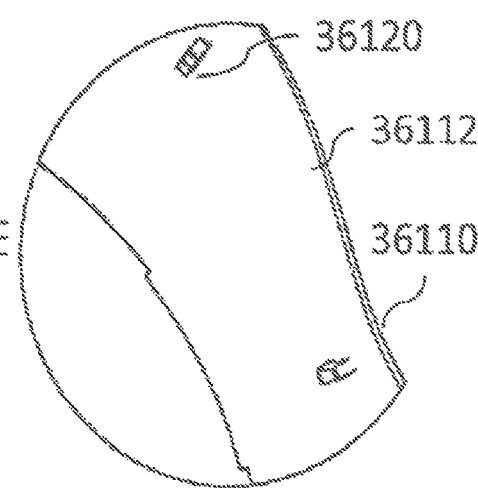
FIG. 36G
Side View 1
FIG. 36H
Side View 2
FIG. 36I

3700
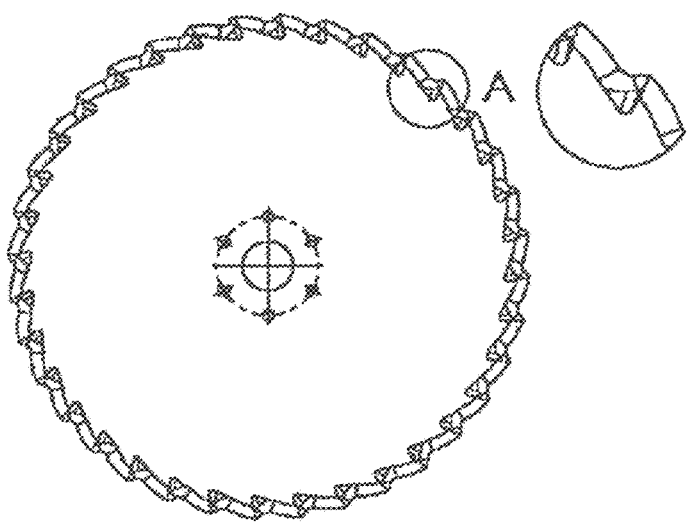
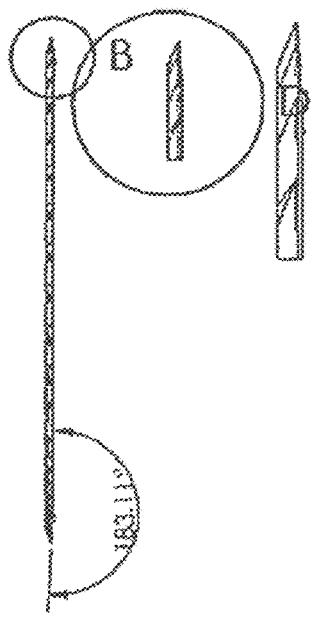
FIG. 37A
FIG. 37B
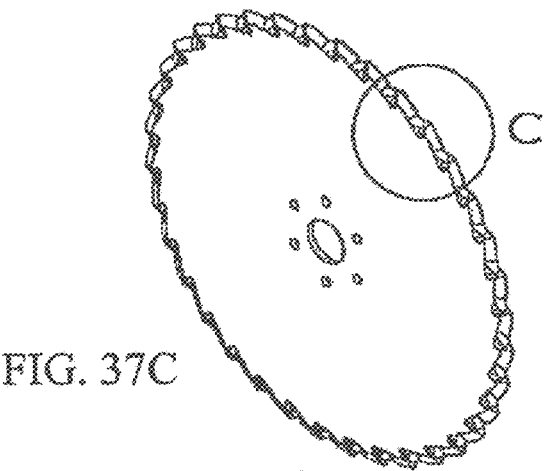
FIG. 37C
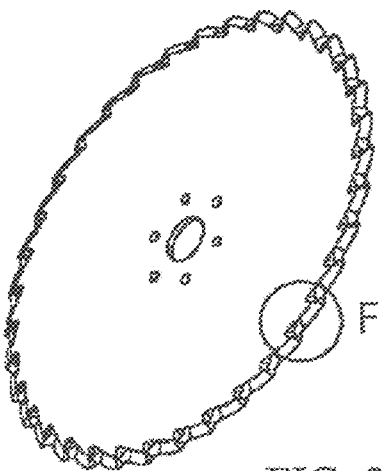
FIG. 37D
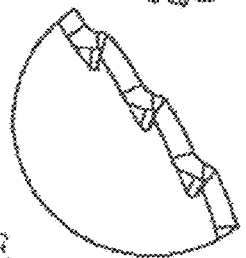
FIG. 37E
FIG. 37F 3800
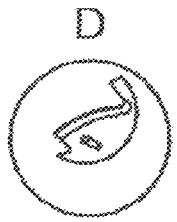
FIG. 38A
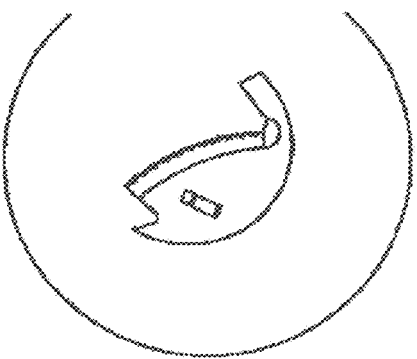
FIG. 38B
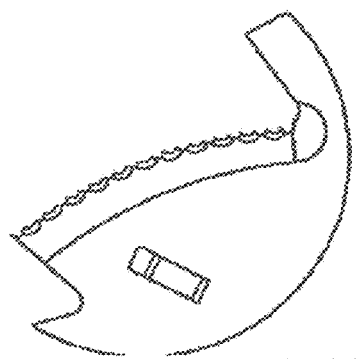
FIG. 38C
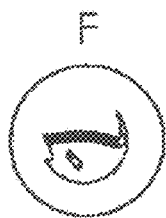
FIG. 38D
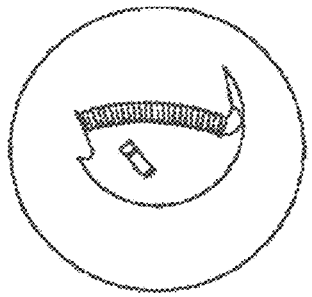
FIG. 38E
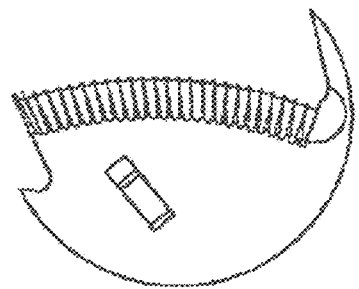
FIG. 38F
FIG. 38G
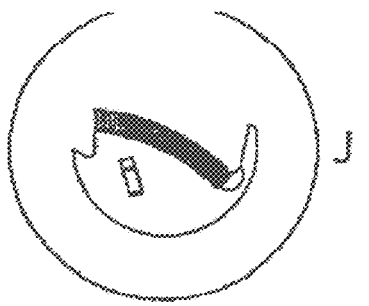
FIG. 38H
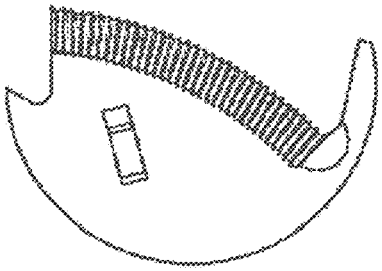
FIG. 38I 3900
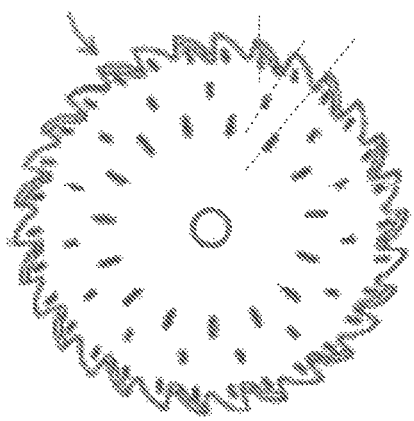
FIG. 39A
FIG. 39B
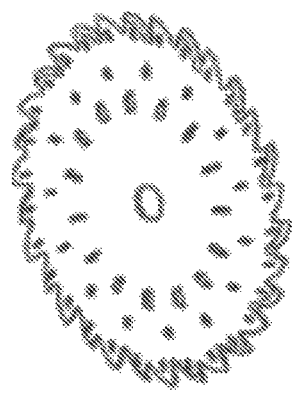
FIG. 39C
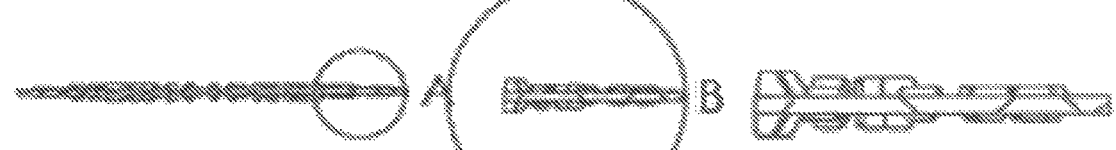
FIG. 39D
FIG. 39E
FIG. 39F
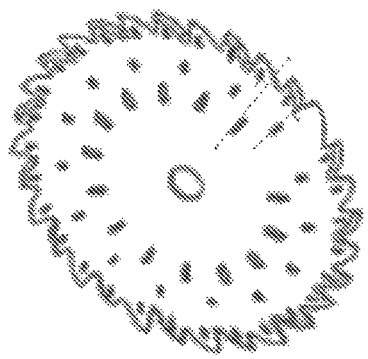
FIG. 39G
FIG. 39H
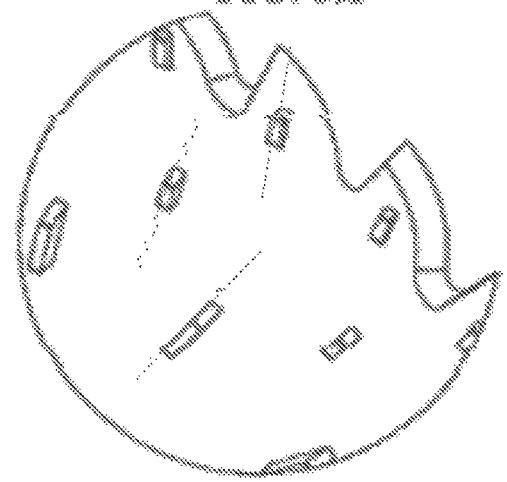
FIG. 39I

4000

SCALE 1:6

SCALE 1:6

SCALE 1:6

SCALE 1:6

4300
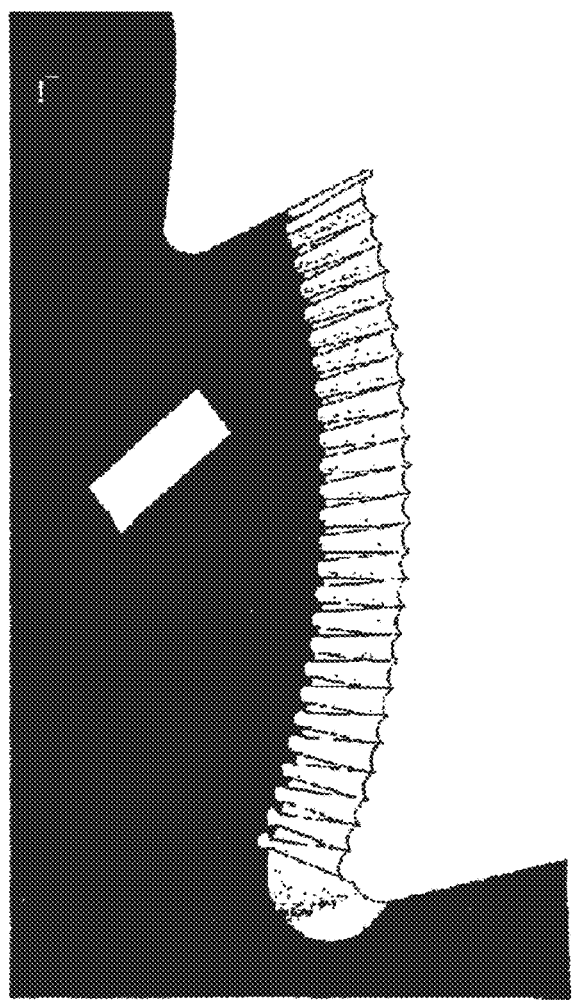
FIG. 43A
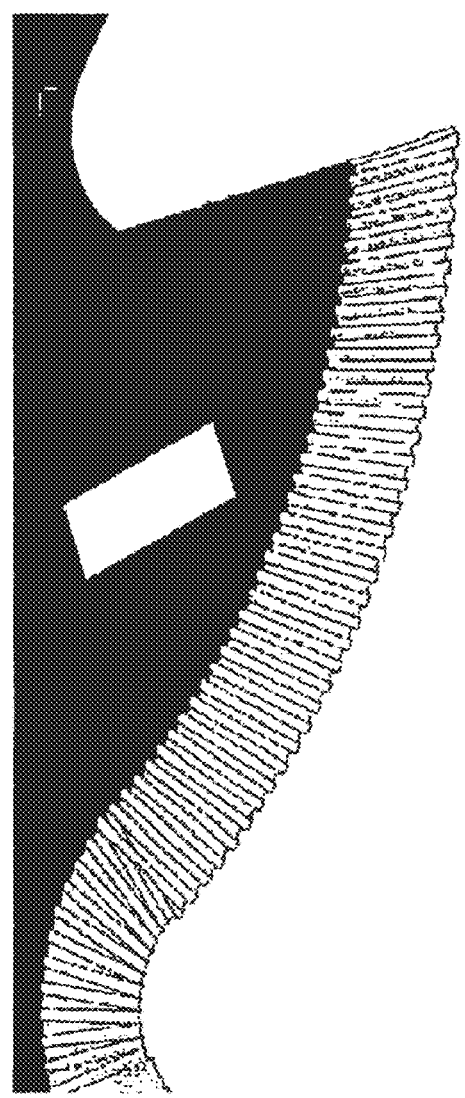
FIG. 43B

5100

5900

| STP 15" | | STP 14.75" |
|---|---|---|
| 15 | Diamter (inches) | 14.75 |
| 47.12385 | Circumference (inches) | 46.33845 |
| 25.46481 | Revolutions per 100 ft | 25.89642 |
| 51.40" (8.3%) | Cutting Circumference | 50.156" (7.6%) |
| 35 | Tooth count | 30 |
| 1.346" | Tooth Length | 1.545" |
| 1.469" | Tooth cutting length | 1.672" |

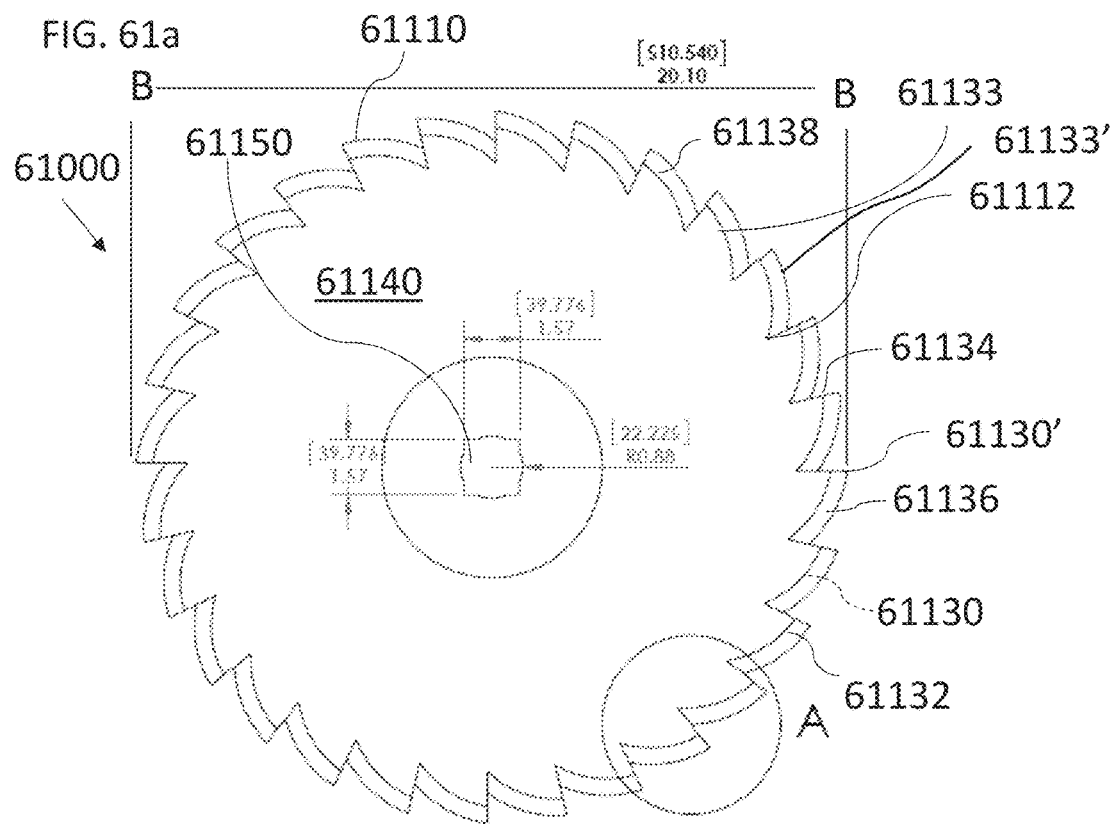
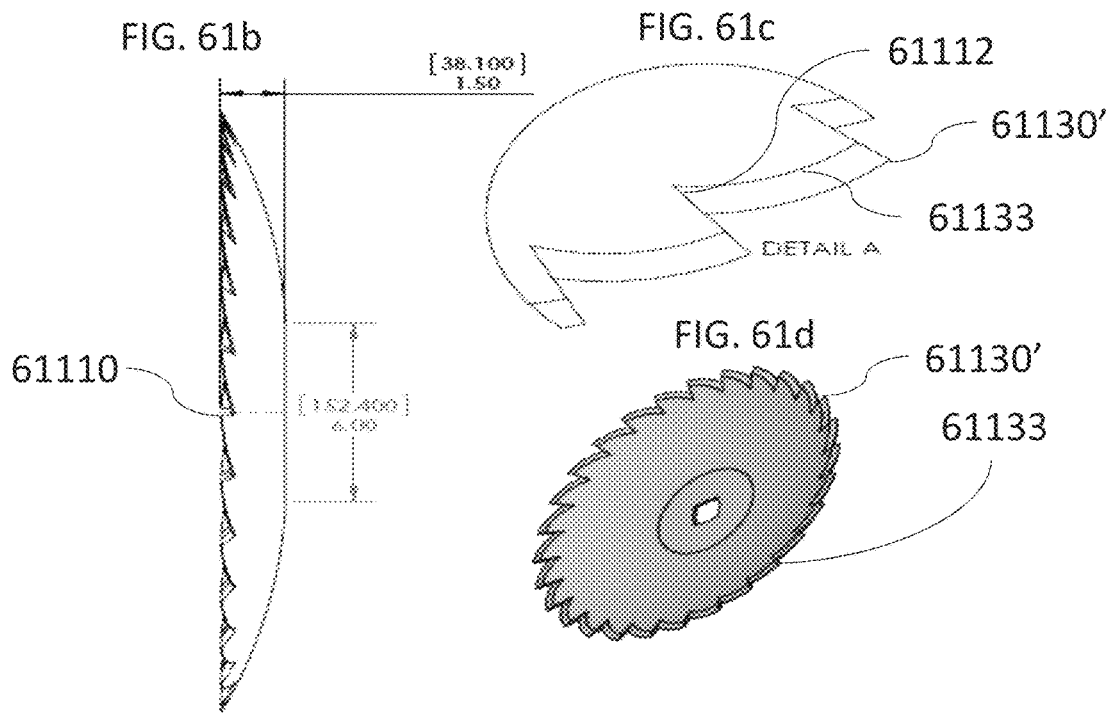

FIG. 62b
FIG. 62c DETAIL C
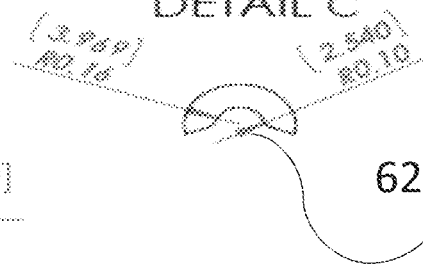
62150
FIG. 62d  62110
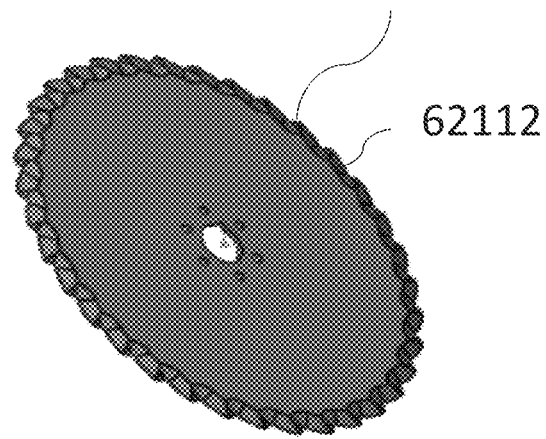
62112
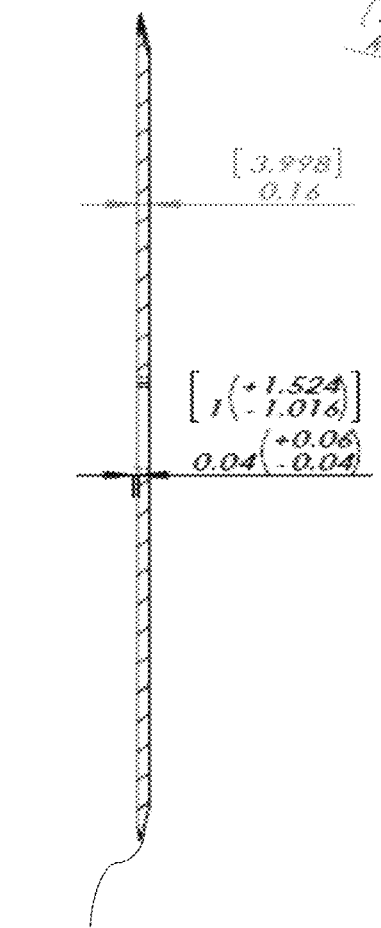
62110

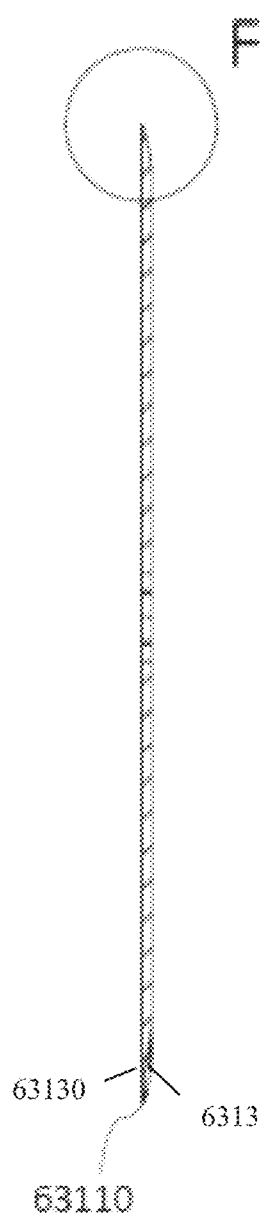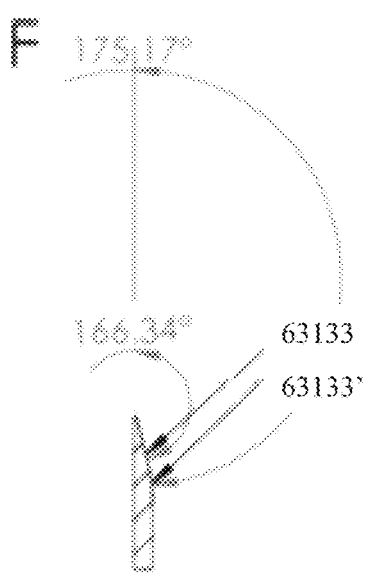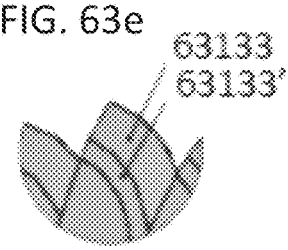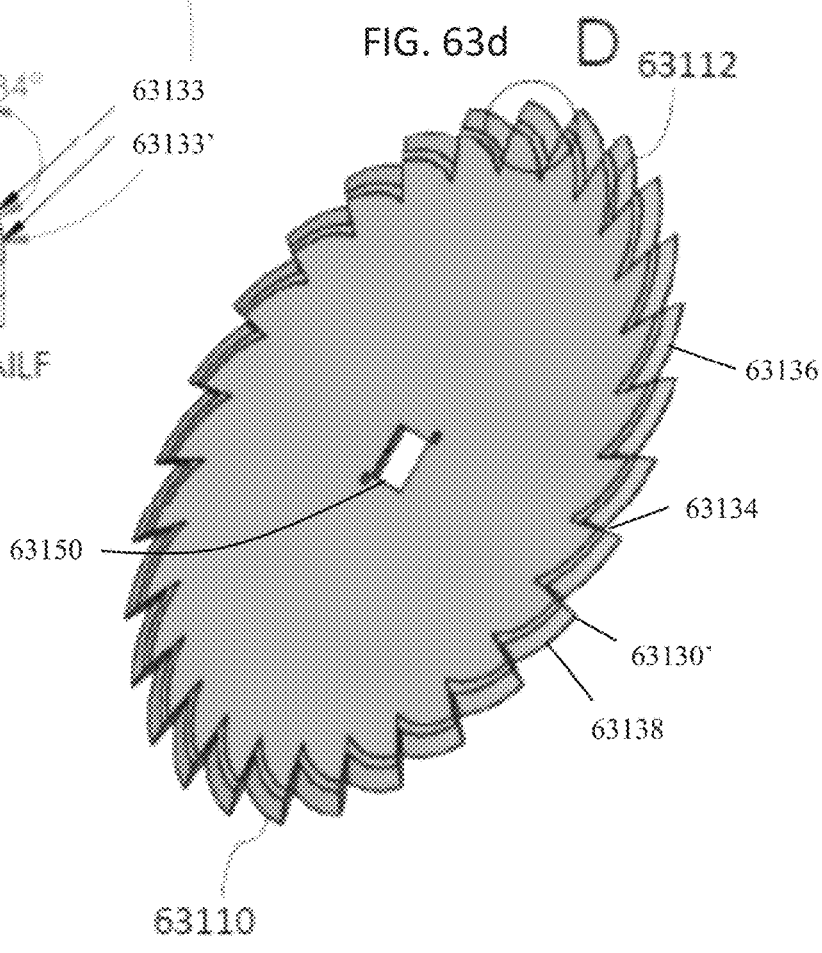

FIG. 64b
FIG. 64c
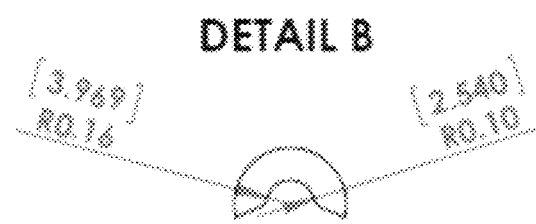
DETAIL B
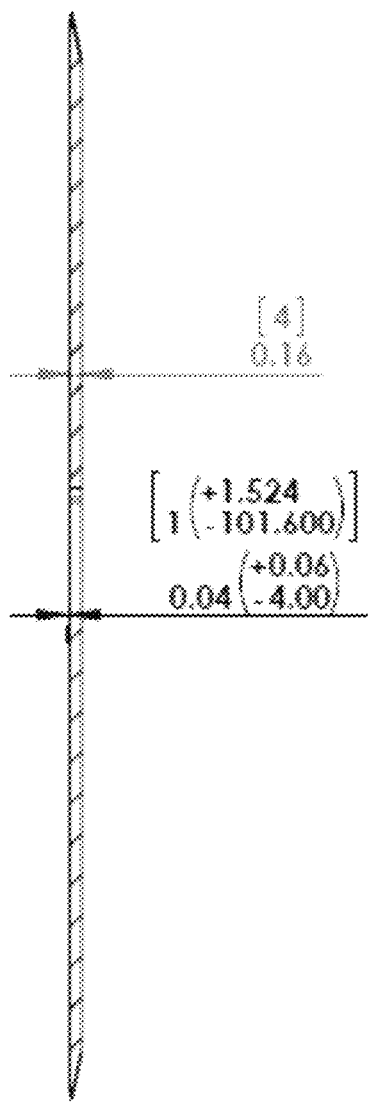
FIG. 64d
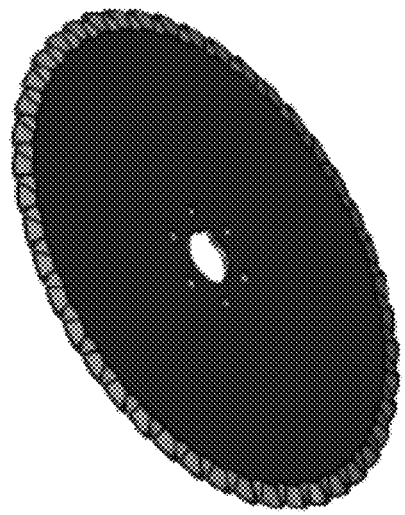

FIG. 65b
FIG. 65c
FIG. 65d
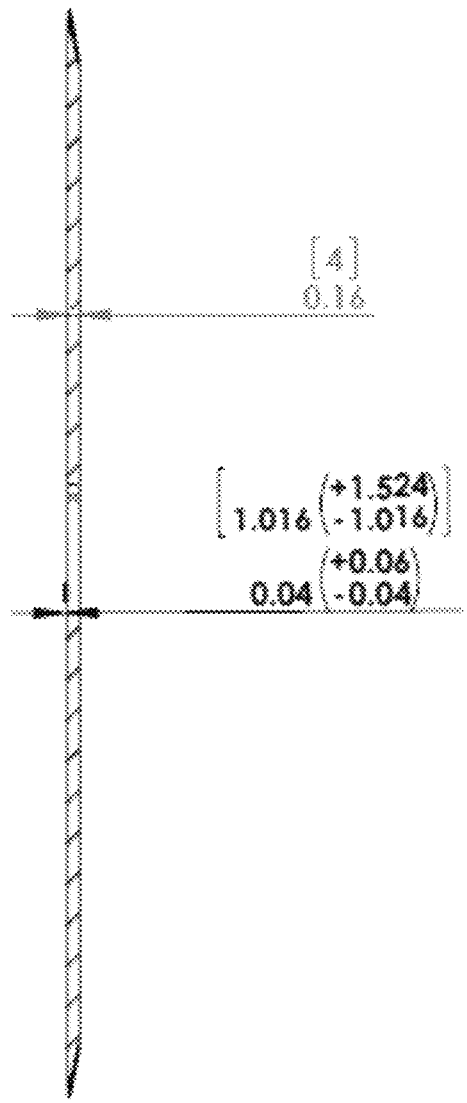
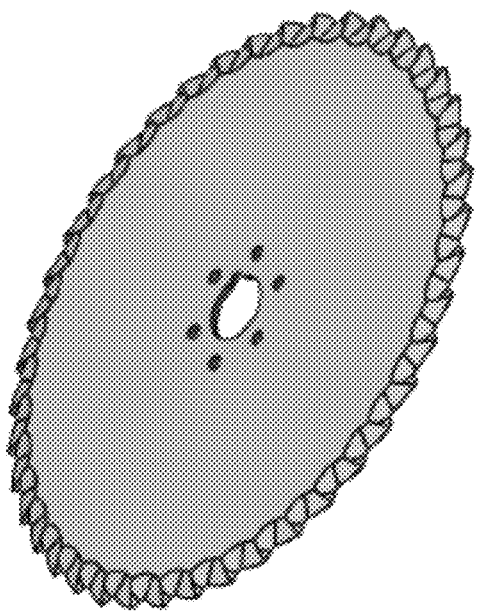

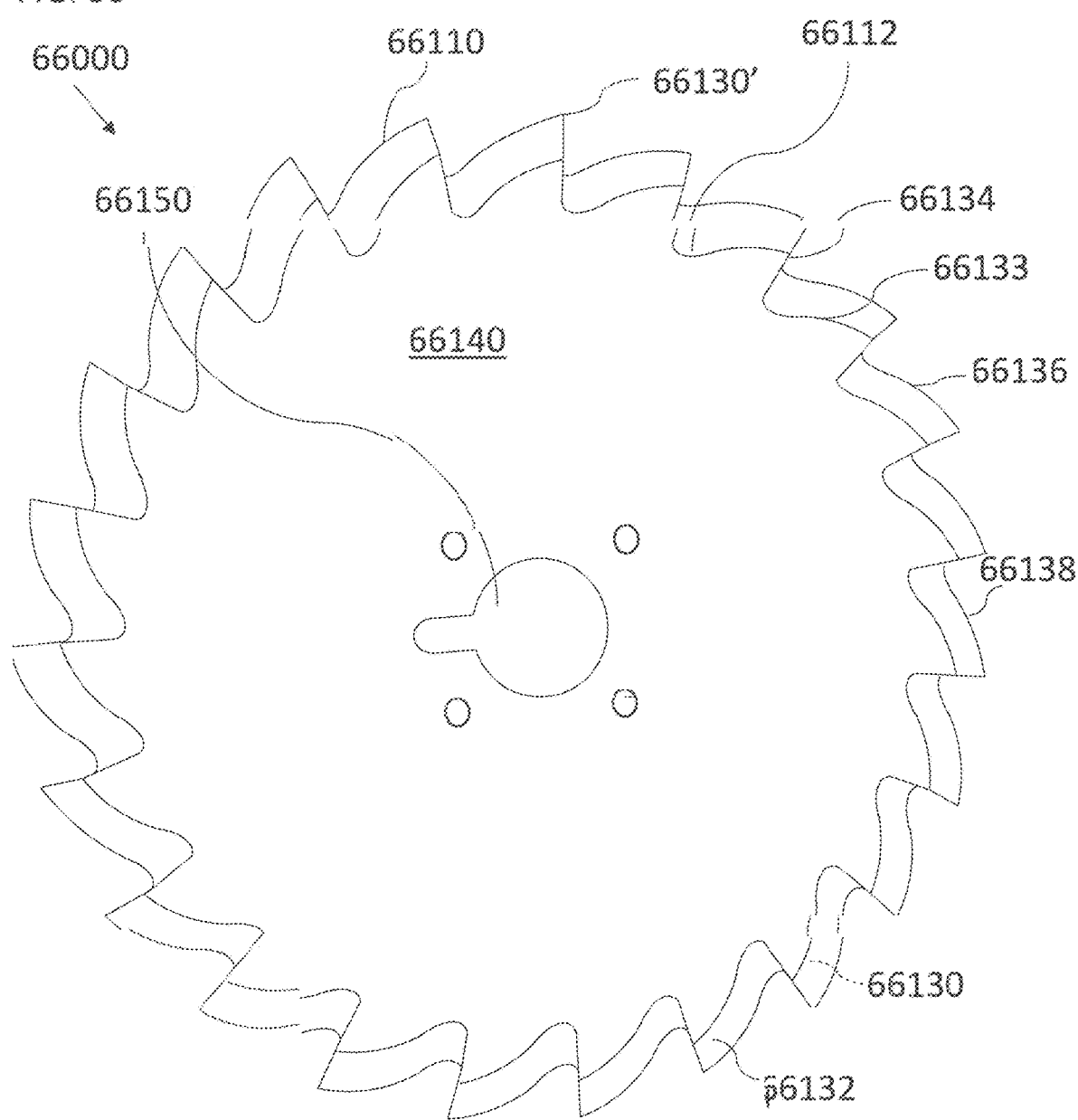

DETAIL C
SCALE 1:2

DETAIL A
SCALE 1:2

A

B

C $\Theta_1 = \theta_T - \theta_2$

FIG. 72c
FIG. 72d
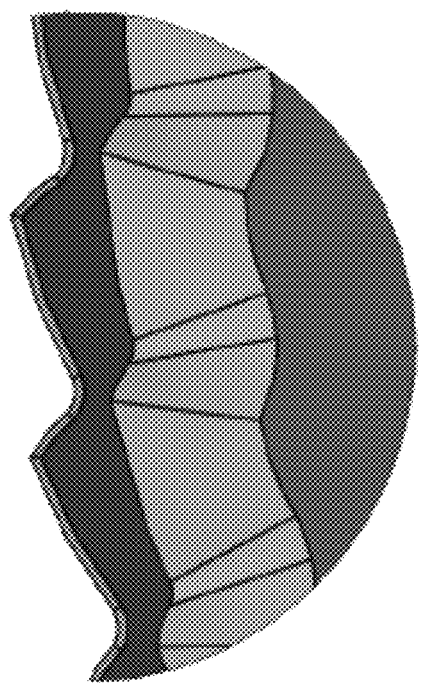
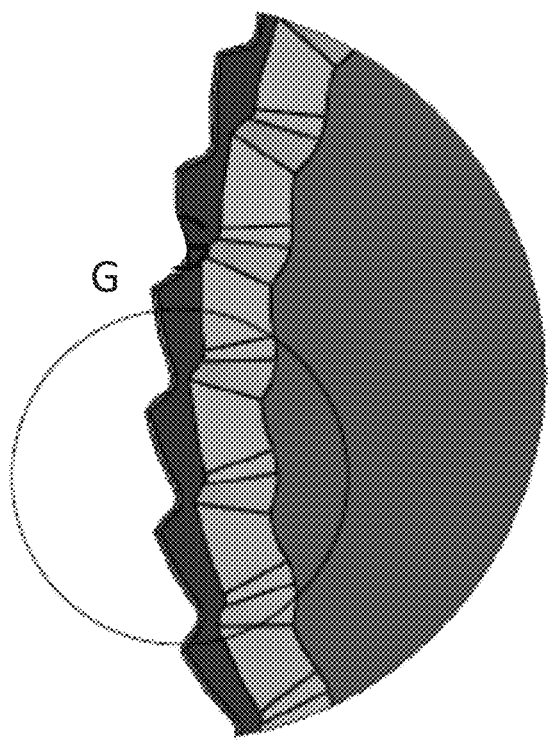
DETAIL G
SCALE 1 : 1
DETAIL D
SCALE 1 : 2
FIG. 72e
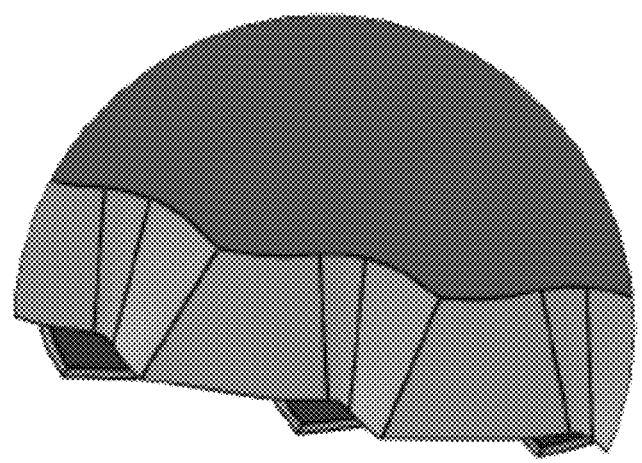
DETAIL F
SCALE 1 : 1

FIG. 73a
FIG. 73b
FIG. 73c
FIG. 73d
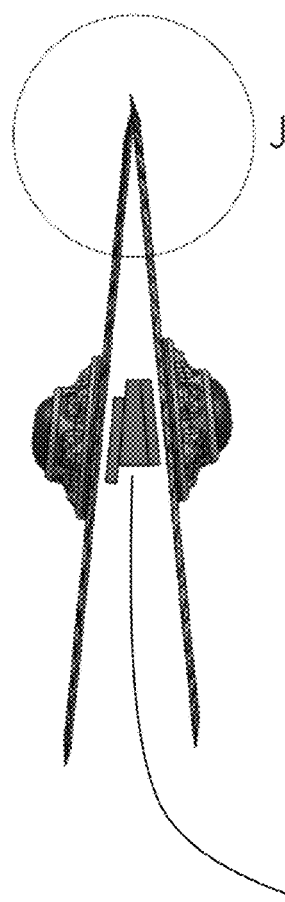
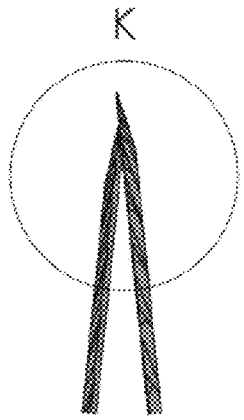
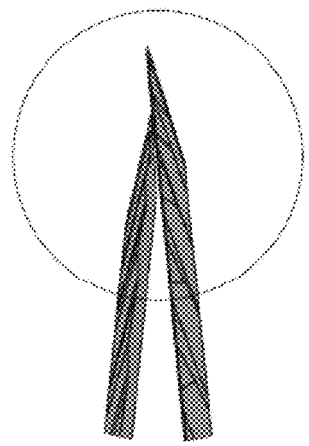
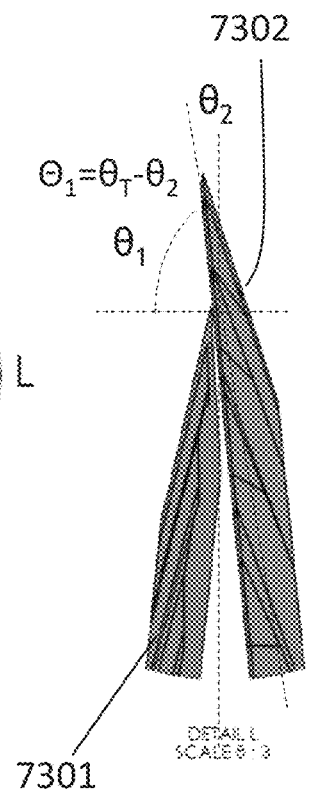

DETAIL A
SCALE 1:2

DETAIL C
SCALE 1 : 2

DETAIL B
SCALE 1 : 2

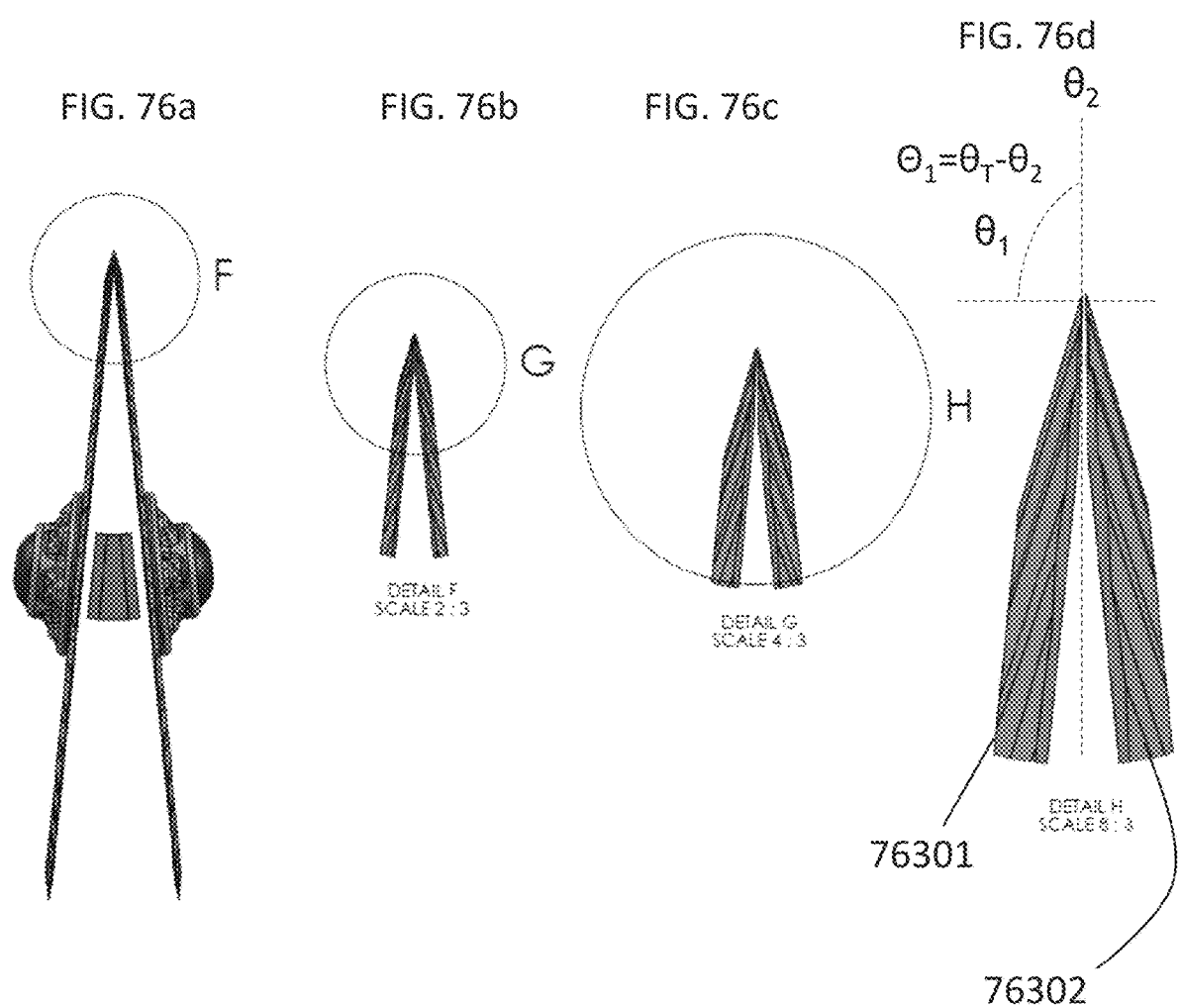

DETAIL J
SCALE 2 : 3

FIG. 78a
FIG. 78b
FIG. 78c
FIG. 78d
$\theta_1 = \theta_T - \theta_2$
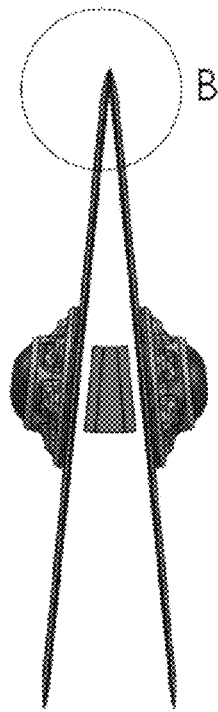
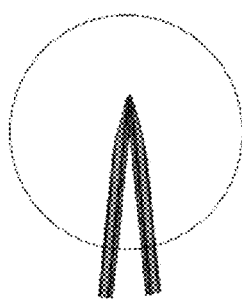
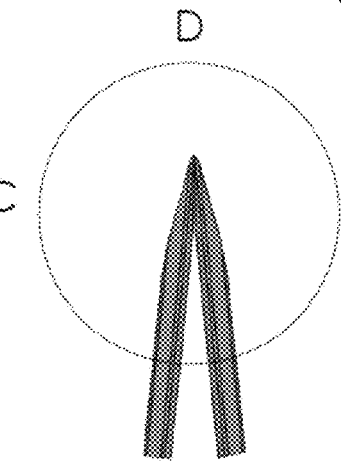
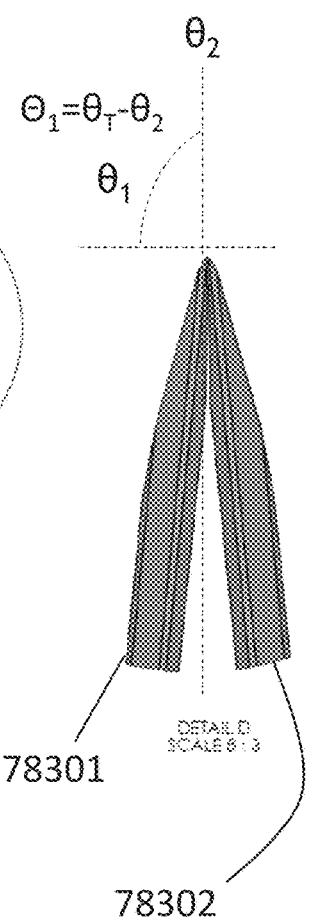
78301
78302

VARIABLE TOOTH COULTER BLADE WITH SIZED INSERTS

CROSS-REFERENCE TO RELATED APPLICATIONS

The present application is a continuation in part of U.S. patent application Ser. No. 16/115,061 filed Aug. 28, 2018, entitled "Variable Tooth Counter Blade with Sized Inserts" which, in turn, is a continuation in part of U.S. patent application Ser. No. 14/998,442 filed Jan. 4, 2016 entitled "Variable Tooth Counter Blade with Sized Inserts" which, in turn, is a continuation in part of U.S. patent application Ser. No. 14/961,849 filed Dec. 7, 2015, entitled "Variable Tooth Counter Blade with Sized Inserts" which, in turn, is a continuation of U.S. patent application Ser. No. 14/590,855 filed Jan. 6, 2015, entitled "Variable Tooth Counter Blade with Sized Inserts," now U.S. Pat. No. 9,204,588 which, in turn, is a continuation of U.S. patent application Ser. No. 14/162,259 filed Jan. 23, 2014, entitled "Variable Tooth Counter Blade with Sized Inserts" which claims the benefit under 35 U.S.C. § 119(e) of U.S. Provisional Application 61/756,841 filed Jan. 25, 2013 entitled "Variable Tooth Counter Blade with Sized Inserts," the disclosures of which are hereby incorporated in their entirety by reference thereto.

BACKGROUND OF THE INVENTION

Field of the Invention

The present invention relates generally to agriculture tillage, seeding, fertilizer equipment and multiple other applications. More particularly, embodiments of the present invention relate to an efficient device for cutting surface stubble while simultaneously mulching, tilling, flowing and aerating the soil.

Description of the Prior Art

Traditional agriculture requires turning of the soil to effectively bury desirable stubble to create needed composted material. With the advent of reduced tillage and minimum tillage farming techniques, coulter blades may be used to increase surface area by cutting and reducing the stubble, enabling compost and reuse of the desirable stubble.

Soil compression is an undesirable effect of tillage equipment interaction with the soil. Vehicle wheels and traditional coulter blades may compress the soil with which they may interact. Soil compression may multiply over time leading to less root enhancement, less root travel, and a lesser amount of air in the soil. These continued effects may result in an eventual reduction of product available to an operator.

A Genetically Modified Organism (GMO) stubble may be more substantial than traditional cellulose or stubble. Such GMO stubble is difficult for existing tillage devices to cut. A desired outcome of tillage equipment is GMO stubble cut into smaller segments for ease of compost and eventual GMO breakdown.

Traditional coulter blades may be unable to effectively cut GMO stubble and create a "wave" of stubble in front of the blade causing an eventual plug. This plug requires the operator to stop work and physically remove the plug before continuing operation.

Traditional coulter blades may flex as they enter the soil causing increased blade wear as the blade mating point may flex to an undesirable angle. Also, blade flex may cause undesirably increased sidewall compaction and decreased furrow width.

Therefore, a need exists for a blade designed to effectively cut regular stubble, the more substantial GMO stubble, green crop and cover crop while aerating, mulching and tiling the soil with a least amount of contact with the least amount of time.

SUMMARY OF THE INVENTION

Accordingly, an embodiment of the present invention is directed to a coulter blade for altering soil and surface stubble, comprising a discoidal coulter blade configured with a blade hub or attachment point, a blade width, and a blade circumference, the discoidal coulter blade having a plane parallel to each diameter line of the discoidal coulter blade, the blade hub or attachment point configured for detachably mounting the discoidal coulter blade to an implement. The discoidal coulter blade is further configured with a proximal side and a distal side, the proximal side being proximal to an implement attachment point, the distal side being distal from the implement attachment point.

The distal side of the discoidal coulter blade is configured with a blade circumference forming a blade outer edge, lateral sides and a blade center point, for detachably mounting to an implement. A plurality of teeth are provided that are configured proximal to and integral with the blade circumference, each one of the plurality of teeth having a gullet adjacent thereto, each one of the plurality of teeth having a cutting edge and a back edge, the back edge longitudinally opposite the cutting edge, the cutting edge configured to cut the surface stubble and the soil, the back edge and fillet or gullet configured for driving the discoidal coulter blade as the soil acts on the back edge and fillet or gullet, the cutting edge continuing through the gullet. One or more of the lateral sides have at least one inside bevel sharpened at a first bevel angle, the at least one inside bevel being located at a location between the blade center point and the blade outer edge. The cutting edge of the plurality of teeth are shaped in a sabre or curved shape extending from a tooth tip into the gullet and continuing into the back edge. Whereby said discoidal coulter blade rotationally interacts with the soil to translate in a forward direction.

In another aspect of the invention a method for altering surface stubble and soil aeration is provided, comprising the steps of: 1) embedding a discoidal coulter blade within the soil, the discoidal coulter blade having a blade circumference forming a blade outer edge, lateral sides and a blade center point and being configured for detachably mounting to an implement; 2) translating the discoidal coulter blade through the soil at a depth via the implement; 3) translating the soil as the discoidal coulter blade translates through the soil; 4) driving the discoidal coulter blade rotationally parallel to the blade circumference as the soil acts on a back edge of a plurality of teeth configured proximal to and integral with the blade circumference, each one of the plurality of teeth having a gullet adjacent thereto, each one of the plurality of teeth having a cutting edge and a back edge, the back edge longitudinally opposite the cutting edge, the cutting edge configured to cut the surface stubble and the soil, the back edge configured for driving the discoidal coulter blade as the soil acts on the back edge, the cutting edge continuing through the gullet, the cutting edge of the plurality of teeth being shaped in a sabre or curved shape extending from a tooth tip into the gullet and continuing into the back edge; 5) driving the discoidal blade rotationally parallel to the blade circumference as the solid acts on one or more of the lateral sides having at least one inside bevel sharpened at a first bevel angle, the at least one inside bevel being located at a location between the blade center point and the blade outer edge; 6) cutting the surface stubble and the soil as the soil acts on the cutting edge of the teeth and the inside bevel. Whereby said discoidal coulter blade rotationally interacts with the soil to translate in a forward direction.

BRIEF DESCRIPTION OF THE DRAWINGS

The invention will be more fully understood and further advantages will become apparent when reference is had to the following detailed description of the preferred embodiments of the invention and the accompanying drawing, in which:

FIGS. 13A-13E are diagrams of exemplary coulter blades with variable tooth number, tooth size, insert number and size, and gullet depth in accordance with embodiments of the present invention;

FIGS. 15A-15D are diagrams of insert effect on the soil at various blade depths in accordance with embodiments of the present invention;

FIGS. 16A-16D are diagrams of the insert lift and fracture effect on the soil at various blade depths and multiple insert angles in accordance with embodiments of the present invention;

FIGS. 28A-I are diagrams of exemplary inserts in accordance with an embodiment of the present invention, particularly showing a bubble blade insert;

FIGS. 29A-I are diagrams of exemplary inserts in accordance with an embodiment of the present invention, particularly showing a notch blade insert;

FIGS. 30A-I are diagrams of exemplary inserts in accordance with an embodiment of the present invention, particularly showing a razor blade insert;

FIGS. 31A-I are diagrams of exemplary inserts in accordance with an embodiment of the present invention, particularly showing a ripple blade insert;

FIGS. 32A-F are diagrams of exemplary inserts in accordance with an embodiment of the present invention, particularly showing a Samurai blade insert;

FIGS. 33A-C are further views of the exemplary inserts of;

FIGS. 34A-I are diagrams of exemplary inserts in accordance with an embodiment of the present invention, particularly showing a turbo blade insert;

FIGS. 35A-I are diagrams of exemplary inserts in accordance with an embodiment of the present invention, particularly showing a vortec blade insert;

FIGS. 36A-I are diagrams of exemplary inserts in accordance with an embodiment of the present invention, particularly showing a wavy blade insert;

FIGS. 37A-F are diagrams of exemplary fillets, seeder blade Extended Fillet and seeder blade Mate Taper, in accordance with an embodiment of the present invention;

FIGS. 38A-I are diagrams of exemplary serrated cutting edges, serrate 1 (FIG. 38A-38C), serrate 2 (38D-38F), and serrate 3 (38G-38I), in accordance with an embodiment of the present invention;

FIGS. 39A-I are diagrams of exemplary inserts in accordance with an embodiment of the present invention, particularly showing multiple inserts and multiple insert angles blade;

FIGS. 43A and 43B are exemplary images of serrated edge embodiments in accordance with an embodiment of the present invention;

FIG. 60c is a top side view of the coulter blade of FIG. 60a;

FIG. 61a is a top plan view of a concave coulter blade exemplary of an embodiment of the present invention;

FIG. 61b is a side view of the coulter blade of FIG. 61a taken along cross-section B-B;

FIG. 61c is a view of the teeth of the coulter blade of FIG. 61a taken along cross-section A;

FIG. 61d is a top side view of the coulter blade of FIG. 61a;

FIG. 62b is a side view of the coulter blade of FIG. 62a taken along cross-section B-B;

FIG. 62c is a view of the teeth of the coulter blade of FIG. 62a taken along cross-section C;

FIG. 62d is a top side view of the coulter blade of FIG. 62a;

FIG. 63b is a side view of the coulter blade of FIG. 63a taken along cross-section 63A-63A;

FIG. 63c is a view of the teeth of the coulter blade of FIG. 63b taken along cross-section F;

FIG. 63d is a top side view of the coulter blade of FIG. 63a;

FIG. 63e is a view of the teeth of the coulter blade of FIG. 63b taken along cross-section D;

FIG. 64b is a side view of the coulter blade of FIG. 64a taken along cross-section 64A-64A;

FIG. 64c is a view of the hub of the coulter blade of FIG. 64a taken along cross-section B;

FIG. 64d is a top side view of the coulter blade of FIG. 64a;

FIG. 65b is a side view of the coulter blade of FIG. 65a taken along cross-section A-A positive or negative concavity option [note] negative concavity concaves away from tooth pattern/positive concavity concaves toward the tooth pattern;

FIG. 65c is a view of the hub of the coulter blade of FIG. 65a taken along cross-section B;

FIG. 65d is a top side view of the coulter blade of FIG. 65a;

FIG. 66 is a top plan view of a coulter blade exemplary of an embodiment of the present invention;

FIG. 71b is a side view of the off-set coulter blades of FIG. 71a;

FIG. 71c is a top plan view of a second side of the coulter blades of FIG. 71a;

FIG. 72c is a cross-section view of the coulter blades of FIG. 72d taken along cross-section G;

FIG. 72d is a cross-section view of the coulter blades of FIG. 72a taken along cross-section D;

FIG. 72e is a cross-section view of the coulter blades of FIG. 72b taken along cross-section F;

FIG. 73a is an image of an alignment configuration of a pair of coulter blades exemplary of an embodiment of the present invention;

FIG. 73b is a cross-section view of the off-set of FIG. 73a taken along cross-section L;

FIG. 73c is a cross-section view of the off-set of FIG. 73b taken along cross-section K;

FIG. 73d is a cross-section view of the off-set of FIG. 73d taken along cross-section L;

FIG. 74b is a cross-section view of the coulter blades of FIG. 74a taken along cross-section A;

FIG. 74c is a top plan view of the coulter blade of FIG. 74a wherein two or more blades are mounted in an centered blade configuration in a centered axis blade application;

FIG. 74d is a cross-section view of the coulter blades of FIG. 74c taken along cross-section C;

FIG. 74e is a bottom side plan view of the coulter blades;

FIG. 74f is a cross-section view of the coulter blades of FIG. 74e taken along cross-section B;

FIG. 75a is a top side plan view of coulter blades exemplary of an embodiment of the present invention;

FIG. 75b is a cross-section view of the coulter blades of FIG. 75a taken along cross-section D;

FIG. 75c is a cross-section view of the coulter blades of FIG. 75b taken along cross-section E;

FIG. 76a is an image of an alignment configuration of a pair of coulter blades exemplary of an embodiment of the present invention;

FIG. 76b is a cross-section view of the centered axis of FIG. 76a taken along cross-section F;

FIG. 76c is a cross-section view of the centered axis of FIG. 76b taken along cross-section G;

FIG. 76d is a cross-section view of the centered axis of FIG. 76c taken along cross-section H;

Figure 72A:
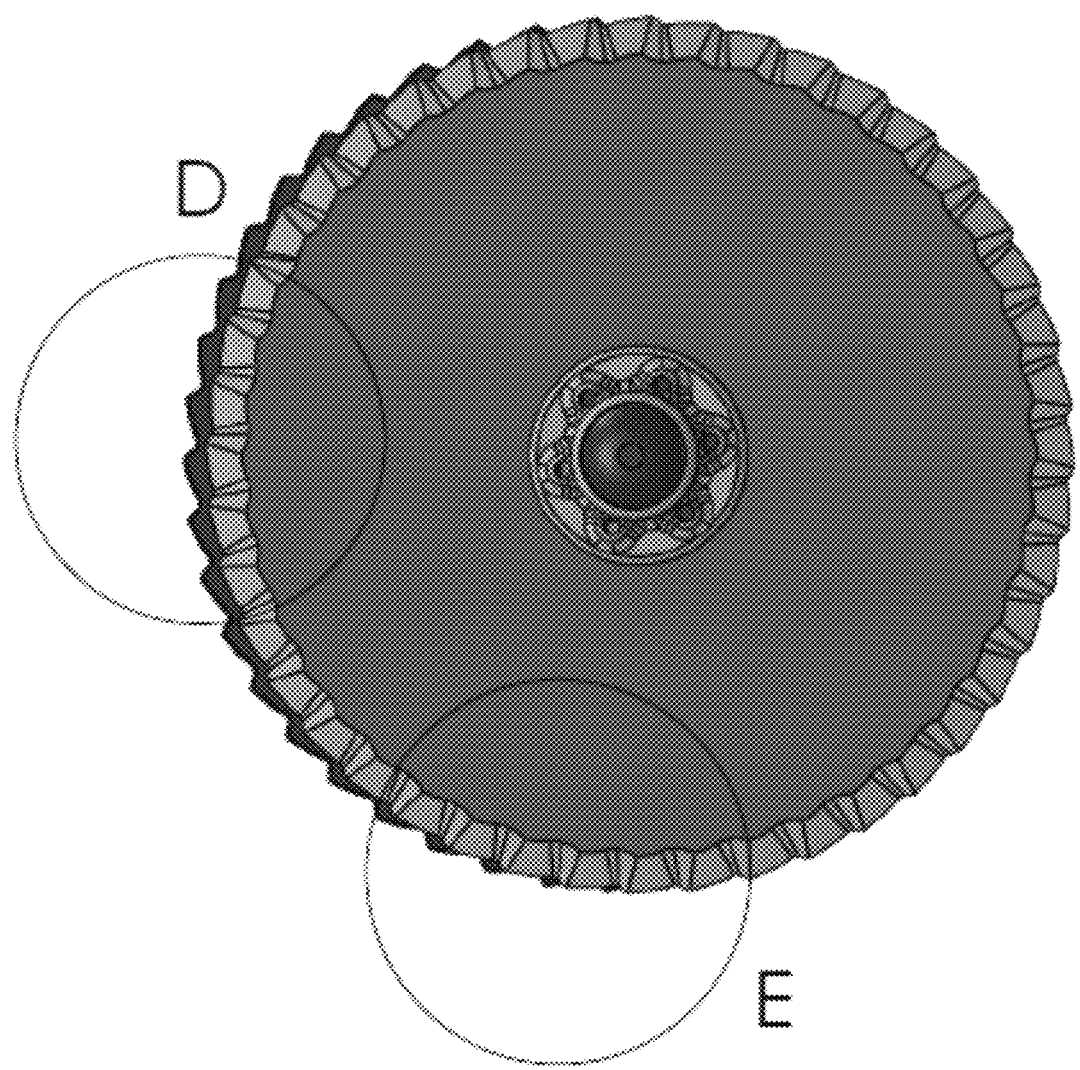
FIG. 72a is a top plan view of coulter blades exemplary of an embodiment of the present invention wherein two or more blades are mounted in an off-set blade configuration in a centered axis blade application.
Figure 77A:
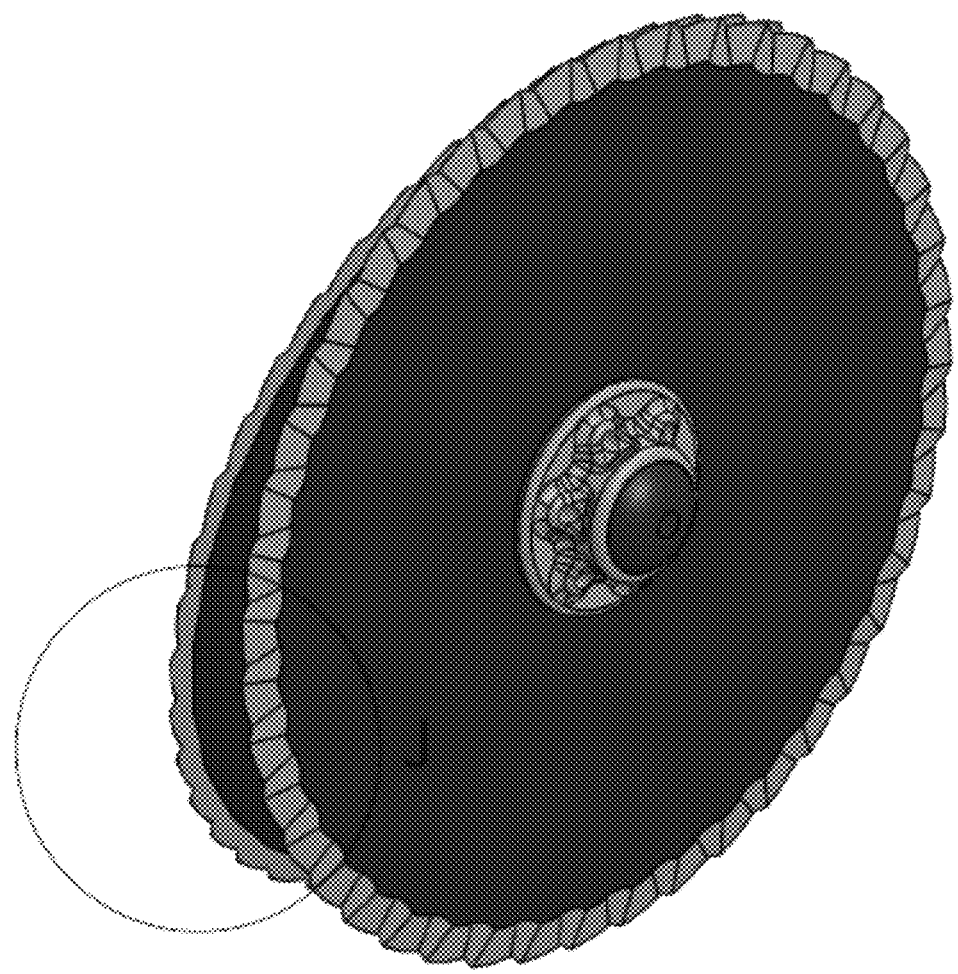
Figure 77B:
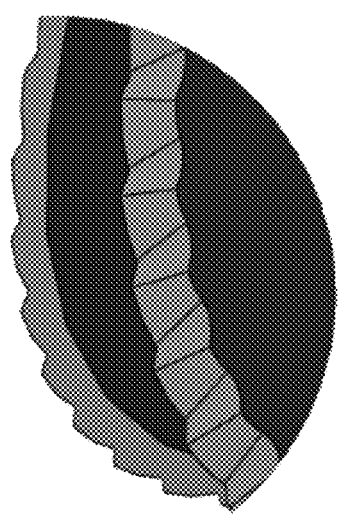

FIG. 77a is a top plan view of coulter blades exemplary of an embodiment of the present invention wherein two or more blades are mounted in an off-set blade configuration in an off set axis blade application;

FIG. 77b is a cross-section view of the coulter blades of FIG. 72a taken along cross-section J;

FIG. 78a is an image of an alignment configuration of a pair of coulter blades exemplary of an embodiment of the present invention;

FIG. 78b is a cross-section view of the centered of FIG. 78a taken along cross-section B;

FIG. 78c is a cross-section view of the centered of FIG. 78b taken along cross-section C;

FIG. 78d is a cross-section view of the centered of FIG. 78c taken along cross-section D.

DESCRIPTION OF THE PREFERRED EMBODIMENTS

Reference will now be made in detail to the presently preferred embodiments of the invention, examples of which are illustrated in the accompanying drawings. The subject Variable Tooth Coulter Blade With Sized Inserts shall be referred to throughout as the STI Series blade, or the subject coulter blade, generally.

The following description presents certain specific embodiments of the present invention. However, the present invention may be embodied in a multitude of different ways as defined and covered by the claims. In this description, reference is made to the drawings wherein like parts are designated with like numerals throughout.

One goal of the present invention may include a device capable of cutting the soil with a minimum required Downward Pressure (DP). DP on tillage equipment may be directly proportional to force required to pull the tillage equipment through the field. A reduction in DP equals a corresponding reduction in force and thus, reduced fuel used to pull the equipment.

An additional goal of the present invention may include a coulter blade with a plurality of sharpened teeth, the teeth shaped to efficiently cut a substantial portion of stubble. The teeth may be of uniform shape or variable with angular position around the circumference of the blade.

An additional goal of embodiments of the present invention may be to mulch, till and aerate the soil with which the inserts of the blade may interact. Such mulching, tillage and aeration may prove beneficial to annual root growth as well as long term health of the soil.

An additional goal of the embodiments is to uniquely provide a blade that functions in wet and dry soil, while providing a large degree of blade angle rotation.

Another goal of the embodiments of the present invention is to provide a coulter blade with sized inserts that is driven by tooth and insert geometry. Geometrically, the unique structural combination of the tooth has been found to operate to not only provide optimal soil preparation, but to drive the coulter blade.

Applications

The subject STI series blade is contemplated having various configurations for optimizing soil engagement, including single side, opposing bevel sides, coned, curved, waffle, straight, notched tooth, ripple, turbo, vortex, or multiple blade configurations. Other configurations contemplated include rotating knife, multiple-sided, geometrical or tillage apparatus or blade high-pressure tube injection coulter system, and inserted covering finger, multiple teeth at multiple angles, multiple inserts at multiple angles and designs including serrated teeth at multiple angles and configurations. Blades with multiple attachments or devices as to insert, inject or placement are also contemplated.

Further contemplated by the subject STI series blade are applications in seeding; planters, seeders, or seeding systems using ground engagement or attached multiple use placement systems SDS [Seed Delivery Systems]-FDS [Fertilizer Delivery Systems]-MDS [Manure Delivery Systems]-LDS [Insecticide Delivery Systems]-BDS [Biological Delivery Systems]-CEDS [Carbon Exhaust Delivery Systems]-TRPDS [Transplant Delivery Systems]-ETRDS [Electronic Delivery systems].

Other contemplated applications of the subject STI series blade or coulter blade with inserts include use with: 1. tillage tools and soil excavation; vertical tillage, disk, fertilizer eq, manure eq, waste eq, mulching eq, plow, sub soil compaction eq, strip till, road construction, excavation eq, tiling, multiple cable laying machine', lawn aeration and fertilization, roto-tillers, insecticide or multiple element placement or injection from gas-solutions-granular and utilizing moist granulated soil sealing capabilities [example NH3 or carbon exhaust]; 2. plant and cellulose processing, cutting and harvesting; silage choppers, corn heads, grain heads, pea harvesting heads, hay or cellulose harvesting, hay and cellulose processing [for example, tub grinders-bio-mulching eq, carbon shredding eq, aluminum shredding or cutting eq, poly shredding or cutting eq, low density elements processing], sickle sections, sugar cane harvesting eq, row crop header, disk bine, detasselers, food and carbon product processing; 3. Cutting shredding; mowers, shredders, brush cutters, tree trimming, stump grinding, woody and plastic processing, polymer processing; and 4. hand tools and power driven devices; machetes, axes, hatchets, knives, kitchen utensils, meat grinders and processors, bone grinders, surgical instruments, and military defense.

Blade Size and Shape

An exemplary embodiment chosen for illustrative purposes may include a coulter blade of circular shape with a plurality of teeth configured to interact with chaff or stubble on the surface of the soil as well as the soil itself. This exemplary embodiment employs at least one circular row of inserts oriented normal to the surface of the blade and able to interact with the soil as the blade traverses the soil.

Blade Rotation as to the Linear Distance Traveled. The subject STI Series blade rotates up to 96% of linear distance traveled at hub depth or shallow depth. The subject STI series blade utilizes blade rotation as to the Linear Distance Traveled, Cutting, Self Sharpening, Soil Granulation and least amount of Contact in the least amount of time. STI series blade rotates 92-96% of linear distance traveled hub deep. A good number of heretofore disclosed and utilized blades slip up to 50% of the travel distance at hub depth, and most current blades slip 15-30% of linear distance traveled. On the other hand, the subject STI series blade substantially avoids slippage and as a result, yields optimal soil treatment and crop growth while saving time and lessening carbon footprint. Typical heretofore and utilized blades require substantial surface contact to rotate, for example on each side of blade ~200 inches of contact to turn; conversely, the subject STI series blade only needs ~40 inches of contact to turn.

Forward Motion

When an object is pushed or moved forward, at certain geometrical angles, engagement angles engaged downward or certain lateral downward movement, the object utilizes forward rotation, forward forces, forward energy and forward angles to engage, thereby lessening energy, force required [down pressure] and lessening soil or product compaction. For example, a circular object engaged in soil generally pinches and/or rolls upward and out [i.e., a wheel], which requires more down pressure and energy to maintain depth control. By utilizing certain geometrical objects at certain geometrical angles, objects may utilize soil or product density as to pull, anchor, leverage or engage.

Objects: Fillet or Gullet, Insert, Backside of tooth of the subject STI series blade without being bound by theory, rotation during forward motion maximizes friction and concentrated friction. Forward rotation at certain geometrical angles with certain geometrical objects flow product outward, lessening soil or product area and volume. Forward rotation at a 3:30-6:00 angle is a push force of which reverses to a pull force at or after the 6:00 angle [insert ratchet point] is rotated forward and upward toward the hub center point in forward motion and soil or product exit point in forward motion. Thereby utilizing the pull and lift force to lessen the push force by maximizing the object geometrical designs and at certain geometrical angles.

Forward tooth rotation of the subject coulter blade with an upward point, multiple upward angles or upward sabers, utilize concentrated friction and force in forward rotation and forward motion, versus downward angles, chopping actions or of common blade geometry. Soil compaction is lessened in forward rotation of the subject blade by the previous tooth removing soil compaction of the present tooth, in a crossing and or forward lifting pattern.

The subject STI series blade is driven via forward motion by tooth geometry with or without inserts. Geometrically, in combination the backside of the tooth [preferably, a Vertical Blunt edge], tooth fillet or gullet, opposing or single tooth bevel pattern, tooth bevel angle, and inserts structurally result in a blade that exhibits the least amount of contact in the least amount of time theory. This means that the subject blade predominately only has soil contact on the outer circumference of 1-2.5", for example, thereby lessening Friction by Soil contact while other blades have a much greater soil contact.

As used herein, the term bevel generally means a slope from the horizontal or vertical plane, sloping surface or edge, reduce (a square edge on an object) to a sloping edge, or a n angle that one surface or line makes with another when they are not at right angles.

Structurally, in preferred embodiments, the backside of the tooth has a vertical blunt edge, while between each tooth there is a fillet or gullet, and an opposing tooth bevel pattern is provided. Combined, each of these structural features operate in concert to optimally drive the coulter blade via forward driving force. Alternating soil contact pressure utilizing a forward driving force drives the blade forward while also keeping the blade in a straight linear motion, as opposed to a side driven motion which causes massive contact and friction.

Conversely, current coulter blades use the pinch/wedge, notch or down pressure theory, typically moving forward by way of side driven motion as the soil presses onto large surface area sides of each blade, causing compaction of the soil. As a result, the soil does not aerate, maintain moisture or capillary action or drain properly and therefore it leads to crop failure. On the other hand, the subject invention provides a coulter blade with or without sized inserts that uniquely functions to lessen sidewall compaction and pressure, thereby lessening blade friction and allowing easier rotation. At the same time, the subject blade results in granulation of the soil which leads to optimal aeration, drainage and capillary moisture action for optimal crop yields. Least amount of contact in the least amount of time results with use of the subject coulter blade as the blade predominately only has soil contact on the outer circumference, lessening friction by soil contact.

The subject STI series blade uses a concentrated saber tooth shaped—beveled or curved bevel, using friction and force in forward motion to produce actual consistent rotation that results in the least amount of contact—least amount of time in line with soil treatment theory. The subject STI series blade can be variable Geometrical Angled and Configured with serrations for forward motion, or not.

Self Sharpening

By utilizing Soil or product flow in certain Geometrical Angles and Flow [the fillet and tooth design] the subject STI series blade may increase or decrease wear, as soil or product flow is directed so as to maintain tooth geometry in one or more designated areas. Utilizing the Friction Flow Theory, Tooth integrity and Tooth profile throughout the wear cycle of the blade may be maintained. This can be achieved a number of ways. Firstly, by changing the fillet (size, angle, position and geometrical shape). Or by adjusting a concentrated soil flow across the tooth bevel side and controlled concentrated flow through the fillet at the back edge of the tooth profile, thereby causing directed or designed or normal wear forces to maintain tooth geometry and a self-sharpening action.

Soil Granulation, Subsoil Fracture, Sidewall Fracture

Soil Granulation, Subsoil Fracture, Sidewall Fracture of soil is achieved through use of the subject STI series blade with or without inserts. Tooth geometry of the subject blade in conjunction with insert angle, insert geometrical design, insert size, insert plurality and insert placement on blade, results in piercing of the soil at a geometrical angle in forward motion utilizing the least amount of contact and least amount of time.

By piercing the soil at certain insert angles and certain hub to insert angle ratios in forward motion, the insert of the subject blade pierces the soil with the least amount of contact and rotates generally to a 6:00 position, increasing or changing insert area by design as to size, length, angle and width or multiple inserts in even or un-even sizes or sides or single and or double sides or side length combinations lifting soil at a geometrical angle towards the hub center point, thereby causing subsoil fracturing at the base of the tooth, sidewall fracturing and a soil granulating effect. This is due to lessening soil compaction in forward motion, which is the cause of Soil clodding.

Sealing: By Granulating and Fracturing Soil through use of the subject coulter blade/STI series blade versus clodding (as with typical blades), this allows Products to be placed under and in the existing soil profile fractures in a horizontal position, thereby the existing soil seals and holds or stores Product. Conversely, in a compact, sealed and vertical position products may not be able to proliferate into or through the Soil Profile. This soil action makes the subject STI series both Environmental Protection Act (EPA) and Department of Natural Resources (DNR) friendly.

Cutting, Sizing, Slicing, Shredding, Mowing and Processing

The subject coulter blade with or without inserts, in one embodiment, uses a concentrated saber tooth shape and a beveled or cupped bevel tooth. Using friction and force in forward motion and actual consistent rotation the least amount of contact—least amount of time results. Variable geometrical angled teeth and configured serrations or multiple tooth fillets or gullets may be implemented according to angle or angles in forward motion based on the crop intended for planting/treatment or the soil type. Tooth shape and insert size, shape and angled arrangement helps alleviate hair pinning during operation. Attributes of the tooth allows a slicing motion as well as a chopping motion. Cupped or curved tooth lessens down pressure requirements and allows for increased and a more aggressive cutting action.

The coulter blade with or without sized inserts have an increased or longer linear tooth area versus the blade circumference area, thereby allowing up to 50% more shearing and cutting action per revolution of the blade-versus-linear distance traveled. By increasing shearing and cutting action per revolution, a smaller diameter blade may be used to increase tip speed and maintain depth with less down pressure requirements, thereby lessening equipment maintenance by stress and a decreased carbon footprint.

Single or altering beveled tooth patterns can be used by the coulter blade with or without sized inserts for a variation of soil types, multiple application and cutting conditions or blade applications. All coulter blades with sized inserts can be configured and reconfigured with replaceable teeth and inserts. Additionally, the coulter blade with sized inserts may be used in a shaft driven application [for example—mowing, hay cutting or processing]. The coulter blades with sized inserts are typically run at a higher rotational speed than linear travel in a mowing application; thus the tooth may be pitched in an upward angle to allow for lift of products to be mowed.

The subject coulter blade with or without sized inserts preferably utilizes a curved tooth or fillet that lessens soil contact and friction by utilizing an undercut curvature along the length of each individual tooth [undercut curved or fillet, along bevel area], while maintaining a sharper cutting edge. This construction allows increased cutting, less down pressure requirements and a self-sharpening action.

Tooth Seriation or Tooth Fillets

In an exemplary embodiment of the subject coulter blade with or without sized inserts, a seriated tooth is geometrically aligned with respect to the insert angle, utilizing a fillet, curved or non-curved, flat, wedge or other geometrical protrusions, against the beveled side of the tooth with a plurality of angles and sizes. With or without inserts or single and or double-sided tooth configurations at multiple geometrical angles, increased cutting, lower down pressure requirements and less surface tension on cutting-edge results; designed granulation of the soil [soil particle size] or amount of soil granulation can be controlled. Additionally, self-sharpening can be effectuated by controlled, concentrated soil flow. Lessoned soil sidewall pressure [compaction] and subsoil compaction are also enhanced by way of the tooth seriation or tooth fillets. Such constructs of the subject coulter blade result in uses for various soils, products, processing and other applications. Insert seriation or fillet at multiple configurations and geometrical angles of the subject coulter blade maximize soil tooth lodging creating soil flow and specific soil particle size and granulation. Utilizing soil tooth lodging, creates a soil to soil contact lessening blade wear extending blade longevity and bevel and fillet length.

Inserts

The subject coulter blade may utilize or not utilize Inserts according to the applications. Inserts may be of multiple geometrical configurations, sizes, length, depth, width, number of rows and angles [as to the hub or tooth angle, according to embodiments associated with outer and inner or multiple rows. Inserts may be applied, glued, fused, laser cladding, sweated, heat treated, coated or welded, inset [glued, fused, sweated, heat treated, coated, or welded], multiple stamped protrusions, snapped on or twist-locked, pressure fitted or slide locked. Inserts may be utilized on a single side, double side, offset from side to side or multiple geometrical shapes from side to side according to application. Inserts may be used on the subject STI series blades as well as on present and future commercial production blades. The inserts may be comprised of a number of suitable materials, including but not limited to, Hardox, Boron, Tool Steel, Cast, Carbides, Glass, Polymers and multiple metal alloys/compositions.

STI Series Fillet or Gullet

The Fillet may cut material previously cut or uncut by the tooth and releases material in an upward forward motion. The Fillet is a final cutting assurance device. The Fillet may be used in a shallow tooth application and Shallow depth applications [Ex STIP Blade series, Seeding, Planting, Shallow tillage or Tillage]. Final cut or fine cut [Ex Wheat, Green Peas, etc.] applications also contemplate use of the fillet or gullet. Moreover, in high-speed shaft driven applications, the fillet increases cutting processes in a reverse rotation. During rotation, the circumference position or positions of the fillet add area as to the soil lodging effect against the circular or multiple geometrical designs and or multiple angles, thereby generating a rotational force.

Granulation: The Fillet and or tooth design allows soil placement within the fillet area upon entry, and releases stored or placed soil in an upward exiting motion, thereby causing and increasing a soil granulating effect or granulated soil particle size. Granulated soil may be increased or decreased according to fillet geometrical design, plurality, size and or concavity Lessons Soil, Subsoil and Sidewall Compaction: The fillet lessons soil, subsoil and sidewall compaction by allowing soil particle placement in the fillet and tooth area less force is exerted on the soil profile, lessening subsoil and sidewall compaction and soil smearing. Displacement of soil from the leading edge upon tooth entry and blade rotation lessons soil area, soil pressure or volume, thereby lessening applied soil pressure threw continued soil tooth lodging and flow of soil from the cutting edge away from the blade and in a wedge flow, V flow or upward motion.

Lessons Down Pressure Requirements: By allowing Soil particle placement in the fillet and or tooth area, or tooth alternating bevels flow soil in opposing blade engagement directions[in a v formation] utilizing more soil area in 2 directions vs one direction of half the soil volume area, less force is exerted on the soil profile. Displacement of soil from the leading edge upon tooth entry and blade rotation, lessons soil area or volume. Applied soil pressure is thereby lessened through the continued flow of soil from the cutting edge away from the blade, and in a wedged flow or V flow, outward flow and upward motion; thereby down pressure requirements are lessened.

Tooth Profile Maintenance

By utilizing the friction flow effect, tooth integrity and tooth profile throughout the wear cycle of the blade may be maintained by changing the fillet size, angle, position, and geometrical shape. By adjusting soil flow across the tooth profile and controlled concentrated flow through the fillet at the back edge of the tooth profile, normal wear forces operate to maintain tooth geometry and create a sharpening action.

The Insert and Tooth Geometry

As in Soil Granulation-Subsoil Fracture Sidewall Fracture. The tooth geometry [sabre or multiple sabre angles or lengths or geometrical designs, bevel angles, widths or lengths, curved or fillet or gullet bevels, multiple geometrical fillet or gullet designs on backside of tooth, seriation, multiple geometrical designs of fillets or gullets against tooth bevel in forward motion, multiple depths of tooth backside, plurality of teeth] in conjunction with multiple insert angles, multiple insert geometrical designs, insert sizes, widths, lengths, insert plurality, and insert placements on blade, pierce the soil at a geometrical angle in forward motion utilizing the least amount of contact and least amount of time and create a soil shattering and soil lifting effect at multiple angles.

By wedge flow, V flow, the subject coulter blade effectively forces soil away from the front of the blade or flows soil and uses insert piercing action. This results in soil prefractioning at 3:30-5:30 in clock position in the soil at certain multiple angles in forward motion and certain multiple hub to tooth angles, multiple fillet or gullet geometrical designs, insert angles and ratios in forward motion. The insert prefractures the soil; then rotates forward and downward to a rotating 6:00 position, at which time the insert area increases and pulls or lifts soil in a forward, motion in an upward geometrical angle towards the hub center point. This causes subsoil fracturing at the base or tip of the tooth, sidewall fracturing and soil lifting from 0.5" to desired application and soil granulation. Soil compaction is lessened in forward motion by geometrical angles, positions and designs, least amount of contact and least amount of time. This decreases undesired soil clodding, soil compaction, soil ribbons and blade roll [i.e., soil being attached to the blade by soil compaction or force whereby, as the blade roles forward, there is a massive soil lifting effect, resulting in a void, hole or debit lift in the soil profile which is not desired].

Sealing: By granulating and fracturing soil-vs-clodding, the subject coulter blade allows products [for example, NH3, manure, liquid nitrogen, phosphates, volatile products or biological products] to be placed in and under the existing soil profile fractures, in or at horizontal positions without destroying preexisting soil structure, passages or fractures. As a result, the existing soil absorbs, seals, holds and stores products. This avoids creation of subsoil and vertical sidewall compaction and a sealed environment, wherein products may not be able to proliferate into or through the soil profile and volatilize into the atmosphere or runoff into undesirable areas. This concept makes the subject STI series blade EPA and DNR friendly. Granulated soil increases fertilizer and or product efficiency, increases soil to seed contact for better seed germination, increases application options of no-till, minimum till, cover crop, green planting inter-seeding and reduces moisture losses.

Least Amount of Contact—Least Amount of Time

The subject STI series blade predominately only has soil contact on the outer circumference of the blade, which includes the tooth geometry and or inserts with or without. This lessens friction and time of friction by soil contact or amount. By limiting blade pinch [soil contact and side force or side forces of the blade], surface contact area is lessened substantially. Alternating beveled teeth cause a wedge flow, V flow, or outward flow of soil or soil displacement in the front edge of the blade, thereby lessening soil area, amount of soil contact, amount of compacted soils and amount of time. Soil flow from the tooth to the insert in a wedge motion, relieves contact against blade side surface or side surfaces and duration of soil/blade contact.

Seeding Blades: STP or STI Series—Multiple Geometrical Tooth Configurations

Seeding Blades: Maximize Blade Rotation by means of fillet and tooth design and lessen sidewall blow out and sidewall smearing and blade roll, preventing soil push and plug of seeding devices. Seeding blades configured in accordance with the present invention can cut light or heavy residue, wet or dry residue [GMO materials], multiple massive root systems green or dry, cover crops green or dry and double cropping. They can allow multiple seed types, multiple seed placements at multiple depths, multiple applications and multiple geometrical configurations at slow or high speed in multiple soils and multiple soil challenging conditions, eliminating the need for extra tillage passes, forward coulters [i.e., no till coulters]. multiple geometrical configurations for present and future planting, transplanting or seeding units are contemplated [for example, planters, drills, air seeders, inline planting, vertical planting designs, transplanters and the like]. Seeding Blades are also contemplated by the subject coulter blade invention to maximize a moist granulated soil-seed covering effect for early germination. Fracturing sidewalls lessen subsoil compaction and soil profile preservation, maximize early and late root development, nutrient uptake and moisture management through soil granulation and soil sealing, eliminating the need for spike, finger or aftermarket closing devices. The variable tooth coulter blade described herein may also be configured as a seeding blade.

Inline Seeding and Inline Product Placement

The STI series uses a concentrated Sabre Tooth shape in an exemplary embodiment. Beveled or cupped bevel tooth configurations may also be utilized. Using friction and force in forward motion, actual consistent rotation, the least amount of contact and least amount of contact time results. Variable geometrical angled teeth and configured seriation or multiple tooth fillets or gullets according to angle or angles in forward motion may be used. The attributes of the tooth allow a slicing motion as well as a chopping motion. The cupped or curved tooth lessens down pressure requirements and allows for increased and more aggressive cutting action. The STI series have an increased or longer tooth area-vs-the blade circumference area, thereby allowing up to 50% more shearing and cutting action per revolution of the blade-vs-linear distance traveled. The subject coulter blade maximizes blade rotation via fillet and tooth design and lessens sidewall blow out and sidewall smearing and blade roll, preventing soil push and plug of seeding devices. The variable tooth coulters described herein can be used to cut light or heavy residue, wet or dry residue [GMO materials], multiple massive root systems green or dry, cover crops green or dry and double cropping. They can allow multiple seed types, multiple seed placements, at multiple depths, multiple applications and multiple geometrical configurations at slow or high speed in multiple soils and multiple soil challenging conditions, thereby eliminating the need for extra tillage passes, forward coulters [no-till coulters]. Multiple geometrical configurations for present and future planting are contemplated, including transplanting or seeding units. [Examples include planters, drills, air seeders, inline planting, vertical planting designs, Transplanters and the like].

The subject STI series blade allows for seed placement directly behind the blade, via seed tube devices or apparatus, along with conventional closing devices or geometrical designed closing devices. The STI series maximize or enhance inline seeding placement and product placement by maximizing soil granulation, decreasing sidewall compaction and sidewall fracturing, moisture retention, decreasing subsoil compaction, enhancing furrow forming at low and high speeds. Maximizing moisture and granulating moist soil on or around seeds, enhances seed germination. The STI series blade allows product storage, sealing, and enhanced proliferation through the soil profile.

Single or bidirectional bevel tooth and fillet or gullet flows soil upon entry in a wedge flow, V-flow, outward flow away from the blade, thereby lessening soil area, soil contact, compacted soil contact and subsoil compaction in forward motion. The inserts pierce the soil at a geometrical angle in forward motion of the coulter blade; this results in the least amount of contact—least amount of time and decreased friction. By soil lifting and fracturing the subsoil and soil sidewalls, the seed or product zone is composed of fine or moist granulated soil, allowing enhanced seed germination and placement or product placement and/or the application of conventional or geometrically designed closing devices.

Soil Prefracture

The variable tooth concave coulter blade's teeth and/or inserts, granulate and prefracture, lessening normal slabbing and normal clodding caused by normal soil compaction in forward motion, normal down pressure and normal lateral movement. As the soil exits off the concave blade, the inserts further lift and granulate the ribbon and sidewall or ridging effect. Whereas on the opposite lateral side, the soil is normally compacted by down pressure and lateral forces creating a sub-soil ridging effect and lessening the optimal seeding conditions as to creating planter row unit shock and poor stands or simultaneous dry soil pocket's in between soil ridges lessening or preventing seed emergence the inserts are used to pierce the soil sidewall or ridge in forward motion, fracture soil, lift soil and granulate soil sidewall or ridge thereby lessening undesired compaction, sidewall ridging or planting challenges left in the soil.

Non-Insert Blades

The subject coulter blade structure results in concentrated force and friction in forward motion. Multiple fillet designs on the blade teeth and/or the gullet (or fillet) act to flow dirt. Tooth and/or fillet designs include, for nonlimiting example, Inside bevel, Double bevel, Triple bevel, and/or one or more bevels.

Inside Bevel

Utilizing an inside bevel creates a joint turn effort between both seeder and blade assemblies, such as true V blade assemblies, as to a centered or aligned seeder blade unit. With this configuration, both blades align at the center point or rotational axis, thereby maintaining joint rotation, lessening soil and stubble pushing, subsoil, side wall and surface compaction, soil smearing, unit plugging and pre-mature wear. Utilizing an inside bevel lessens inside stubble and root wrap. The inside bevel lengthens joint blade contact during shallow planting applications and lessens or prevents cut and uncut stubble or roots from attaching to the inside of the blade. In addition, the inside bevel prevents lodging of stubble and roots into the rotational point, unit inside scrapper or seed tube guard and seeding tube or seed delivery device. This unwanted lodging results in lessening or preventing blade rotation. Preventing or lessening seed tube or seeding delivery plugging and seed spacing or depth misplacement. Furthermore, the inside bevel allows using thicker blade materials. Advantageously, the inside bevel allows utilizing thicker material with the same or less down pressure requirements. Also utilized in off set and large and small blade combination in a centered axis application. Centered axis and offset applications are provided wherein the point of tooth intersects other blade's fillet—one blade is the lead blade and one is the trailing blade. Offset linearly same horizontally: Offset—blade area engagement—first blade breaks soil and second blade increases width of penetration.

Utilizing thicker materials results in increased blade longevity. Thicker materials increases blade rigidity and lessens blade deflection, improving and maintaining blade to depth wheel contact and seed trench or furrow formation and true furrow form utilizing OEM closing devices Utilizing a U-shaped furrow bottom (versus a V or W shaped furrow bottom) prevents seed lodging and allows or improves the use of soil to seed contact devices, thereby improving soil and stubble removal from blade. Additionally, the U-shaped furrow bottom also preventing and lessens soil and stubble build up between blade and depth wheel that would otherwise cause row plugging, bending and row unit failures and uneven depth control.

The inside bevel allows consistent shearing and scissor action during joint blade rotation and tooth exchange. Joint blades can be joined to mate as a precision fit similar to scissors or shears as blades rotate. The inside bevel allows the joint blades to mate as a precision fit to allow scissor or shearing action during rotation of blades. This allows multiple sized blades, multiple sized tooth designs, multiple or different blade rotation speeds of the jointed blades and multiple shaped tooth designs in multiple configurations. The inside bevel allows jointed blades of different sizes to rotate at different rotational speeds and different tooth sizes, creating shearing or scissor actions during tooth exchange.

In conjunction with multiple blade sizes and tooth designs, the inside bevel creates superior cutting, shearing or sizing action in multiple applications, such as No-Till, Cover crop, Green Planting, Bt stubble, stripper stubble, minimum till, strip till, soft soils, moist stubble, peat soils and conventional till.

It has also been found that the inside bevel allows offset blade configurations in a centered axis blade application. The inside bevel allows multiple sized blades on a centered axis with lessened instances of pre-mature blade failure. It allows offset blade and standard blade configurations in a centered axis blade application with standard OEM blade thickness, lessening down pressure requirements, lessening soil push in forward motion, and lessening subsoil, sidewall and surface compaction. Through use of the inside bevel, a lead and trailing blade configuration on a centered axis application is provided, utilizing different blade diameters.

Additionally, the inside bevel allows precision soil lodging or soil flow. The inside bevel in a centered joint blade application allows precise tooth soil lodging or loading, by the opposing blade tooth monetarily holding soil as a wall or backing plate, preventing soil from passing through the tooth, thereby flowing soil to the exit point of the blade when the tooth exits the soil profile.

A triple bevel provides the previous functional advantages, and decreases blade stubbing, extending bevel and fillet longevity or service life as blade diameter decreases. The third bevel inside diameter of the outside bevel diameter, relieves soil flow on the first outside diameter bevel, causing an increased soil to metal erosion force on the inside of the outside bevel, thereby maintaining bevel length for longer service life as the diameter of the blade wears.

Negative Concavity

Negative Concavity has been found to increase soil flow, soil lifting, soil fracturing while lessoning down pressure requirements. Utilizing a negative out-side diameter concavity allows tooth shearing or cutting, increased soil lodging or soil flowing actions similar to the inside bevel and tooth construction. Negative tooth concavity angles as flat centered hole blade concavity and or outer diameter concavity, tooth or blade bevel area, increases soil lodging or soil flow by forcing more condensed soil into the tooth structure.

Negative concavity angles increase soil lifting as the increased tooth load angle rotates past the 6:00 position and exits the soil profile. It increases soil fracturing by increased lifting load angle and forced condensed soil lodging into the tooth structures from soil entry until soil profile exit. Utilizing soil lifting forces as a down pressure counter force, negative concavity angles require less down pressure requirements. Forming a negative outer diameter angle on a straight or slight positive angled blade creates a lifting force counter acting the down pressure force. Negative concavity angles create more blade to depth wheel area contact in seeding units, thereby increasing soil and stubble removal from blade, flowing and returning more soil into the seed trench or furrow and lessening or preventing row unit plugging and Creating a wider U furrow Tooth Designs Tooth designs increase cutting length, holds and positions residue, creates shearing or scissor action, maintains bevel and fillet, and creates concentrated force and friction in forward motion. These structural advantages maintain or increase tip speed utilizing higher percentages of rotation. Multiple tooth structures on the blade circumference increase linear circumference by creating an uneven or disruptive plain or pattern. For example, traveling through a mountain requires less linear footage than travelling over or around the mountain. Tooth structure and arrangement may increase linear circumference by about 1-50%, thereby increasing cutting length.

Multiple tooth designs and angles create multiple uneven, countersunk, disruptive, recessed and or negative linear plain angles or voids. Multiple or disruptive negative angled plains allow residue positioning or holding as a momentary loss of contact in forward motion, thereby allowing the negative plain to trap or position stubble or residue. Such a configuration is more advantageous than round plains or circumference, which maintain contact without negative or disruptive plains, causing or creating stubble push.

Mated or unmated tooth designs in centered or jointed blade applications create rotational and or non-rotational shearing or scissor actions during rotation. Shearing or scissor actions result from the subject blades multiple tooth structure during rotational tooth exchanges of multiple tooth designs and blade sizes.

Multiple tooth designs implementing the saber and/or negative sabre or straight tooth result in concentrated force. Multiple tooth designs in forward motion, rotational motion and rotational forward motion create friction. By utilizing certain axis angles in forward motion, concentrated forces and friction increase substantially, thereby creating concentrated force and friction in forward motion, substantially increasing cutting and or sizing of cellulose, residue, stubble and multiple cutting or sizing efficiency. Multiple tooth designs herein are configured to increase blade rotation. These multiple tooth designs include lodging soil in the tooth profile and or fillet, and/or utilizing back edge-driven tooth structures [sharpened and un-sharpened] as a driving rotational force. Such back edge-driven tooth structures are preferable to smooth massive side blade contact and or contact area to drive rotation, as the latter tend to cause soil pushing and sliding of the blade.

Fracturing and Flowing Soil into a furrow and on top of placed seed increases seed to soil contact and early even emergence. Multiple tooth designs lodge and release or Flow soil, returning moist granulated soil on top of placed seed, increasing soil to seed contact and moisture to seed transfer. Germination and even emergence are increased and expedited substantially in multiple soils, multiple weather conditions and multiple management choices or applications, such as No-Till, Cover crops, Green Planting and minimum or full till conditions.

Multiple tooth designs lodge and release or Flow soil, maintaining moisture nutrient transfer and capillary action without causing sidewall, subsoil and surface compaction, or stopping or lessening moisture nutrient transfer and capillary action.

Multiple tooth designs lodge and release or Flow soil and create a sidewall fracturing and or lifting effect from furrow bottom to furrow top, increasing early seminal root development, early primary root development and early root proliferation. Such multiple tooth designs maximize moisture nutrient uptake for consistent and maximum yields. In addition, they lessen or substantially prevent late or uneven emergence, stagnated or lessened primary and or secondary root development and or rootless plant syndrome.

Multiple tooth designs lodge and release or flow soil and create a sidewall fracturing and/or lifting effect from furrow bottom to furrow top. Such multiple tooth designs maximize—compacted or loose soils, allowing factory or multiple closing devices to obtain or better obtain soil to seed contact with less down pressure requirements. Sidewall compaction is reduced, capillary action is enhanced and early as well as late root development is improved.

Figure 1:
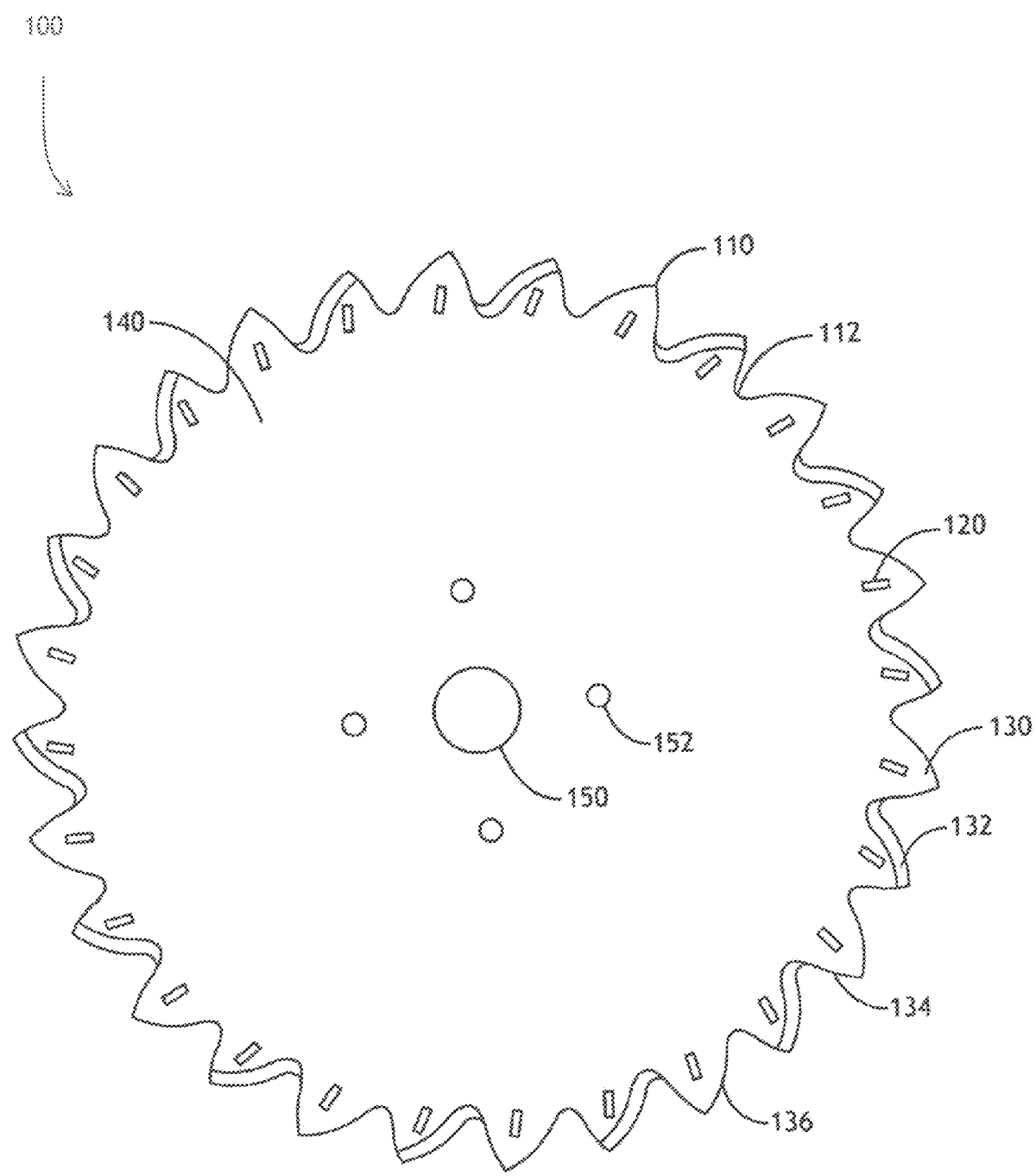
FIG. 1 is a diagram of a coulter blade with sized inserts exemplary of an embodiment of the present invention.

Referring to FIG. 1, a diagram of a coulter blade with sized inserts exemplary of an embodiment of the present invention is generally shown at 100. A circular coulter blade 140 exemplary of the present invention may include a plurality of teeth 110 each tooth 110 having a tooth cutting edge 136 and tooth back 134. Between each tooth 110, a gullet 112 may retain specific qualities for tooth effectiveness. In embodiments, each tooth 110 is sharpened on opposite and alternate lateral sides 132, 130 to effectively eliminate lateral sidewall pressure as the circular coulter blade cuts the soil. In embodiments, the circular coulter blade 140 may be configured with a plurality of inserts 120. Preferably, the subject coulter blade with sized inserts uses a concentrated saber tooth shape as shown generally at 130. A beveled or cupped bevel tooth construct, as shown at 132, may be provided for cutting, sizing, slicing, shredding, mowing and processing soil and stubble.

In one embodiment, the circular coulter blade 140 is detachably mountable to a tillage machine capable of mounting and operating many coulter blades 140. Coulter blade 140 may be detachably mountable to the machine via blade hub 150 and drive holes 152. It is contemplated herein that a bearing or other well-known rotatable device may allow for free rotation of the coulter blade 140.

Rotation of the blade is preferably from right to left with the sabre shape of the blade cutting edge 136 impacting and cutting the stubble on the surface of the soil. As inserts 120 enter the soil, the rotational action of the inserts 120 may fracture and bring to the surface an amount of soil with which the insert 120 may interact. Additionally, soil proximal to the insert 120 may also be fractured and brought to the surface due to energy transferred from the insert 120 to the adjacent soil.

Figure 2:
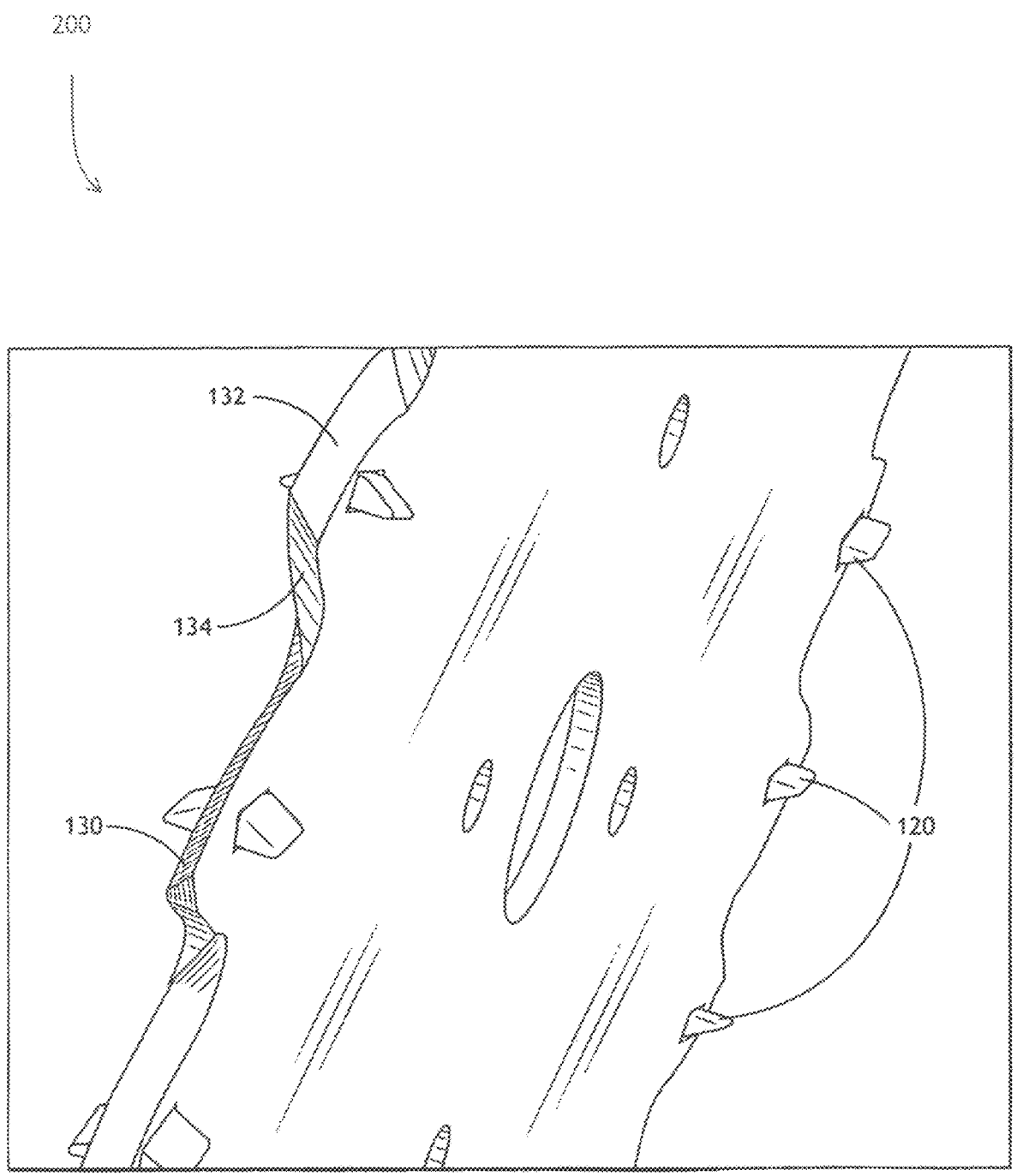
FIG. 2 is a detailed diagram of a coulter blade with sized inserts exemplary of an embodiment of the present invention.

Referring to FIG. 2, there is shown a detailed diagram of a coulter blade with sized inserts exemplary of an embodiment of the present invention generally shown at 200. Sized inserts 120 may be clearly shown extending laterally from the circular coulter blade. Teeth 110 sharpened on a first lateral side 132 are adjacent to teeth 110 sharpened on a second lateral side 130. Tooth back 134 may help drive rotation of the coulter blade 140 as it interacts with the soil.

Figure 3:
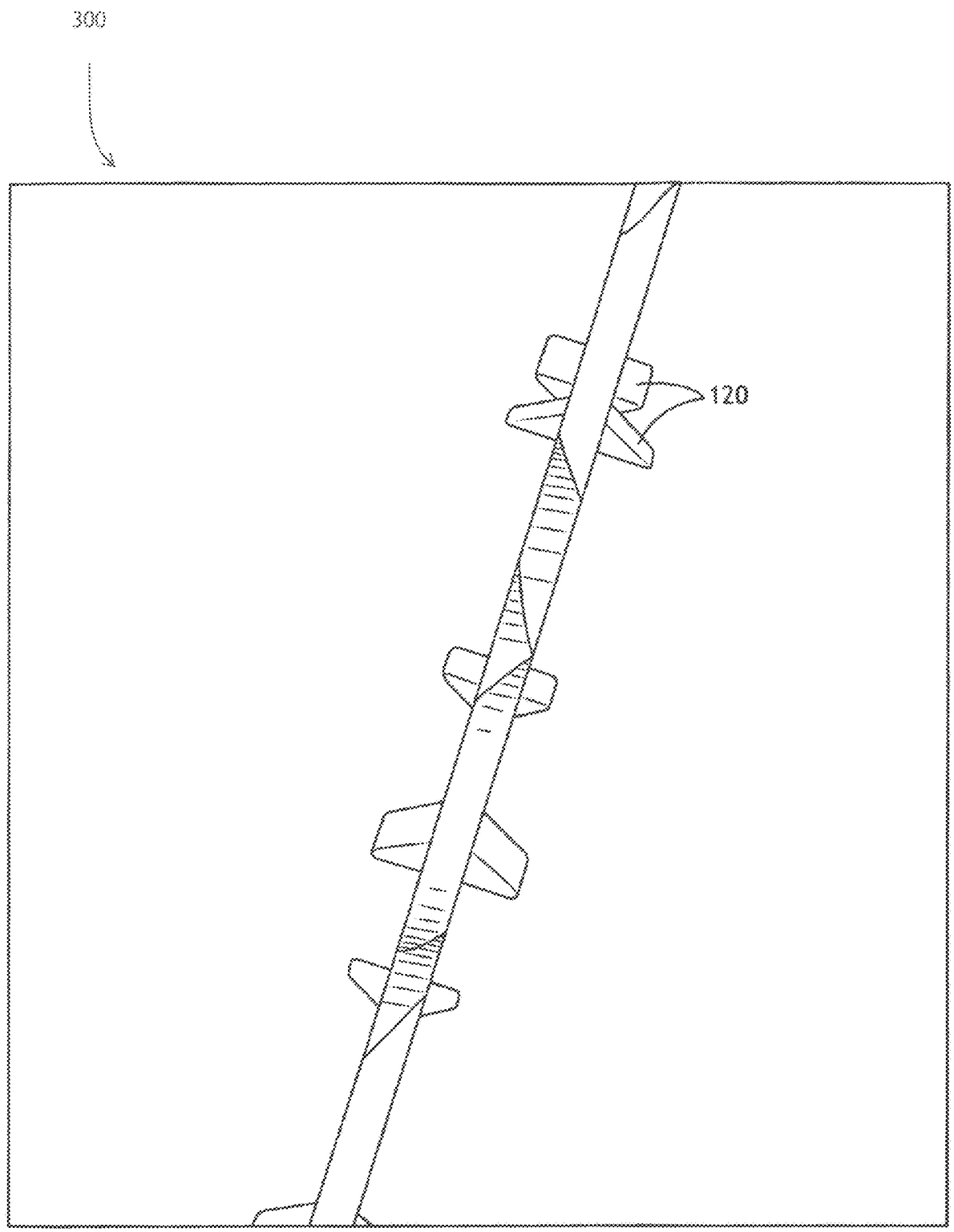
FIG. 3 is a detail side view diagram of a coulter blade with sized inserts exemplary of an embodiment of the present invention.

Referring to FIG. 3, a detail side view diagram of a coulter blade with sized inserts exemplary of an embodiment of the present invention is generally shown at 300. Inserts 120 may extend laterally from the coulter blade 140. The shape of inserts 120 may depend upon the compaction and moisture level associated with the soil type of intended interaction. Shaped inserts 120 may be seen protruding from opposite sides of the coulter blade 140. Preferably, tapered inserts 120 of variable size may be incorporated to manipulate a desired amount of soil.

Within the scope of the present invention, coulter blade 140 may be constructed of a variety of material suitable for structural integrity while embedded in the earth providing earth aeration. In one embodiment, a coulter blade 140 of the present invention may be constructed of hardened steel such as that manufactured as "Boron."

Skilled artisans will recognize embodiments of the present invention may be manufactured from a variety of materials capable of abrasion resistance, long wear under stress, and able to be formed to the shapes required herein.

Variable sized inserts 120 placed proximal to the teeth 110 of the coulter blade 140 interact with the soil allowing the coulter blade 140 sidewall to remain nearly free from soil contact. As the coulter blade 140 rotates, each tooth 110 cuts into the soil and each insert 120 enters the soil at the desired angle. As the coulter blade 140 rotates, the insert 120 also rotates about the blade hub 150 and penetrates the soil. This insert 120 rotation and translation causes the soil with which the insert is in contact to become fractured and moved. As the blade hub 150 translates in a forward direction, the teeth and inserts 120 rotate about the hub causing the inserts 120 to lift soil to the surface. Depending on the depth of the coulter blade 140, the insert 120 rotational interaction with the soil may be increased (greater depth) or decreased (lesser depth).

An additional goal of the present invention may include leveling of the soil surface for optimal planting of a crop. In embodiments, the variable tooth coulter blade 140 may interact with the soil where tire tracks have compacted the soil over time. As the teeth 110 cut the stubble and soil, the inserts 120 interact with, aerate and loosen the compacted soil.

A further goal of the present invention may include aeration of the soil with or without removing large quantities of subsoil to the surface. For example, conventional blades may remove large clods or clumps of soil to the surface and may cause an unrecoverable moisture loss as well as undesirable large cavities below the surface. In addition, large clumps or clods of soil may remain unusable for over one growing season. Embodiments of the present invention may be configured to sufficiently aerate the soil with minimum void creation while leaving the soil and root systems intact.

Embodiments of the present invention may enable tillage and aeration of the soil without removal of a previous root system. A previous root system may allow for organisms to breakdown and deposit the remnants usable for the next crop. Embodiments of the present invention may cut the root system without removing the root system from below the surface. This clean cut may allow for temperature movement, for water movement and increased aerobic flow to allow for organic organisms to thrive.

Tooth Size and Shape

Figure 4:
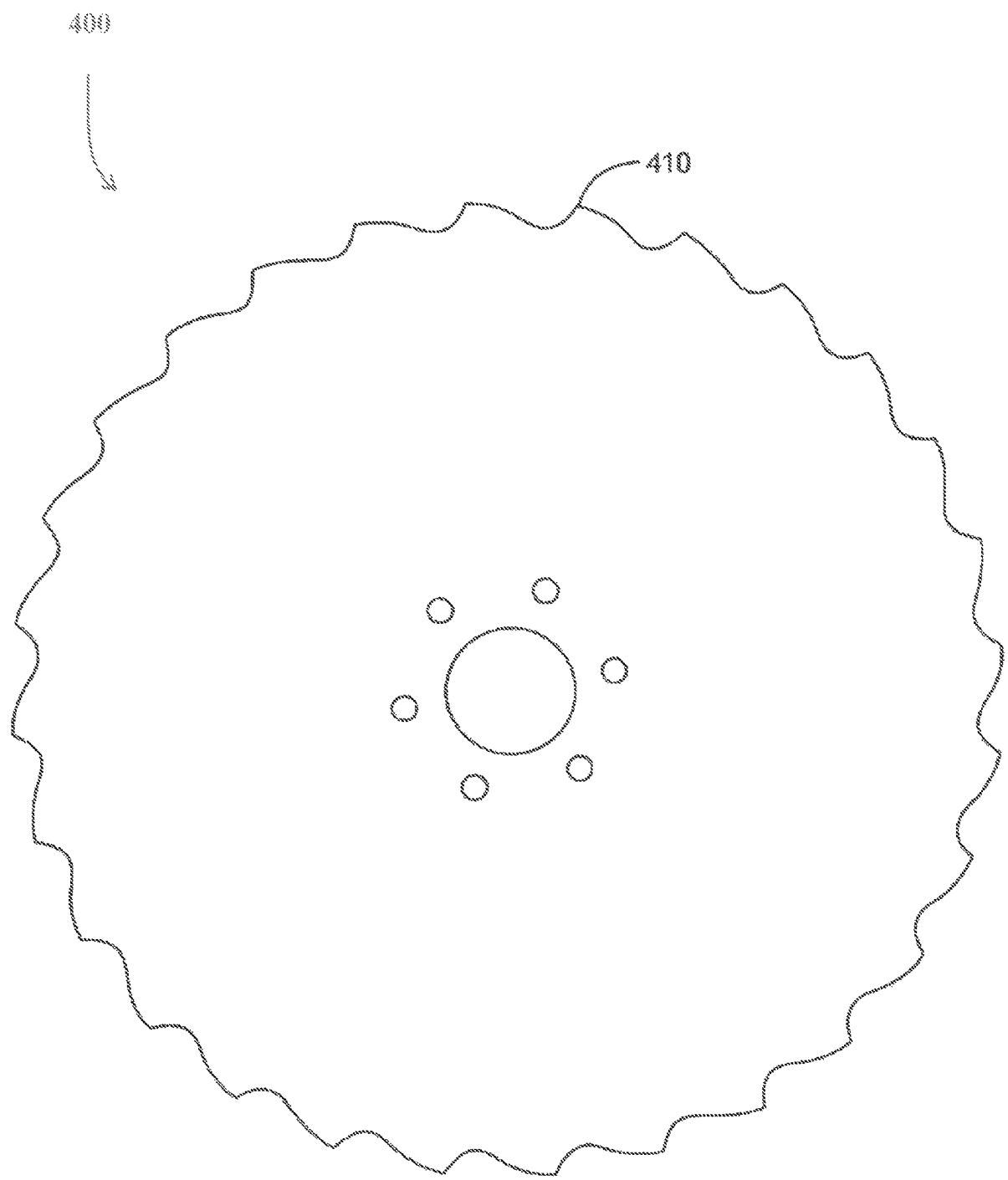
FIG. 4 is a diagram of a 28 tooth embodiment of a seeder blade configured for rocky soil exemplary of an embodiment of the present invention.

Referring to FIG. 4, a diagram of a 28 tooth embodiment Sabre Tooth Planter (STP) seeder blade configured for rocky soil exemplary of an embodiment of the present invention is generally shown at 400.

It is contemplated herein that the size and shape of each tooth may be altered for optimal performance for a particular type of soil. For example, in rocky soil, an operator may desire a shorter backside of tooth 410 enabling the teeth to withstand a rock impact whereas, in sandy soil, an operator may prefer a longer backside on tooth 410 to enable greater stubble cutting while offering optimal soil aeration. The tooth 410 may enable a push of the rock to one side of the coulter blade 140 (see FIG. 1) resisting breakage due to rock impact.

It is further contemplated herein; tooth size and shape may be optimally configured for each of a plurality of soil types encountered by an operator. For example, a coulter blade 140 for rocky soil may possess a specific tooth size and shape, a coulter blade 140 for non-rocky soil will possess a variant of the tooth size and shape. While a coulter blade 140 for peat type soil may be optimally sized for penetration, a tooth for red clay or gumbo may be sized differently. Similarly, a coulter blade 140 designed for wet or dry soil may be optimally sized for proper aeration of the specific type of soil.

Figure 5:
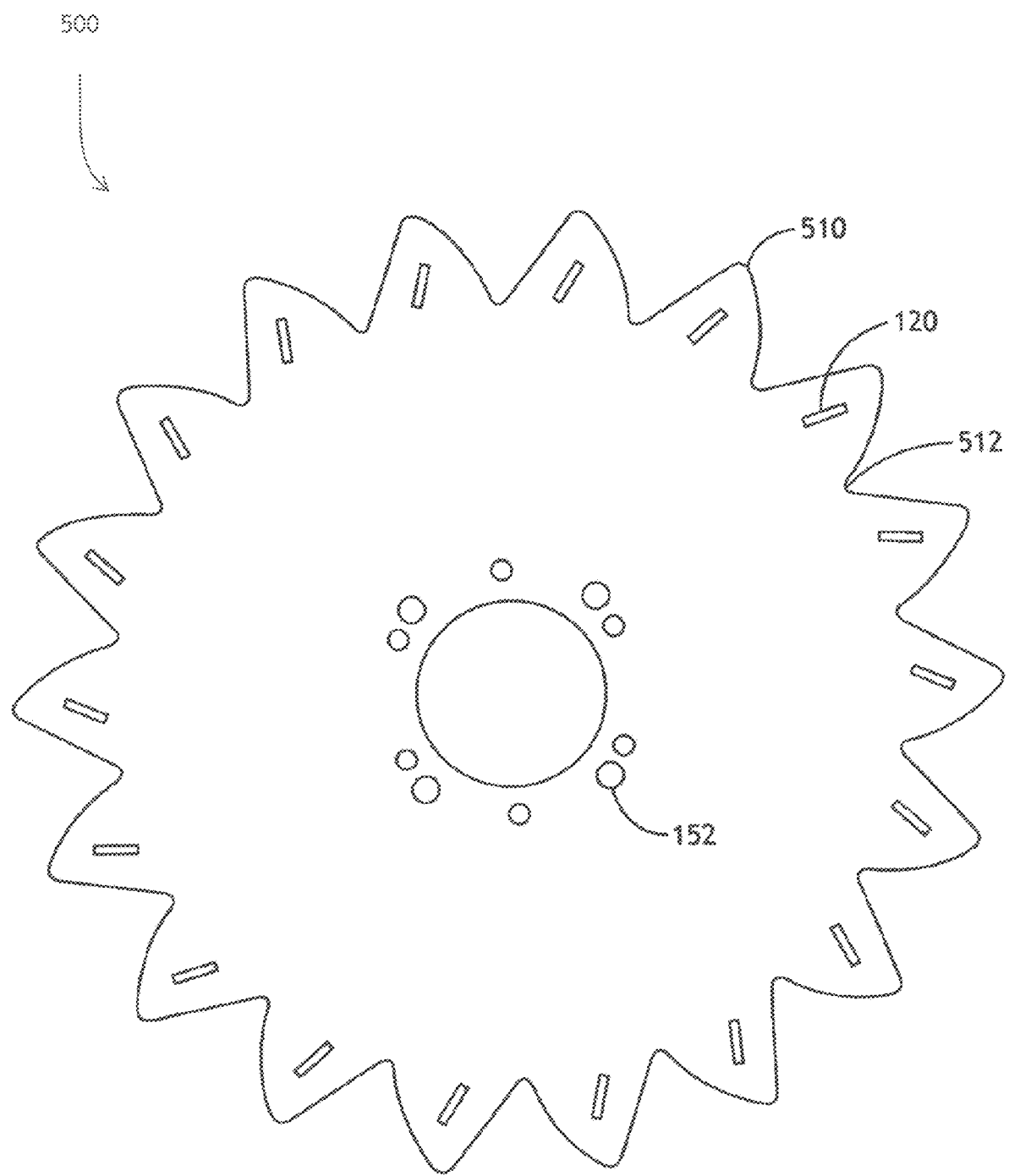
FIG. 5 is a diagram of an exemplary coulter showing 18 long teeth and an insert a variable angle exemplary of an embodiment of the present invention.

Referring to FIG. 5, a diagram of an exemplary coulter showing 18 long teeth and an insert a variable angle exemplary of an embodiment of the present invention is generally shown at 500. An 18 tooth 510 design with inserts 120 may enable specific application in soft soil types. Tooth gullet 512 may be slightly rounded to continue a cut began by the cutting edge 136.

Figure 22:
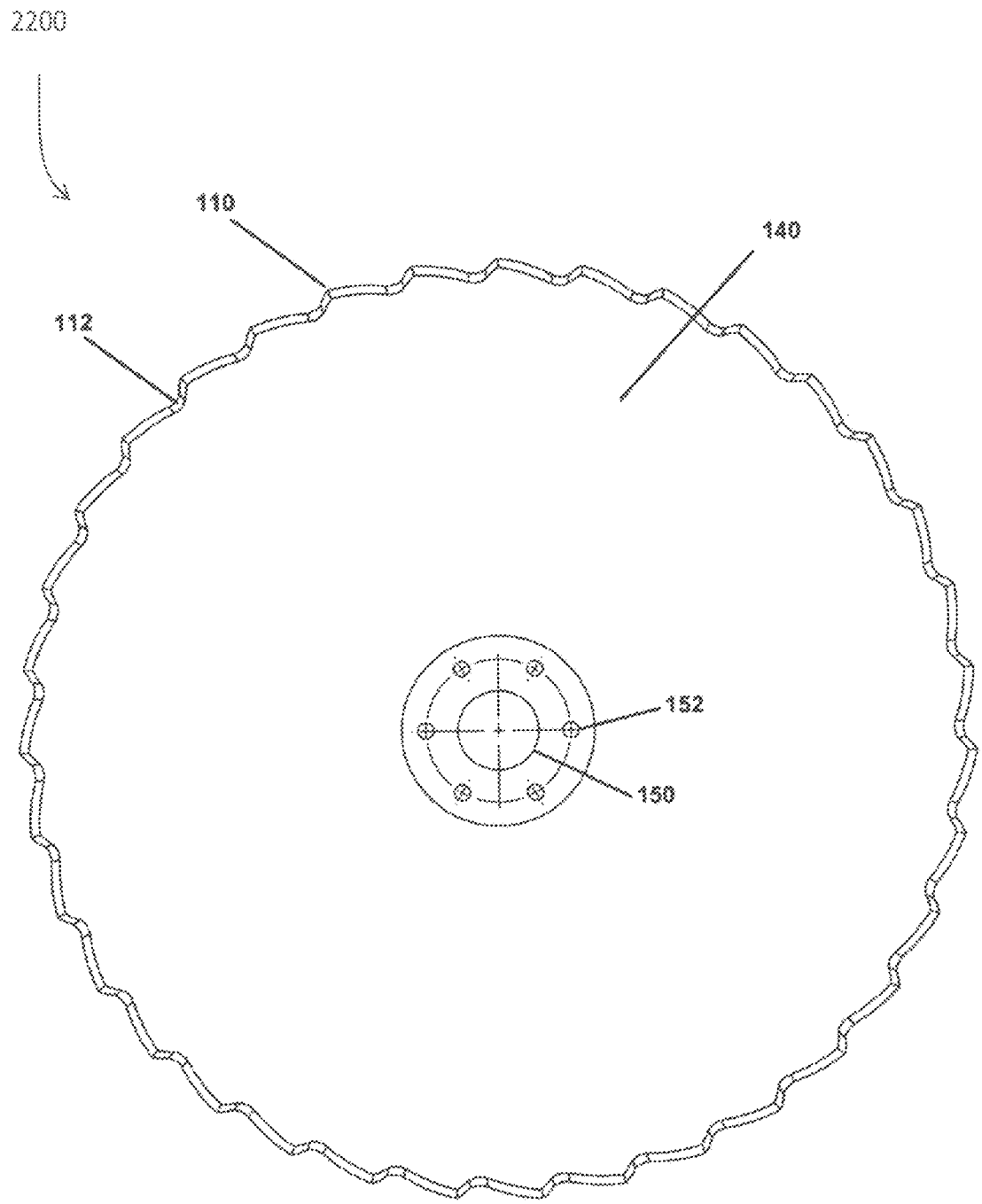
FIG. 22 is a detailed diagram of the Sabre Tooth Planter [STP] seeder and Fertilizer Blade embodiment of the present invention.
Figure 23:
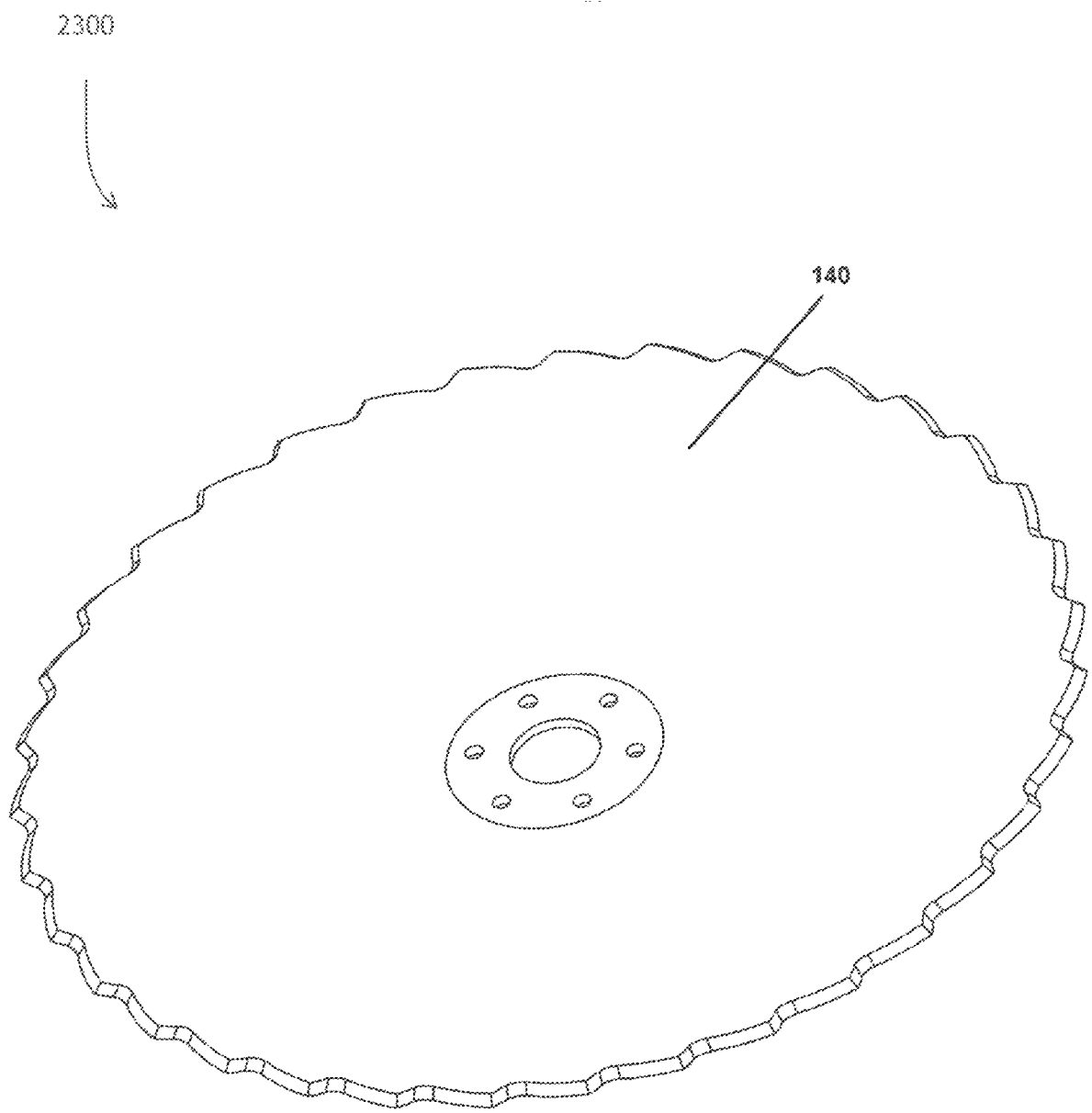
FIG. 23 is a detailed diagram of exemplary of a concaved blade with STP tooth design an embodiment of the present invention.
Figure 24:
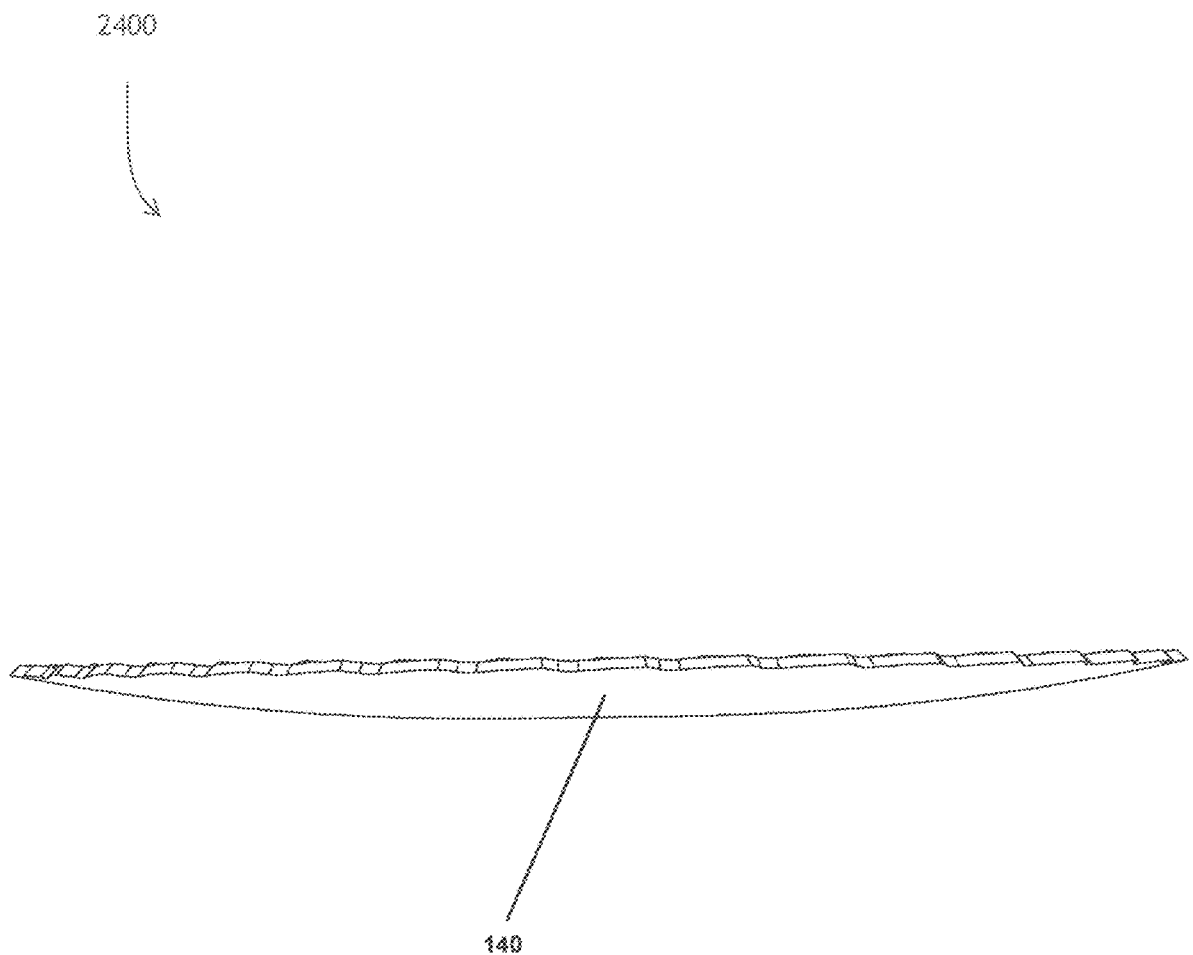
FIG. 24 is a detailed diagram of exemplary of a concaved blade with STP tooth design an embodiment of the present invention.
Figure 25:
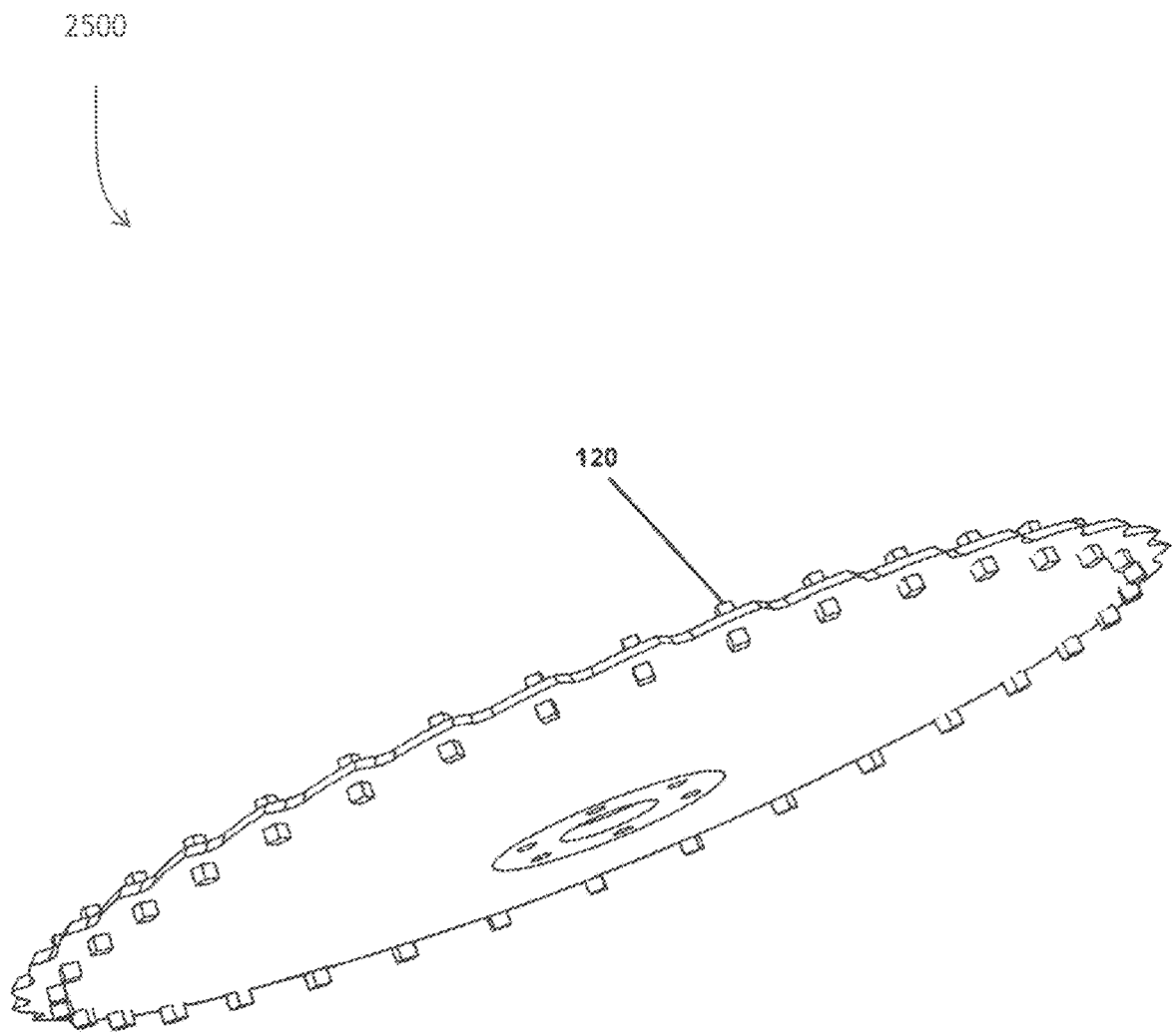
FIG. 25 is a detailed diagram of exemplary insert location and size in accordance with an embodiment of the present invention.
Figure 26:
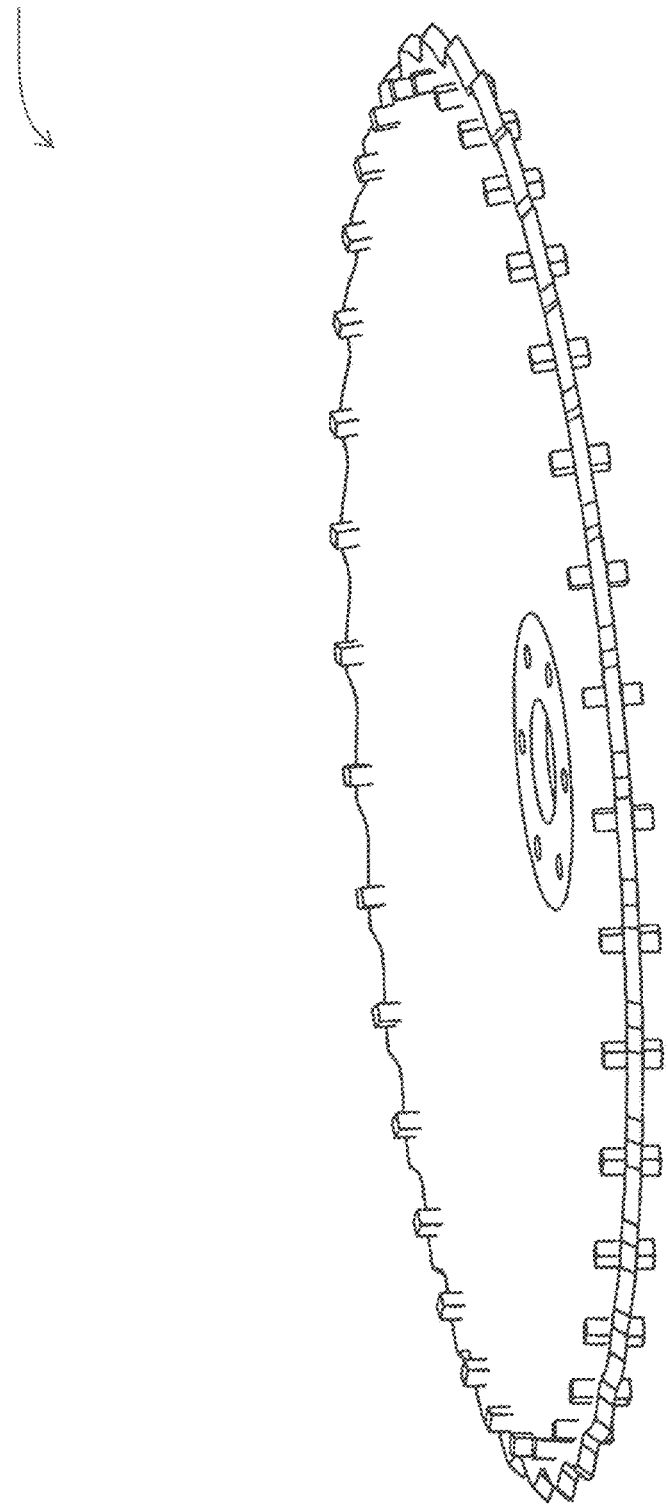
FIG. 26 is a detailed diagram of exemplary concaved blade with insert location and size in accordance with an embodiment of the present invention.
Figure 27:
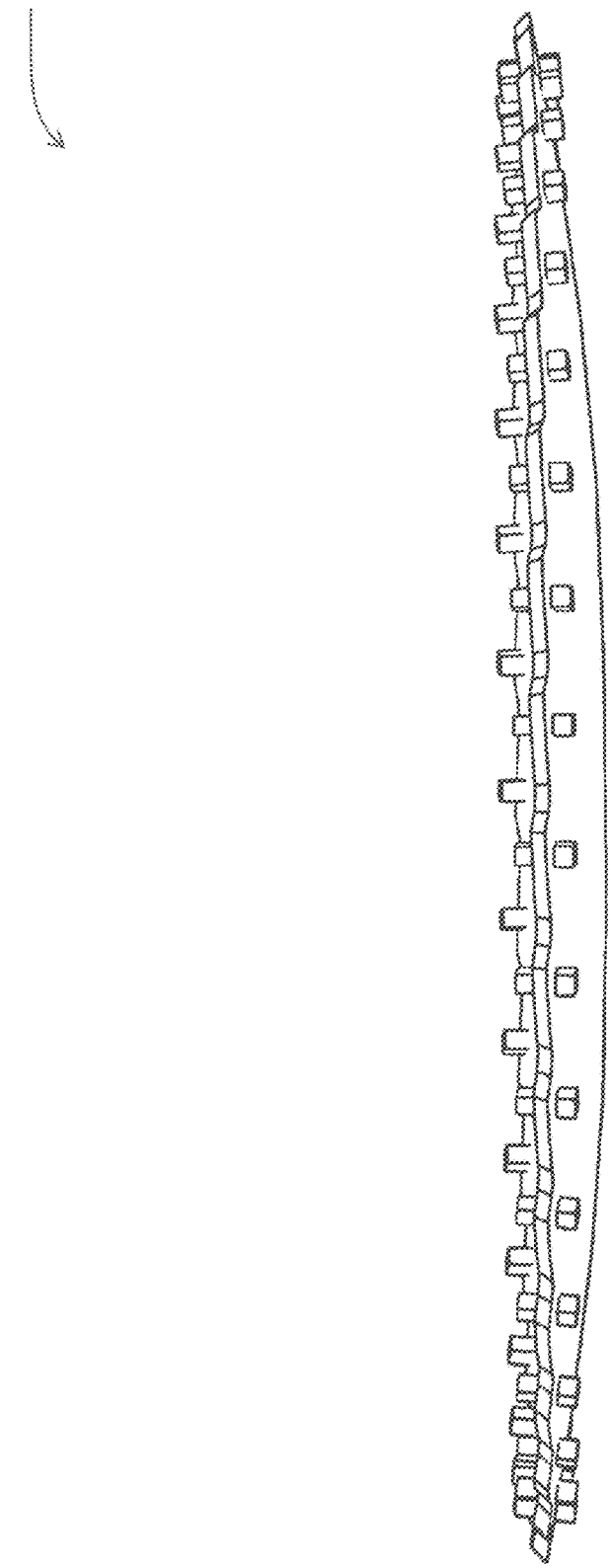
FIG. 27 is a detailed diagram of exemplary concaved blade with insert location and size in accordance with an embodiment of the present invention.

Referring to FIG. 22, drive openings 152 may enable a plurality of applications including detachably mounting to an existing implement. For example, one embodiment of the present invention may replace a pair of disc elements operating on a planter implement to open a planting trench. Embodiments herein may be specifically sized to replace elements currently used in operation.

Tooth Number

Referring to FIG. 1, the number of teeth 110 is sufficient to ensure a cutting edge 136 may impact the soil without leaving surface stubble untouched. More specifically, each tooth begins cutting where the previous tooth enters the soil.

Referring to FIG. 1, the tooth back 134 may be specifically shaped to pull the coulter blade 140 into the soil and maintain the rotation of the coulter blade 140. Much like a water wheel, each individual tooth back 134 provides the drive for the coulter blade 140 to rotate and minimize coulter blade 140 slippage. For example, a flat tooth back 134 may enable the desired drive force to cut the stubble and the soil while a flared or tooth back of increased surface area may enable a greater drive force if required.

In embodiments, the angle of tooth cutting surface may be altered for specific types of soil. For example, in heavy residue soil, the cutting edge 136 of each tooth may be lengthened to enable a pushing action as the cutting edge 136 of the tooth impacts the soil. In embodiments, a longer tooth may efficiently cut GMO stubble more effectively than a shorter tooth. A tooth measuring approximately three inches in length may allow for an efficient cut.

Figure 6:
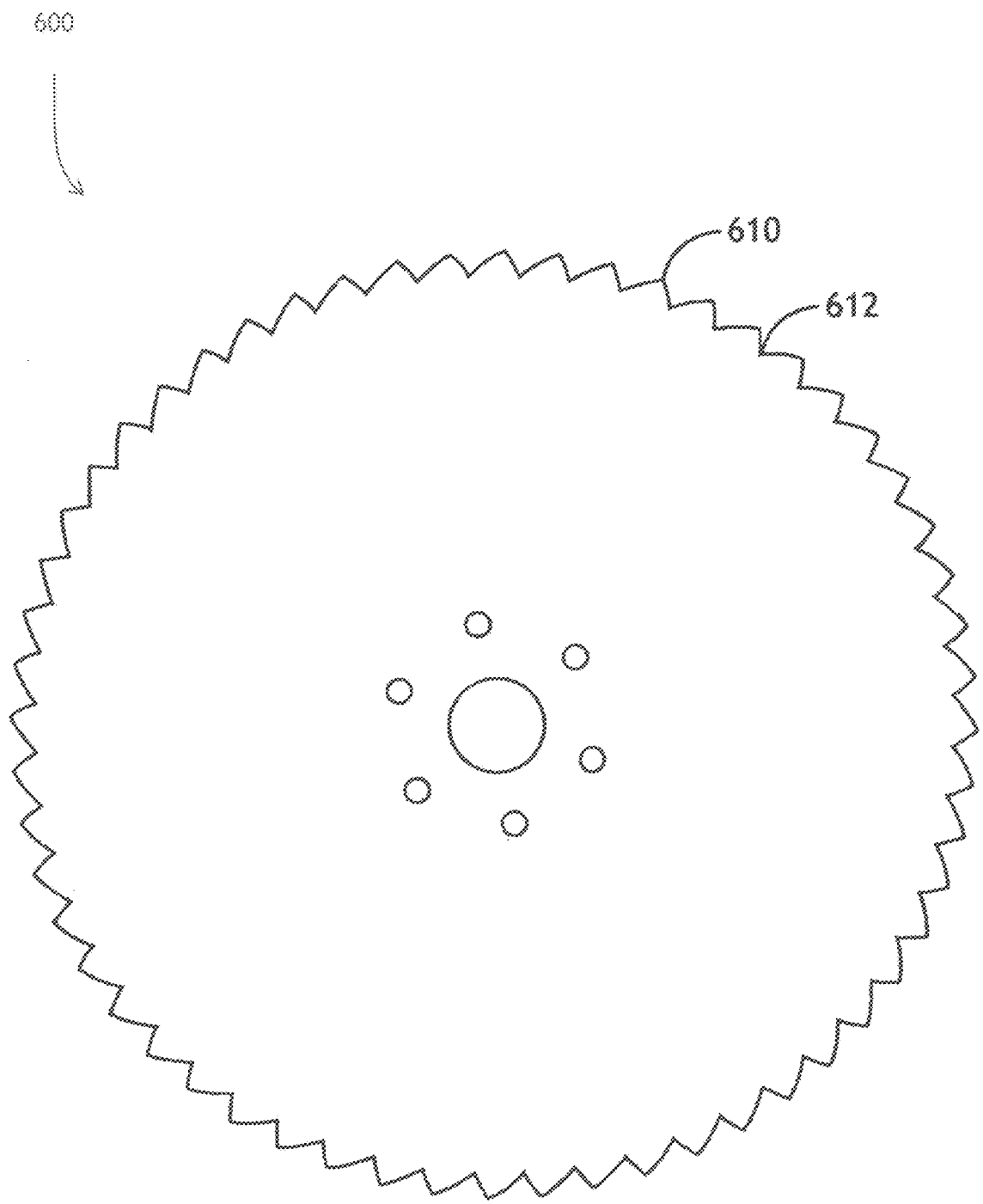
FIG. 6 is a diagram of a 56 tooth embodiment showing a sharp gullet exemplary of an embodiment of the present invention.

Referring to FIG. 6, a diagram of a 56 tooth embodiment showing a sharp gullet exemplary of an embodiment of the present invention is generally shown at 600. In embodiments, a shorter tooth length with increased tooth numbers may enable an operator to achieve the desired tillage effect. The subject embodiment provides a sharpened backside of the tooth. For example, a short tooth 610 with a sharpened tooth gullet 612 may enable an accurate cut of a smaller gauge stubble such as oat stubble or wheat stubble.

Figure 7:
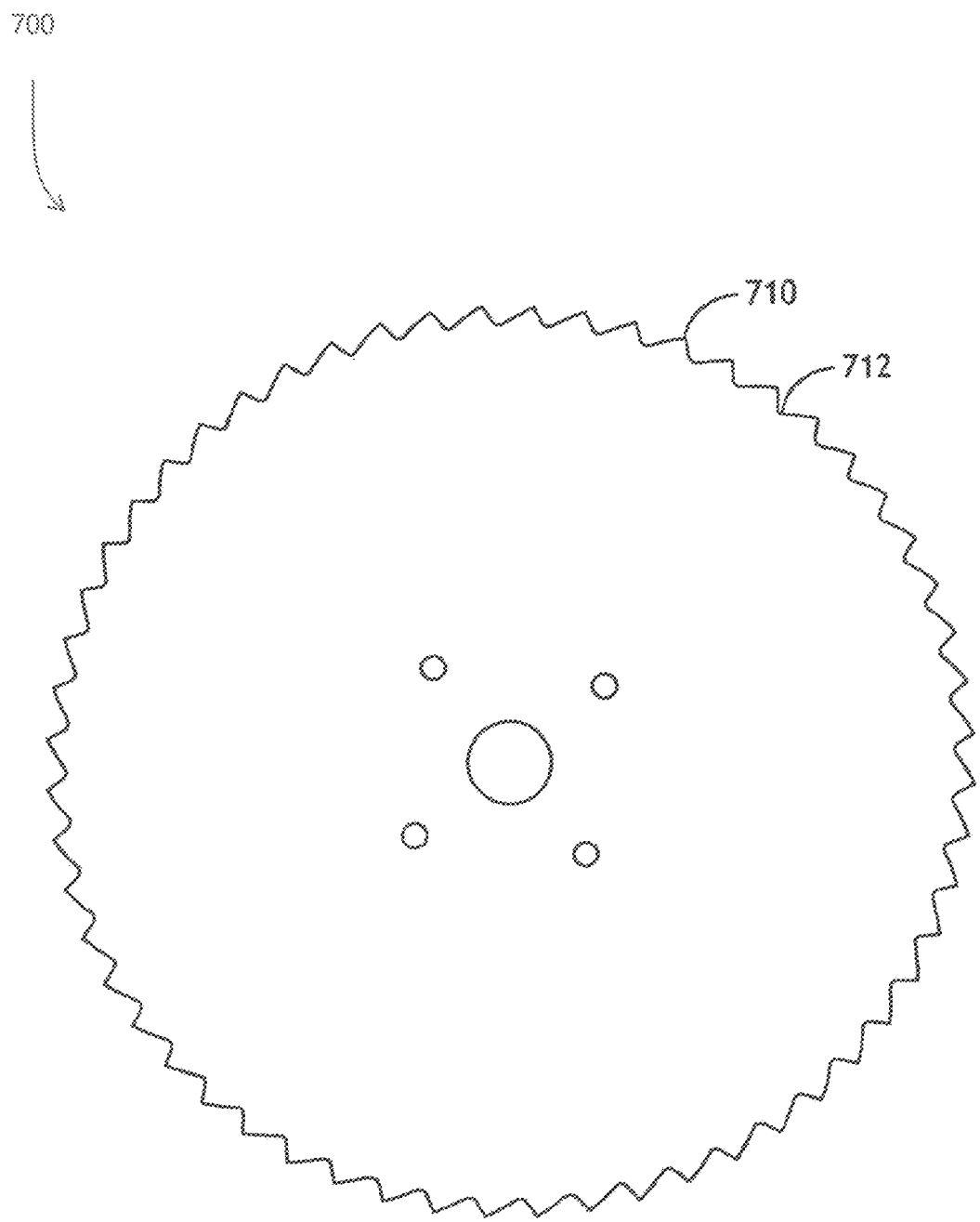
FIG. 7 is a diagram of a 56 tooth embodiment showing a rounded gullet exemplary of an embodiment of the present invention.

Referring to FIG. 7, a diagram of a 56 tooth embodiment showing a rounded gullet exemplary of an embodiment of the present invention is generally shown at 700. In addition, a shorter tooth 710 with a rounded tooth gullet 712 may enable a sharpened tooth gullet 712 for increased cutting edge 136 surface area.

Figure 8:
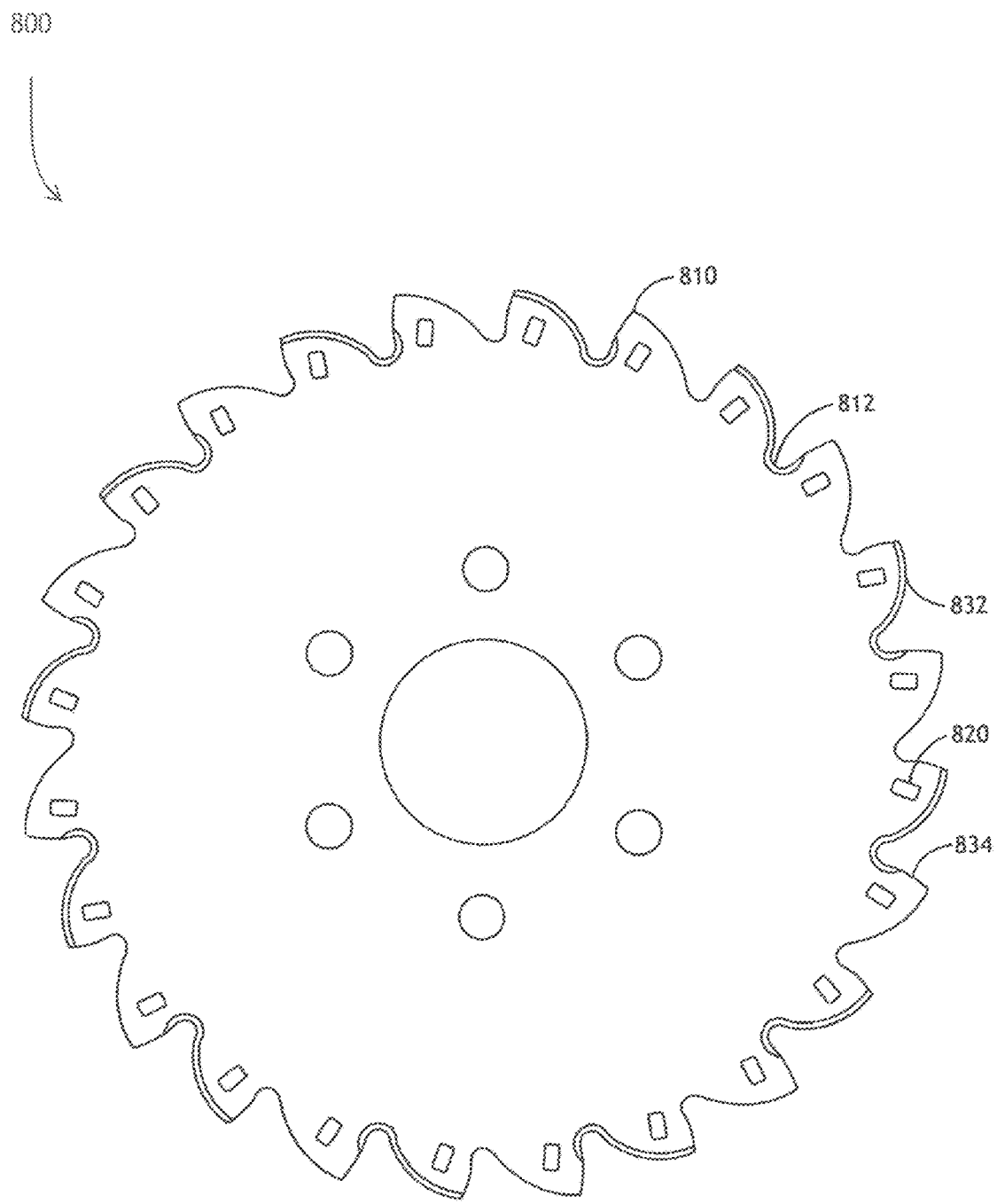
FIG. 8 is a diagram of an exemplary 24 tooth coulter blade with associated inserts in accordance with an embodiment of the present invention.

Referring to FIG. 8, a diagram of an exemplary 24 tooth coulter blade with associated inserts in accordance with an embodiment of the present invention is generally shown at 800. In embodiments, the sabre tooth cutting edge 136 of each tooth 810 may remain unsharpened for optimal performance in specific types of soil. Alternatively, a coulter blade 140 designed for minimum till in heavy soil may be configured with unsharpened backside teeth 810 optimally shaped for desired tillage and aeration. Additionally, a system 800 designed for low Cation-Exchange Capacity (CEC) soil and medium tillage may be optimally configured with teeth 810 shaped for the desired tillage. Additionally, a coulter blade 140 designed for full till/void creation for fertilizer injection may possess tooth 810 qualities and insert 820 size for optimal performance.

Blade Rotation as to the linear distance traveled: The STI series blade rotates up to 96% of linear distance traveled at hub depth or shallow depth. The STI series blade is driven by tooth 810 geometry and inserts 820. The backside of the tooth, shown as a blunt vertical edge at 834, tooth fillet or gullet 812, and the opposing tooth bevel pattern, acts to alternate soil contact pressures utilizing a forward driving force. This configuration and resultant forward driving force also keep the blade in a straight linear motion rather than a side driven motion which would disadvantageously cause massive contact and friction. The configuration of the subject blade also acts to lessen sidewall compaction or pressure, thereby lessening blade friction and allowing easier rotation. See FIG. 1, 130-132-134. Bevel tooth angle or multiple tooth fillets and or seriation also may be provided. As well, a plurality of inserts may be installed in the blade, applied or multiple stamped protrusions to yield inserts 820. These unique novel structural features of the subject STI series blade result in the least amount of contact—least amount of time, so that the subject blade predominately only has soil contact on the outer circumference, thereby lessening friction by soil contact.

In some embodiments, a cutting edge 136 of a sharpened tooth may possess a concave cutting surface as each tooth is sharpened. In other embodiments, a tooth 810 as well as the tooth gullet 812 may be sharpened in an optimal configuration for the anticipated type of stubble. Additionally, the cutting surface of each may be optimally shaped in a sabre or curved shape 832 creating a friction cut as opposed to a pressure cut.

In FIG. 8, travel of the coulter blade 140 may be from left to right where the curved sabre side 832 of each tooth 810 is able to cut surface stubble at an optimum angle as the system 800 is operated at the optimum depth.

A curved cutting edge 832 on each tooth may allow an efficient cut of GMO refuge stubble material. Preferably, each tooth 810 is sized to maintain a cutting surface proximal to the cutting surface of the adjacent tooth. For example, a first tooth may cut a two-inch surface of the soil while the adjacent tooth will cut the next two inches of soil with no gap in cut surface of the soil. Each tooth back 834 may be specifically shaped and adjusted to help pull the coulter blade 140 into the soil and drive the rotation of the coulter blade 140 and minimize coulter blade slippage.

Figure 9:
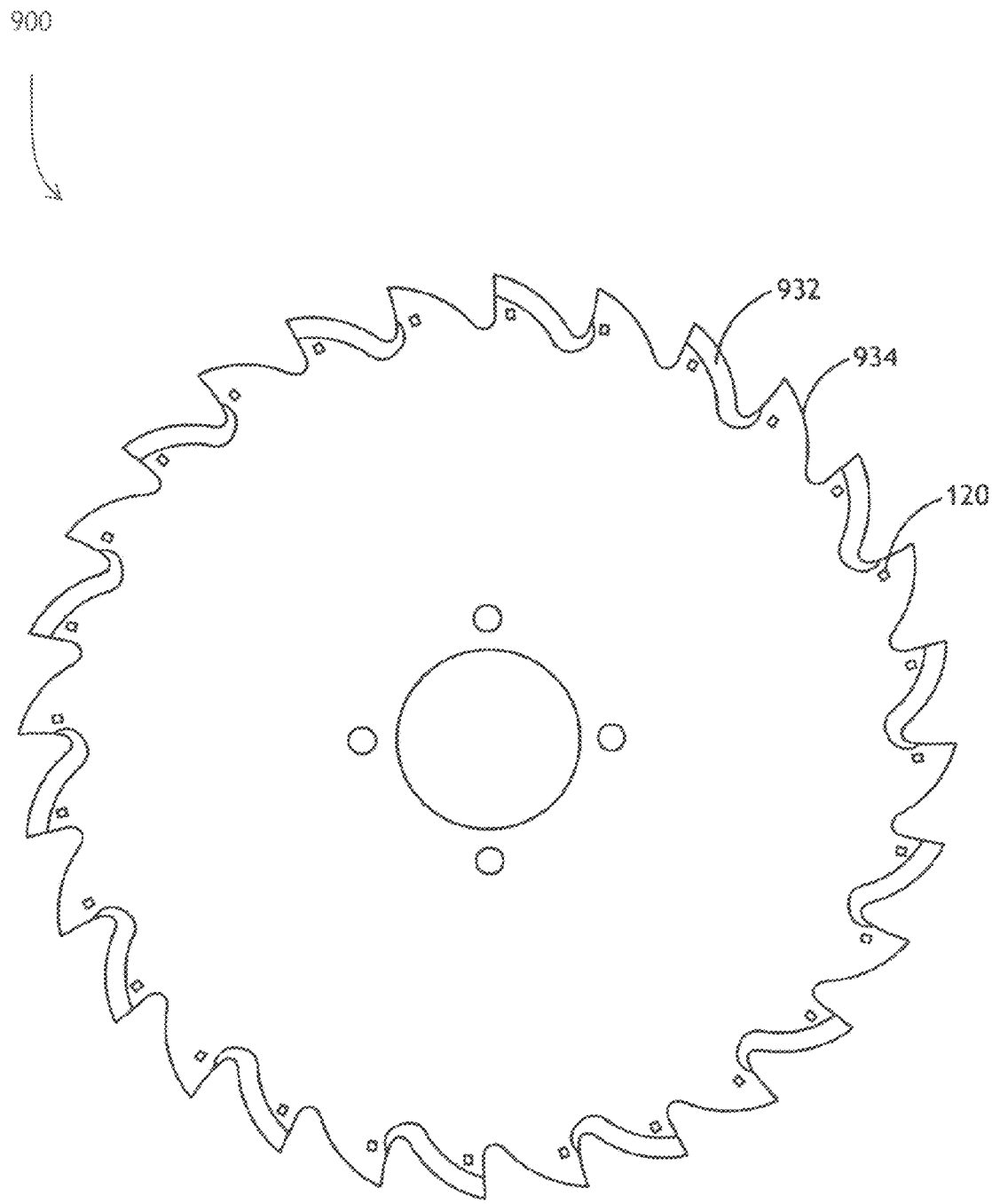
FIG. 9 is a diagram of a blade with associated 28 teeth and 28 inserts in accordance with an embodiment of the present invention.

Referring to FIG. 9, a diagram of a blade with associated 28 teeth and 28 inserts in accordance with an embodiment of the present invention is generally shown at 900. Preferably, adjacent teeth are sharpened on alternating sides/alternating bevels 932, 934 to eliminate sidewall force as the teeth interact with the soil. As each tooth enters and cuts the soil, skilled artisans will recognize the angle of sharpening will create a lateral force away from the sharpened surface. Embodiments of the present invention may offset this lateral force with and opposite lateral force of the adjacent tooth.

Figure 10:
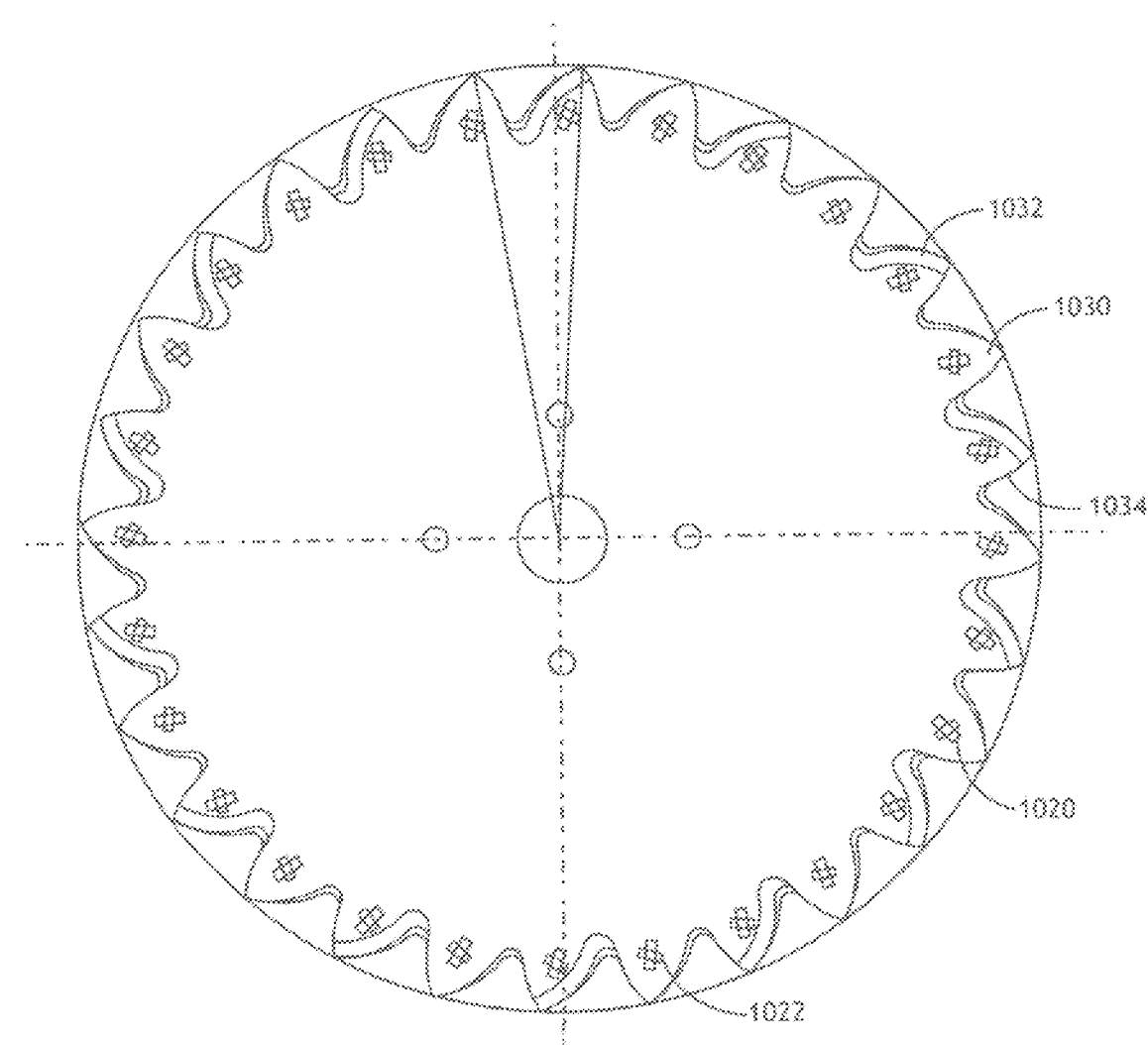
FIG. 10 is a diagram of a blade with associated 28 teeth and 28 angled inserts in accordance with an embodiment of the present invention.

Referring to FIG. 10, a diagram of a blade with associated 28 teeth and 28 angled inserts or multiple insert designs in accordance with an embodiment of the present invention is generally shown at 1000. Teeth 1030 are shown having specifically designed angled inserts 1020, 1022. Insert angle may be specifically designed for the type of soil and for a desired angle of insert soil penetration. For example, as system 1000 moves from right to left and tooth back 1034 pulls the coulter blade 140 through the soil, insert 1022 may penetrate the soil at nearly a 90-degree angle and exit the soil at approximately 30-degree angle relative to the soil surface. Should system be fitted with insert 1020, insert 1020 may penetrate the soil at approximately a 30-degree angle but exit the soil at a 45-degree angle. This variable angle may increase the desired subsoil removed to the surface as well as increase the fracturing effect of the inserts as they interact with the soil.

Figure 11:
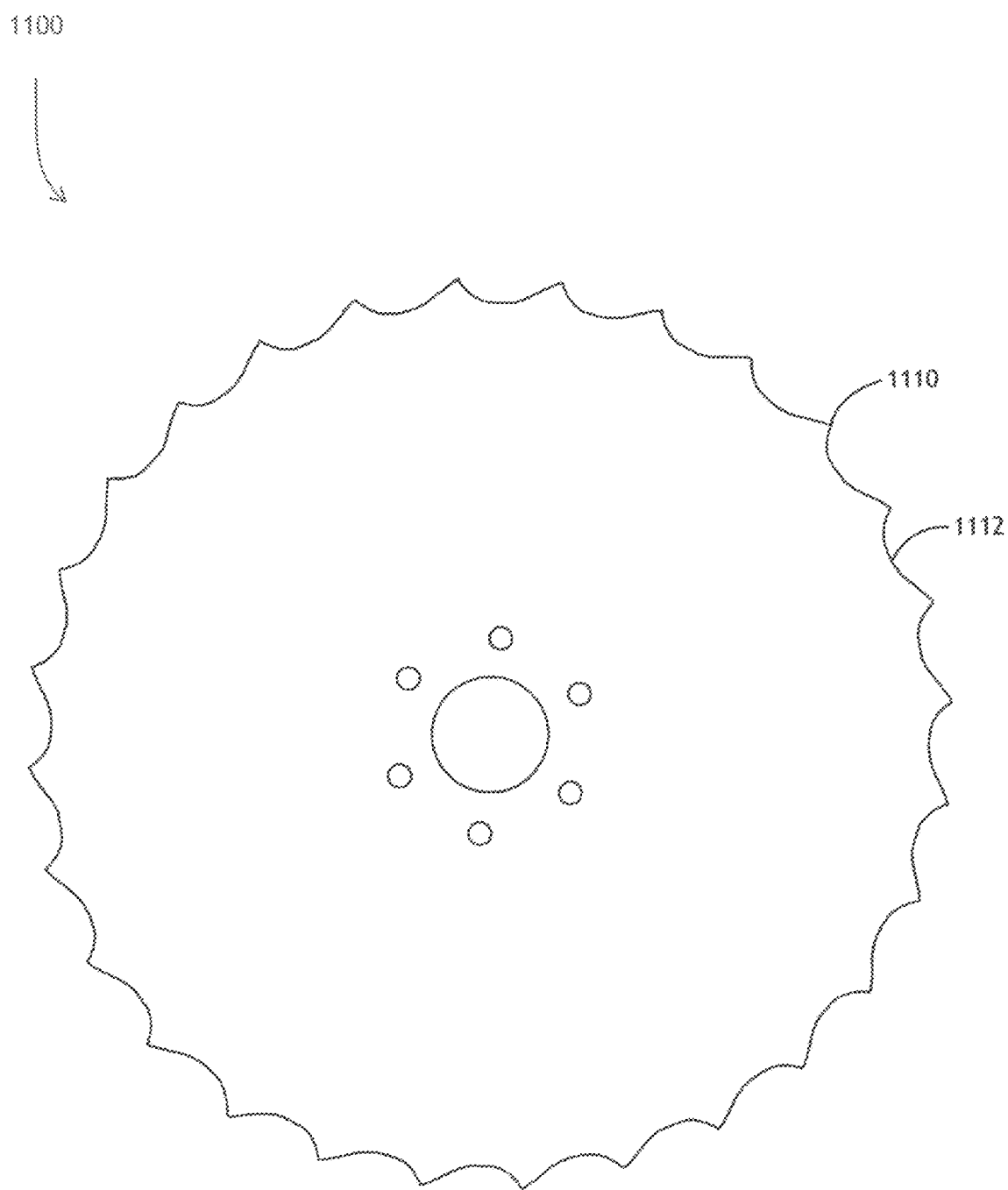
FIG. 11 is a diagram of an exemplary coulter blade with associated 28 teeth of shorter or shallower gullet depth in accordance with an embodiment of the present invention.

Referring to FIG. 11, a diagram of an exemplary coulter blade with associated 28 teeth of shorter or shallower gullet depth in accordance with an embodiment of the present invention is generally shown at 1100. Shortened teeth 1110 and shallow tooth gullet 1112 may decrease possible tooth breakage as coulter blade 140 may interact with soil of hardened or rocky nature. Smaller, shorter backside teeth can be used for shallow depth applications.

Figure 12:
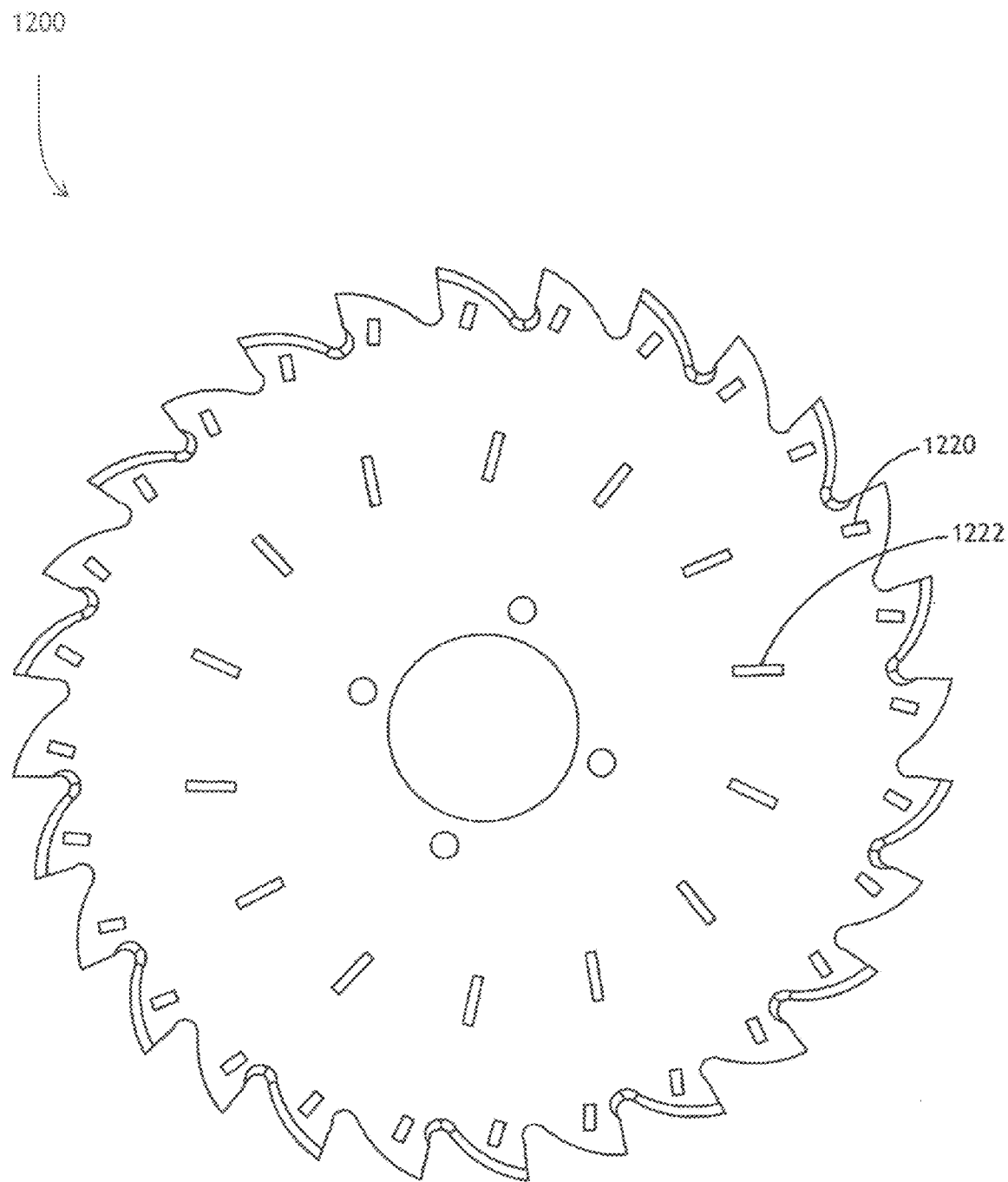
FIG. 12 is a diagram of an exemplary coulter blade with 28 teeth and associated outer and inner inserts in accordance with an embodiment of the present invention.

Referring to FIG. 12, a diagram of an exemplary coulter blade with 28 teeth and associated outer and inner inserts in accordance with an embodiment of the present invention is generally shown at 1200.

Insert Location

Referring to FIGS. 12 and 39, it is further contemplated herein that variable insert 1220 location may offer desired tillage and aeration qualities capable of the variable tooth coulter blade 140. An insert 1220 positioned distally from the hub of the coulter blade 140 may provide a greater tillage effect for creating a void capable of receiving an additional element, for example, a planting device placing seeds into the void and a fertilizing device filling the void with a fertilizer. An additional plurality of inserts 1222 may be located at a second radius from the blade hub 150 to allow an operator more flexibility in soil aeration. For example, an inner circle of inserts 1222 may allow for surface soil aeration, mulching and tillage while the outer row of inserts 1220 may allow for subsoil aeration. It is contemplated herein that multiple circles of inserts may function within the scope of the present invention, each circle providing separate function at the desired depth of operation.

For example, at an exemplary depth where proximal inserts 1222 are embedded in the soil, both the proximal insert 1222 and the distal insert 1220 are interacting with the soil. However, if an operator were to reduce the depth, the entirety of the distal insert 1220 impacts the soil while only a portion of the proximal insert 1222 impacts the soil.

Referring to FIG. 13a-13E, diagrams of exemplary coulter blades with variable tooth number, tooth size, insert number and size, and gullet depth in accordance with embodiments of the present invention are generally shown at 1300. Inserts 120 may be of variable size and shape. Further, inserts 120 may be placed at a plurality of locations within the coulter blade 140 to optimally impact the type of soil anticipated.

It is contemplated that a plurality of designs of coulter blades 140 having a variety of number of teeth and inserts 120 may be incorporated within the scope of the present invention. Without limitation, each embodiment shown in FIGS. 13A, 13B, 13C, 13D, and 13E may be one example of many contemplated herein. FIG. 13A shows an exemplary 16 tooth design, each tooth having an optimum tooth cutting edge to cover the circumference of the coulter blade 140. FIG. 13B shows a 20 tooth design with additional surface area available for cutting. FIG. 13C shows a 24 tooth design with 24 inserts 120 capable of impacting a greater quantity of soil. FIG. 13D shows a 28 tooth design with as many inserts 120. FIG. 13E shows a 32 tooth and insert 120 design of the present invention. Alternatively, in FIG. 13E, inserts 120 may be exemplarily placed at every other tooth allowing for 32 teeth and 16 inserts 120.

Skilled artisans will realize that with more teeth may come additional surface area for cutting various sizes of stubble. However, more teeth also may contribute to tooth breakage leading to a balance between tooth number and the type of soil anticipated by the operator.

Insert Angle

Figure 14:
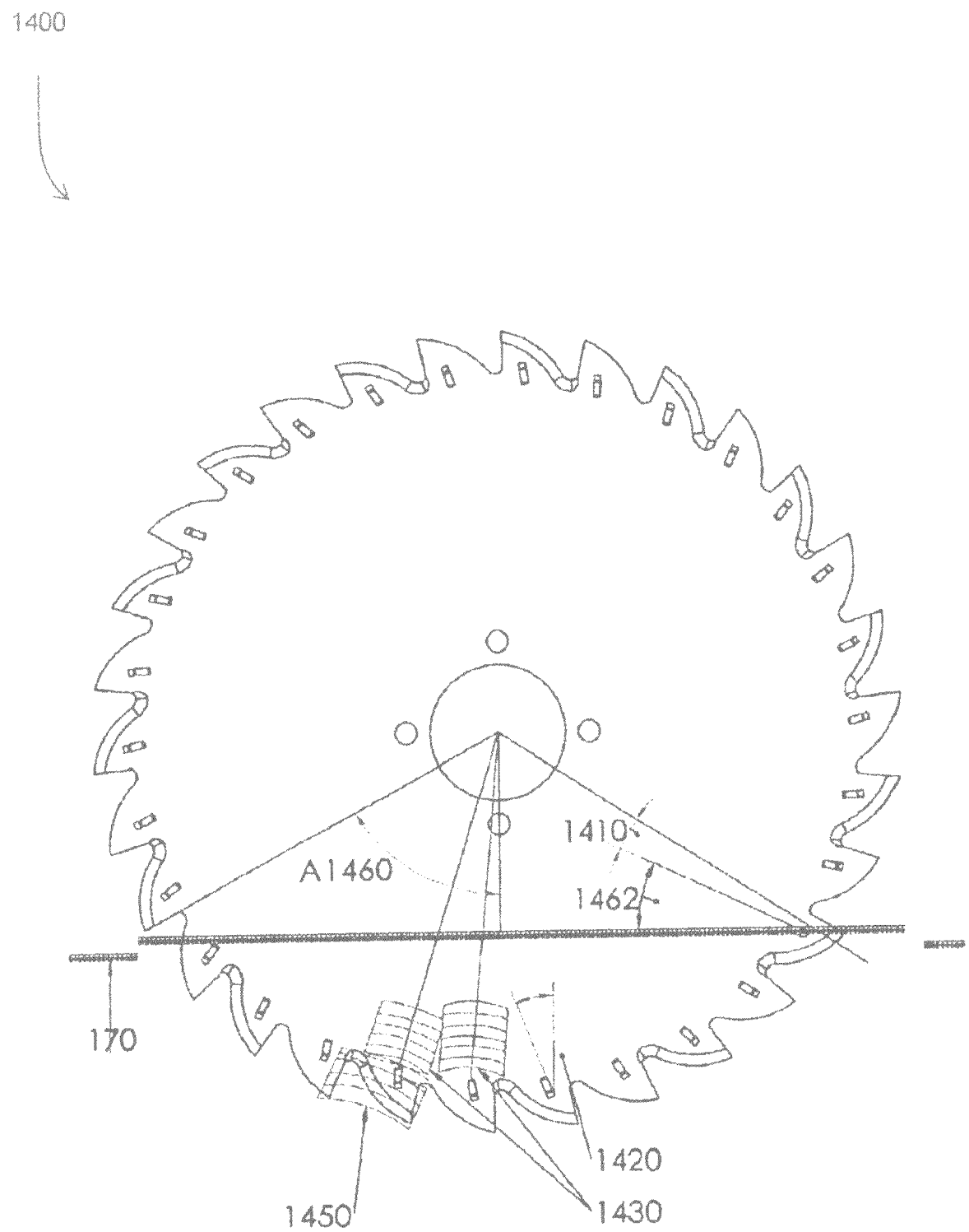
FIG. 14 is a diagram of an exemplary 32 tooth embodiment indicating insert rotational motion as the insert traverses the soil in accordance with an embodiment of the present invention.

Referring to FIG. 14 a diagram of an exemplary 32 tooth embodiment indicating insert rotational motion as the insert traverses the soil in accordance with an embodiment of the present invention generally shown at 1400. The angle b 1462 of insert 120 placement may also be manipulated for optimal performance. As exemplarily indicated, inserts 120 are positioned at angle b 1462 approximately 30 degrees from the surface. As the coulter blade 140 moves from right to left here, inserts 120 may vertically transverse into the soil to the maximum depth vertically beneath the blade hub 150. As the coulter blade 140 moves left, the insert 120 decreases in depth and exits the soil. During this down then up translation, insert 120 is also undergoing rotation about the blade hub 150 equal to double the angle of impact at 1430. With a 30-degree penetration angle and a 120-degree exit angle, the soil touched by insert 120 is impacted and fractured based on the rotation.

With an alteration of the angle of the insert 120, the operation of the insert 120 in contact with the soil is altered.

For example, an insert 120 angled to penetrate the soil at a 90-degree angle of penetration may aerate differently than an insert 120 placed to enter the soil at a 45-degree angle of penetration. A slight change in insert angle b 1462 may greatly influence the amount of soil brought to the surface after coulter blade 140 interaction. In embodiments, an insert 120 may penetrate the surface of the soil at a relatively flat 0 degrees from horizontal and exit the surface of the soil after approximately 135 degrees of rotation.

For example, an operator with a CEC of 20 may have a large amount of surface stubble where the operator desires more dark soil on the surface located in a northern climate. In this case, the angle b 1462 of the insert 120 may be optimally positioned for greater soil movement to the surface. For example, an insert 120 with an impact angle b 1462 of 30 degrees may enter the soil 170 at 30 degrees and rotate to 120 degrees before fully exiting the soil. This rotation of the insert 120 as well as the change in depth (from zero to the desired depth [here an exemplary four inches]) of the insert.

It may or may not be necessary to alter the size and shape of the insert 120 as the angle change of the insert 120 may be sufficient to transfer the desired amount of soil to the surface. For example, a curved insert may be able to act in a shoveling manner to enter the soil at 90 degrees and exit the soil at a nearly level orientation to maximize the soil brought to the surface.

In another embodiment, the operator in heavy gumbo with tight soil may desire simply more tillage. In this case, the insert 120 may be widened to create more surface area for the insert 120 to interact with the soil.

It is contemplated herein, a prescription insert 120 designed for a specific type of soil may enable an operator the flexibility to attain the desired till and aeration. A first operator tilling a first specific type of soil may desire a first size, shape, and angle of insert 120 while a second operator tilling a second specific type of soil may desire a second size, shape, and angle of insert 120.

Referring to FIG. 15A-15D, diagrams of insert effect on the soil at various blade depths in accordance with embodiments of the present invention are generally shown at 1500. The angle of soil 170 entry of each tooth 110 and insert 120 may be altered by the soil depth at which the coulter blade 140 is operated. For example, at an exemplary depth of 3.25 inches in FIG. 15A, an insert 120 may enter the soil at an angle of approximately 45 degrees from horizontal and exit the soil after approximately 90 degrees of travel. Conversely, at a greater depth as shown in FIG. 15B, an insert 120 may impact the soil at approximately 40 degrees from horizontal and exit the soil after 110 degrees of rotation. Similarly, for FIG. 15C, insert 120 enters the soil at 20 degrees and exits after 120 degrees of rotation. Similarly, for FIG. 15D, insert 120 enters the soil at 0 degrees and exits after 135 degrees of rotation. This difference may allow an operator to accurately determine an amount of soil to impact, aerate, and bring to the surface.

Referring to FIG. 16A-16D, diagrams of sidewall pressure the insert effect on the soil at various blade depths and/or multiple insert angles in accordance with embodiments of the present invention are generally shown at 1600. An additional goal of the invention may include a coulter blade 140 able to cut and aerate the soil with minimal lateral pressure on the soil as the coulter blade 140 interacts with the soil. This undesirable lateral pressure or sidewall push (a lateral force on the soil as the blade interacts) may cause a smearing or troweling action as a result of blade soil interaction creating a compacted soil barrier impenetrable by a future root system. Each tooth on the variable tooth coulter blade 140 may be sharpened only on one side, while the adjacent tooth is sharpened on the opposite side. This alternate sharpening may eliminate overall coulter blade 140 sidewall push by opposite and counteracting lateral pressure of each tooth as the tooth interacts with the soil.

An additional goal of the present invention may include a minimum amount of friction along the sidewall of the coulter blade 140. Any amount of friction along the sidewall of the coulter blade 140 causes an increase amount of force required to pull the coulter blade 140 through the soil. As an object enters the soil, the surrounding soil tends to grip or hold on to the object. Soils with a higher CEC have a greater ability to grasp the object. As the coulter blade 140 depth increased, area 1602 may be the only sidewall interacting with the soil. As depth in increased, areas 1604 and 1606 become engaged with the soil thus increasing the need for sidewall pressure reduction. Embodiments of the present invention create a contact area limited to the portion of the coulter blade 140 more distal from the hub where the sidewall of the coulter blade 140 closer to the hub remains free from soil contact.

Alternatively, a coulter blade 140 of the present invention may be shaped in a concave design to enable side movement of soil as well as cutting of stubble, mulching and tillage on the surface. For example, a plurality of concave coulter blade 140s may act to cut the stubble on the surface of the field as well as slightly move the soil laterally after soil aeration.

Further, it is contemplated embodiments of the present invention may include a coulter blade 140 for interacting with the side walls of a trench to backfill the void above the trench contents. For example, a trench dug for tile requires backfill after the tile/cable has been laid. Embodiments of the present invention interact with the soil on the sides of the trench as a closing wheel to fill the void above the tile. This backfill creates the archway above the tile preventing the tile from being crushed from additional weight.

Figure 17B:
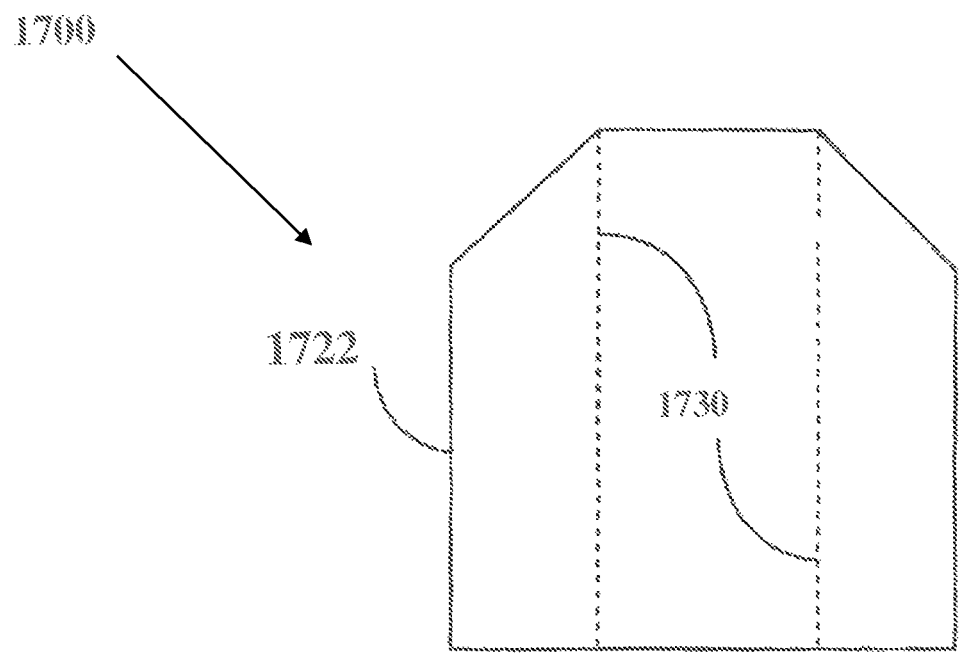
FIGS. 17A and 17B are diagrams of exemplary inserts in accordance with an embodiment of the present invention.
Figure 17A:
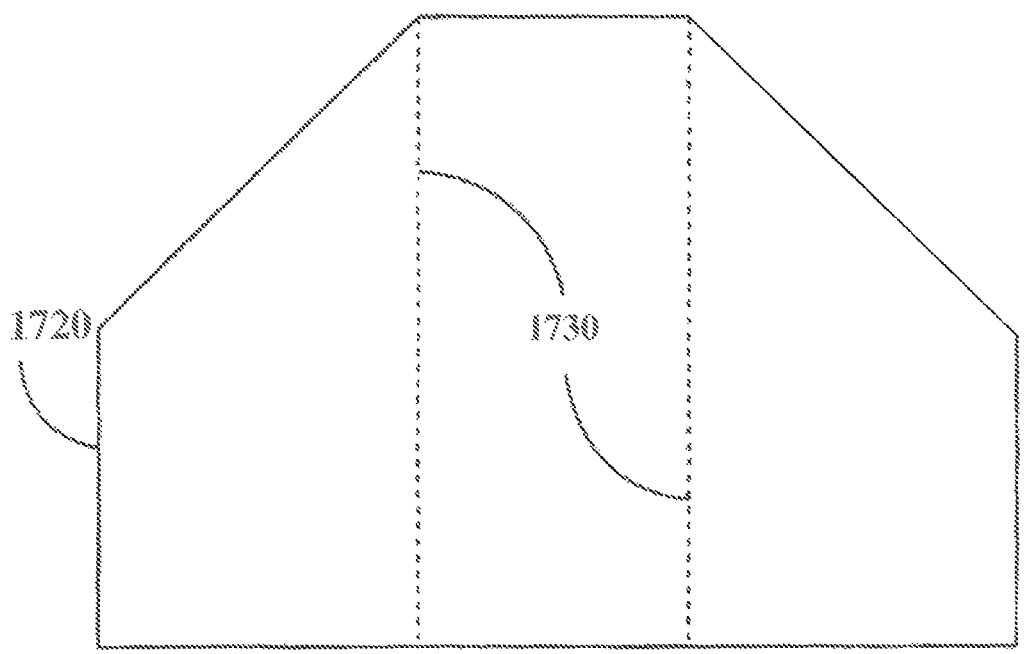

Referring to FIGS. 17A and 17B, diagrams of exemplary inserts in accordance with an embodiment of the present invention are generally shown at 1700. An additional goal of the present invention may include aeration of the soil with which the variable tooth coulter blade 140 makes contact. Variable size, angle, and number of inserts 1720, 1722 aerate the soil with which the coulter blade 140 comes into contact. The inserts 120 dig as low as the operator desires and aerate the sub compacted soil sufficiently to aid in follow on root penetration. Securably mounted along lines 1730 of coulter blade insert opening alignment, the lateral extension of each insert 1720, 1722 may impact the soil.

As each insert 1720, 1722 interacts with the soil, the insert 1720, 1722 will also aerate soil adjacent to the soil directly touched by the insert 1720, 1722. This adjacent aeration effect allows for the operator to create the desired tillage by manipulation of the speed of the vehicle and depth of the coulter blade 140. The greater the speed of the vehicle, the greater the adjacent aeration effect. Preferably a minimum speed may be in the range of two to five miles per hour while a maximum speed may be in the range of eight to ten miles per hour. It is contemplated herein; speeds less than two or greater than ten miles per hour may also be optimal for coulter blades 140 described within the scope of the present invention.

Insert Width

The width of the insert 1720, 1722 may determine an amount of soil desired to be altered. For example, a wider insert 1720 extending laterally from the blade 140 may contact a greater amount of soil causing the greater amount of soil to be fractured and aerated. Conversely, a narrower insert 1722 may preclude insert breakage should the coulter blade 140 contact a rock.

Insert Size and Shape

The shape and size of the insert 1720, 1722 may determine the amount of aeration of the soil as well as resistance to breakage in certain types of soil. For example, in rocky soil, a more robust insert 1722 may resist breakage as a result of impact with a rock. For example, in heavy soil, an insert 1720, 1722 of square shape may optimally interact with the heavy soil. In light soil, an insert 120 of tapered or swept shape may allow for less contact with the soil while optimally aerating the soil.

Figure 18:
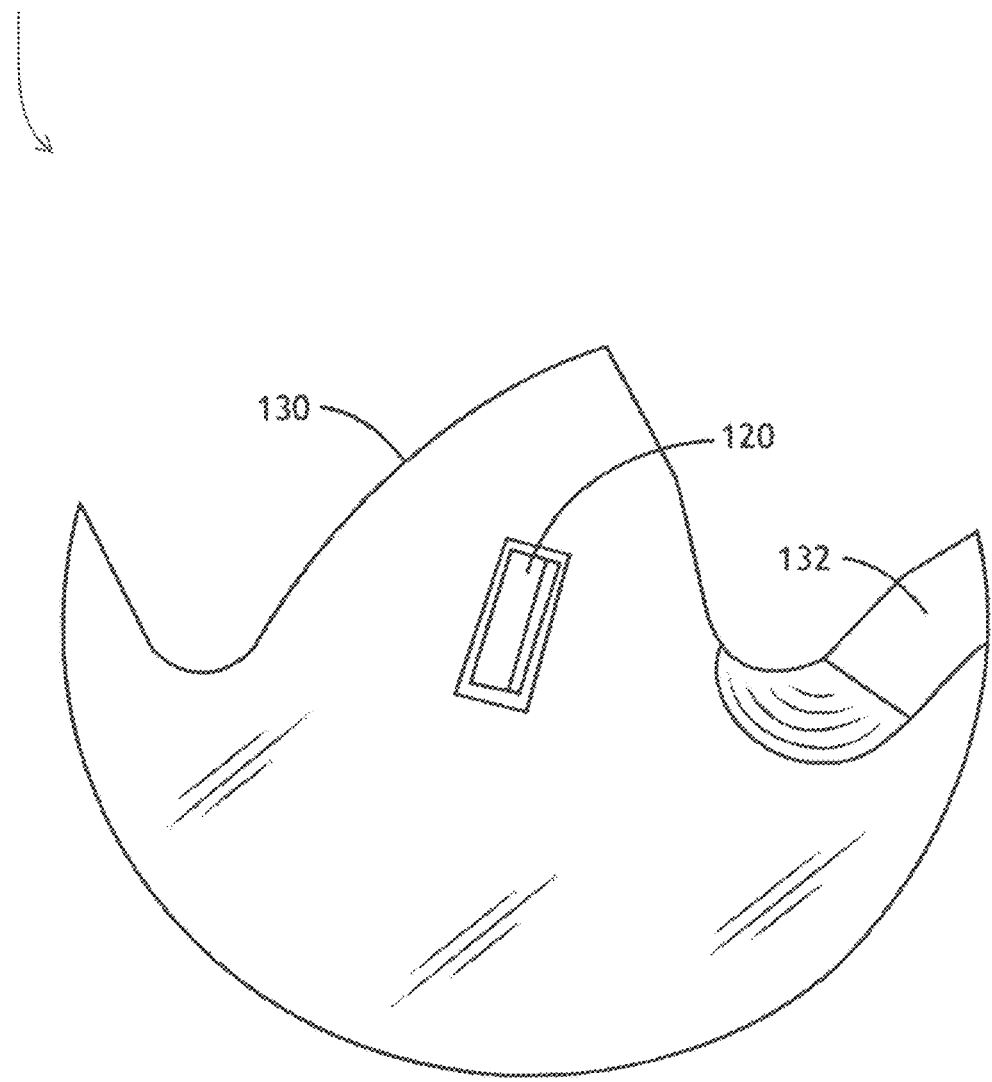
FIG. 18 is a detailed diagram of exemplary insert location and size in accordance with an embodiment of the present invention.

Referring to FIG. 18, a detailed diagram of exemplary insert location and size in accordance with an embodiment of the present invention is generally shown at 1800. The angle of the insert 120 may determine penetration as well as aeration of the soil. Insert 120 positioned near the blade circumference within tooth 130 may provide greater aeration than would an insert more proximal to the blade hub.

Figure 19A:
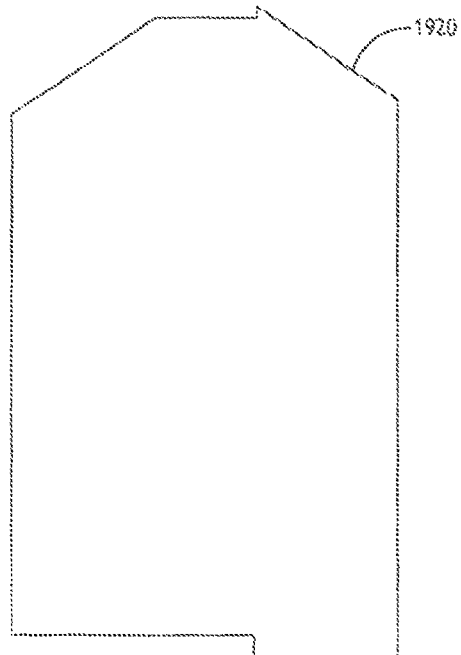
FIGS. 19A and 19B are diagrams of one insert exemplary of an embodiment of the present invention.
Figure 19B:
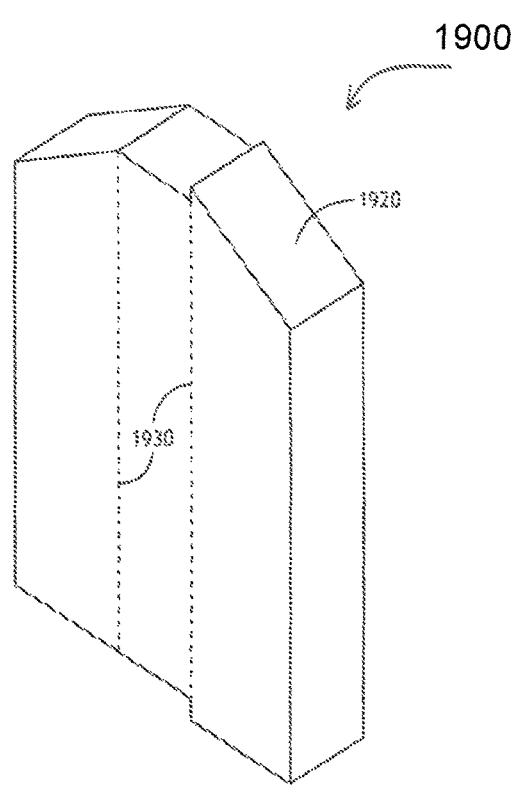

Referring to FIGS. 19A and 19B, diagrams of one insert exemplary of an embodiment of the present invention are generally shown at 1900. One embodiment of insert 1920 may include an insert mountable within coulter blade insert opening from one lateral side. Mounted along alignment lines 1930, insert 1920 may be more easily mounted with a weld required on one side. It is contemplated herein; equal surface areas on insert 1920 lateral extensions may enable equal forces on the insert 1920. For example, flanged side of insert 1920 may extend laterally a lesser amount than non-flanged side of insert 1920 to enable equal pressure on both lateral extensions.

Figure 20A:
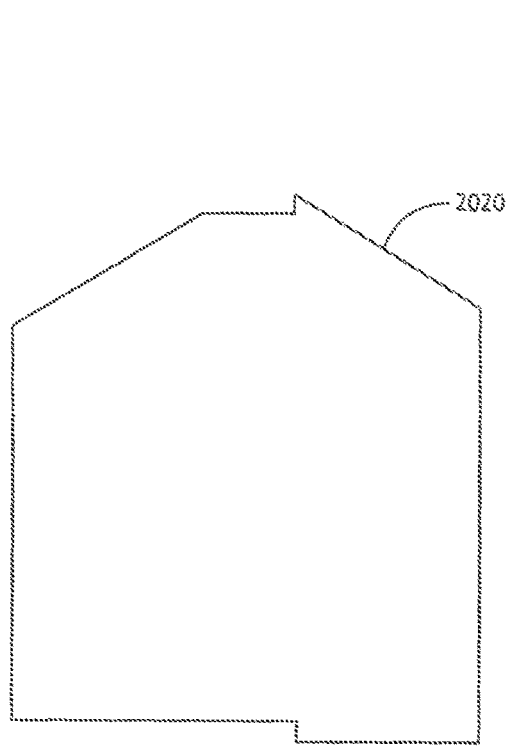
FIGS. 20A and 20B are diagrams of one insert exemplary of an embodiment of the present invention.
Figure 20B:
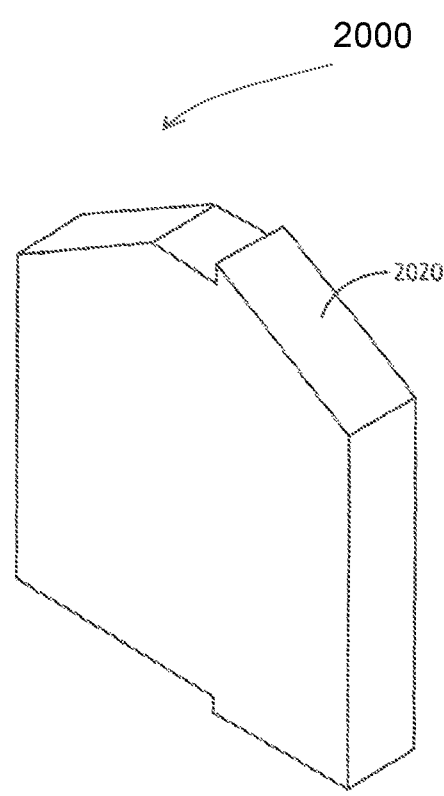

Referring to FIGS. 20A and 20B, diagrams of one insert exemplary of an embodiment of the present invention are generally shown at 2000. An additional embodiment of insert 2020 may enable a greater amount of insert soil interaction.

Figure 21:
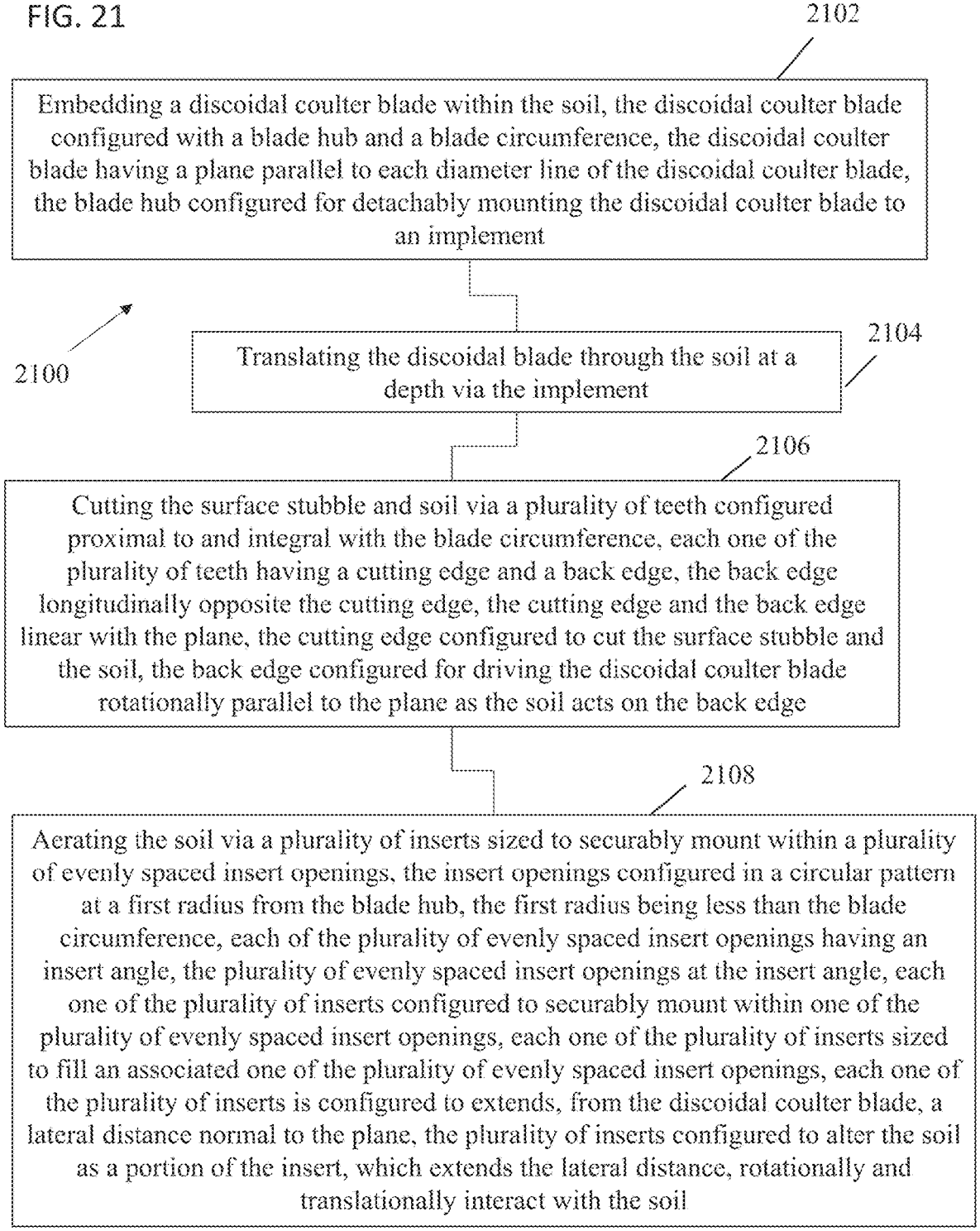
FIG. 21 is a flowchart for a method for altering surface stubble while simultaneously mulching, tilling and aerating the soil exemplary of an embodiment of the present invention.

Referring to FIG. 21, there is shown a flowchart for a method for altering surface stubble while simultaneously mulching, tilling and aerating the soil exemplary of an embodiment of the present invention. Method 2100 may begin at step 2102 with embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement. The method 2100 provides for speed and depth sensitive to reactive complex of the application.

Method 2100 continues with step 2104 with translating the discoidal coulter blade through the soil at a depth via the implement and, at step 2106 with cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge. Method 2100 may conclude with step 2108 with aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

FIGS. 28A-I are diagrams of exemplary inserts in accordance with an embodiment of the present invention are generally shown at 2800, particularly showing a bubble blade insert. Bubble blade 28140 exemplary of the present invention may include a single tooth cutting edge 28136. A plurality of inserts 28120 are shown interwebbed with one another, and function and operate as discussed hereinabove.

FIGS. 29A-I are diagrams of exemplary inserts in accordance with an embodiment of the present invention are generally shown at 2900, particularly showing a notch blade insert. Notch blade 29140 exemplary of the present invention may include a plurality of teeth 29110 each having a tooth cutting edge 29136. Between each tooth 29110, a gullet 29112 may retain specific qualities for tooth effectiveness. A plurality of inserts 29120 are shown, which function and operate as discussed hereinabove.

FIGS. 30A-I are diagrams of exemplary inserts in accordance with an embodiment of the present invention are generally shown at 3000, particularly showing a razor blade insert. Razor blade 30140 exemplary of the present invention may include a plurality of teeth 30110 each having a tooth cutting edge 30136. Between each tooth 30110, a gullet 30112 may retain specific qualities for tooth effectiveness. A plurality of inserts 30120 are shown, which function and operate as discussed hereinabove.

FIGS. 31A-I are diagrams of exemplary inserts in accordance with an embodiment of the present invention generally shown at 3100, particularly showing a ripple blade insert. Ripple blade 31140 exemplary of the present invention may include a plurality of teeth 31110 each having a tooth cutting edge 31136. Between each tooth 31110, a gullet 31112 may retain specific qualities for tooth effectiveness. A plurality of inserts 31120 are shown, which function and operate as discussed hereinabove.

FIGS. 32A-I are diagrams of exemplary inserts in accordance with an embodiment of the present invention are generally shown at 3200, particularly showing a Samurai blade insert. Samurai blade insert 32140 exemplary of the present invention may include a plurality of teeth 32110 each having a tooth cutting edge 32136. Between each tooth 32110, a gullet 32112 may retain specific qualities for tooth effectiveness. A plurality of inserts 32120 are shown, which function and operate as discussed hereinabove.

Figure 33A:
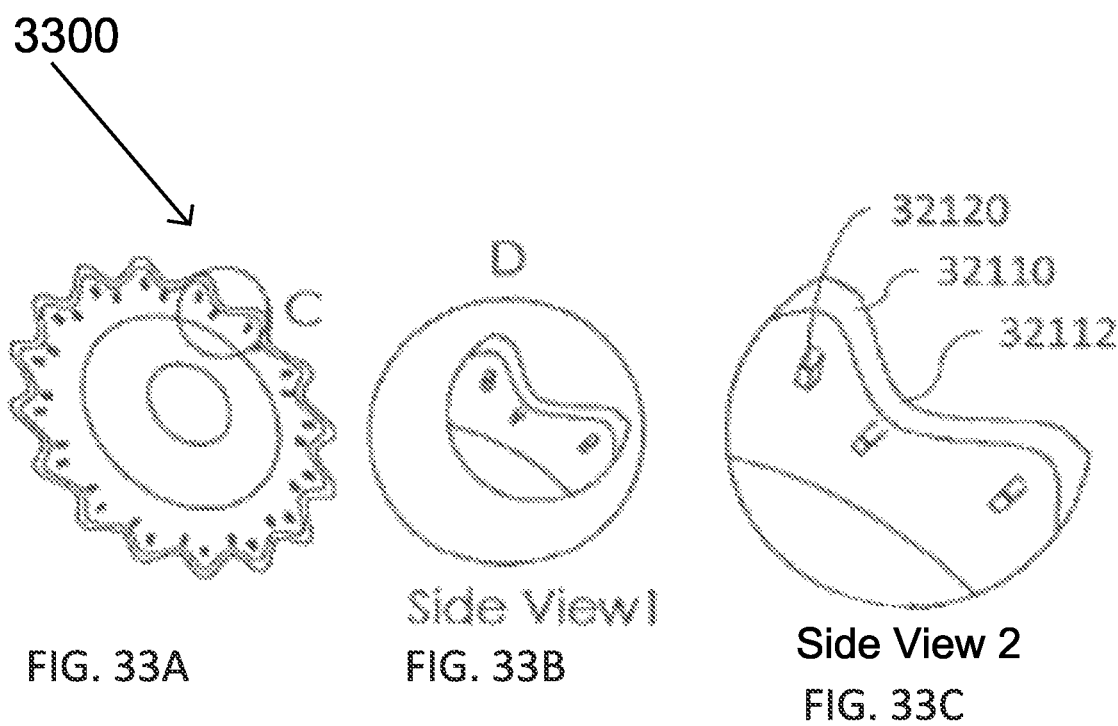
Figure 40A:
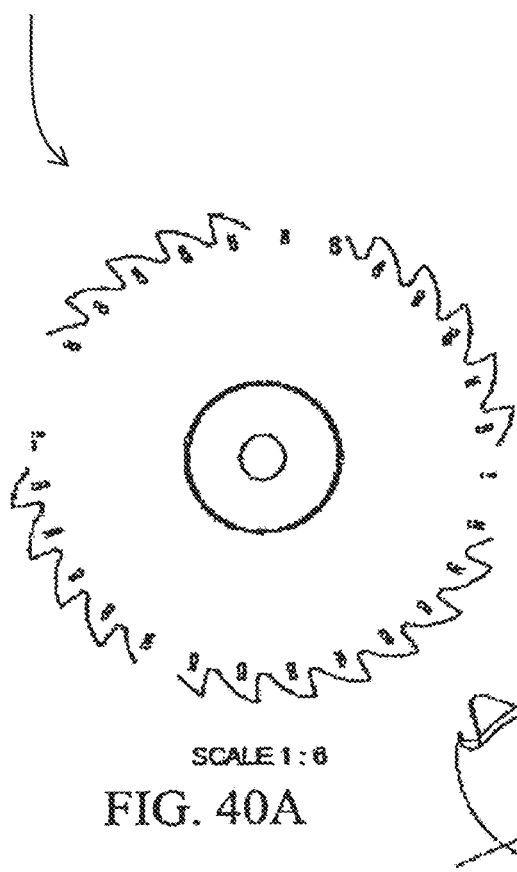
FIGS. 40A-F are diagrams of exemplary inserts in accordance with an embodiment of the present invention, particularly showing curved/concave multiple insert blade.
Figure 40B:
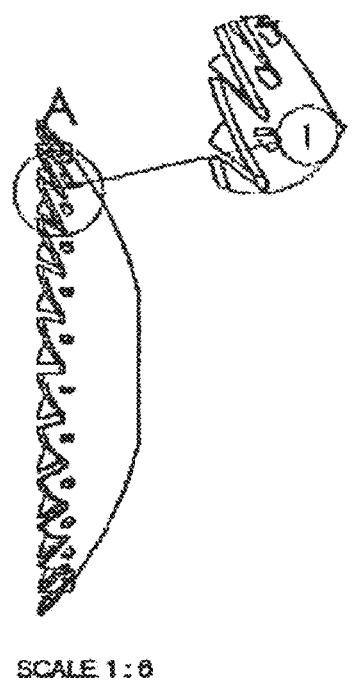
Figure 40C:
Figure 40D:
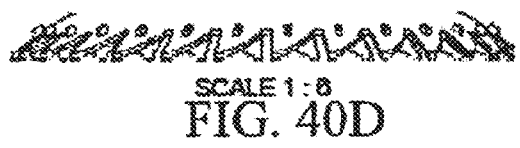
Figure 40E:
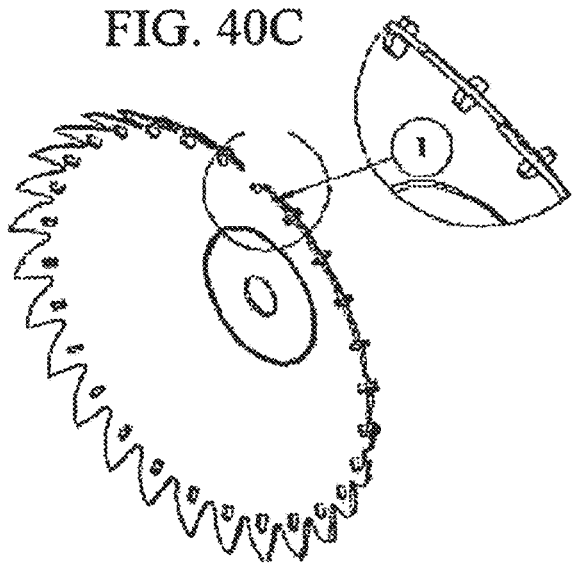
Figure 40F:
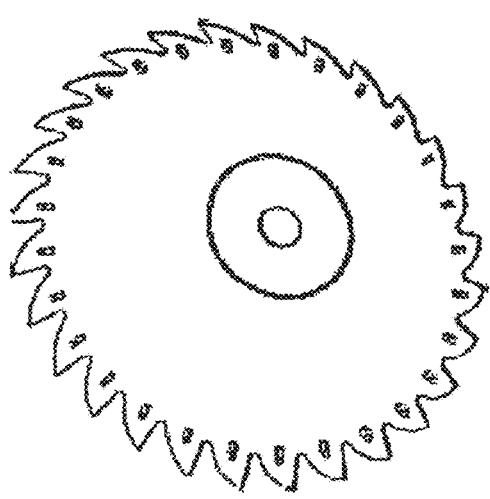

FIGS. 33A-C are diagrams of exemplary inserts in accordance with an embodiment of the present invention, particularly showing a straight blade insert. A plurality of inserts 33120 are shown, which function and operate as discussed hereinabove.

FIGS. 34A-I are diagrams of exemplary inserts in accordance with an embodiment of the present invention, are generally shown in 3400, particularly showing a turbo blade insert. Turbo blade 34140 exemplary of the present invention may include a plurality of teeth 34110 with a gullet 34112 and a plurality of inserts 34120, which function and operate as discussed hereinabove.

FIGS. 35A-I are diagrams of exemplary inserts in accordance with an embodiment of the present invention, particularly showing a vortex blade insert. Blade 35140 exemplary of the present invention may include a plurality of teeth 35110 with a gullet 35112 and a plurality of inserts 35120, which function and operate as discussed hereinabove, generally shown at 3500

FIGS. 36A-I are diagrams of exemplary inserts in accordance with an embodiment of the present invention, particularly showing a wavy blade insert. Blade 36140 exemplary of the present invention may include a plurality of teeth 36110 with a gullet 36112 and a plurality of inserts 36120, which function and operate as discussed hereinabove, generally shown at 3600.

FIGS. 37A-F are diagrams of exemplary fillets, True V Extended Fillet, and True V Mate Taper, in accordance with an embodiment of the present invention generally shown at 3700.

FIGS. 38A-1 are diagrams of exemplary serrated cutting edges, serrate 1 (FIG. 38A-38C), serrate 2 (38D-38F), and serrate 3 (38G-38I), in accordance with an embodiment of the present invention generally shown at 3800.

FIGS. 39A-I are diagrams generally shown at 3900 of exemplary inserts in accordance with an embodiment of the present invention, particularly showing multiple insert blade.

FIGS. 40A-F are diagrams generally show at 4000 of exemplary inserts in accordance with an embodiment of the present invention, particularly showing an STIC curved/concave insert blade.

Figure 41:
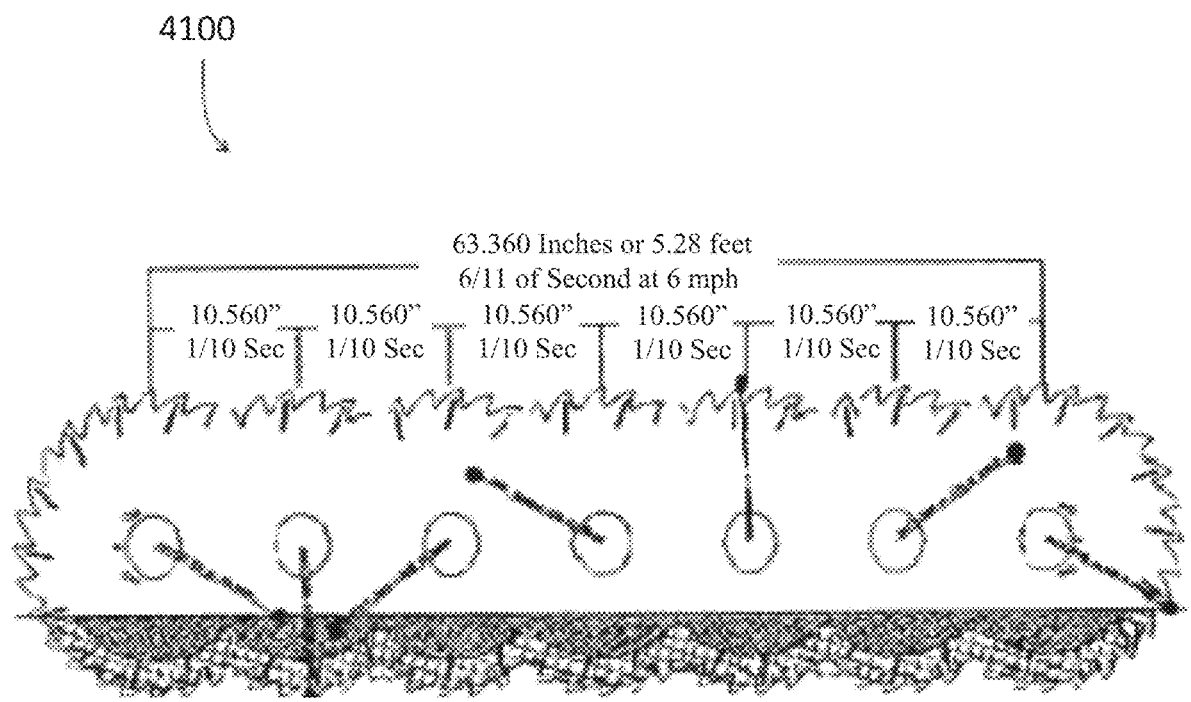
FIG. 41 is a diagram of an exemplary blade traveling at a speed of six miles per hour and associated snapshots every 1/10th second in accordance with an embodiment of the present invention.

FIG. 41 is a diagram of an exemplary blade traveling at a speed of six miles per hour and associated snapshots every 1/10th second in accordance with an embodiment of the present invention generally shown at 4100. An exemplary blade travels at a speed of six miles per hour and associated snapshots every 1/10th second in accordance with an embodiment of the present invention. Indicated rotation of the blade is preferably from right to left with the sabre shape of the blade impacting and cutting the stubble on the surface of the soil. Speed and depth sensitive or reactive insert angle and length and size synergistically work together. As each insert enters the soil, the following insert enters and brings to the surface, the material fractured by the previous insert. The rotational action of the following insert thereby fractures and brings to the surface an amount of soil with which the preceding insert previously interacted. Additionally, soil proximal to the insert may also be fractured and brought to the surface due to energy transferred from the insert to the adjacent soil.

Figure 42:
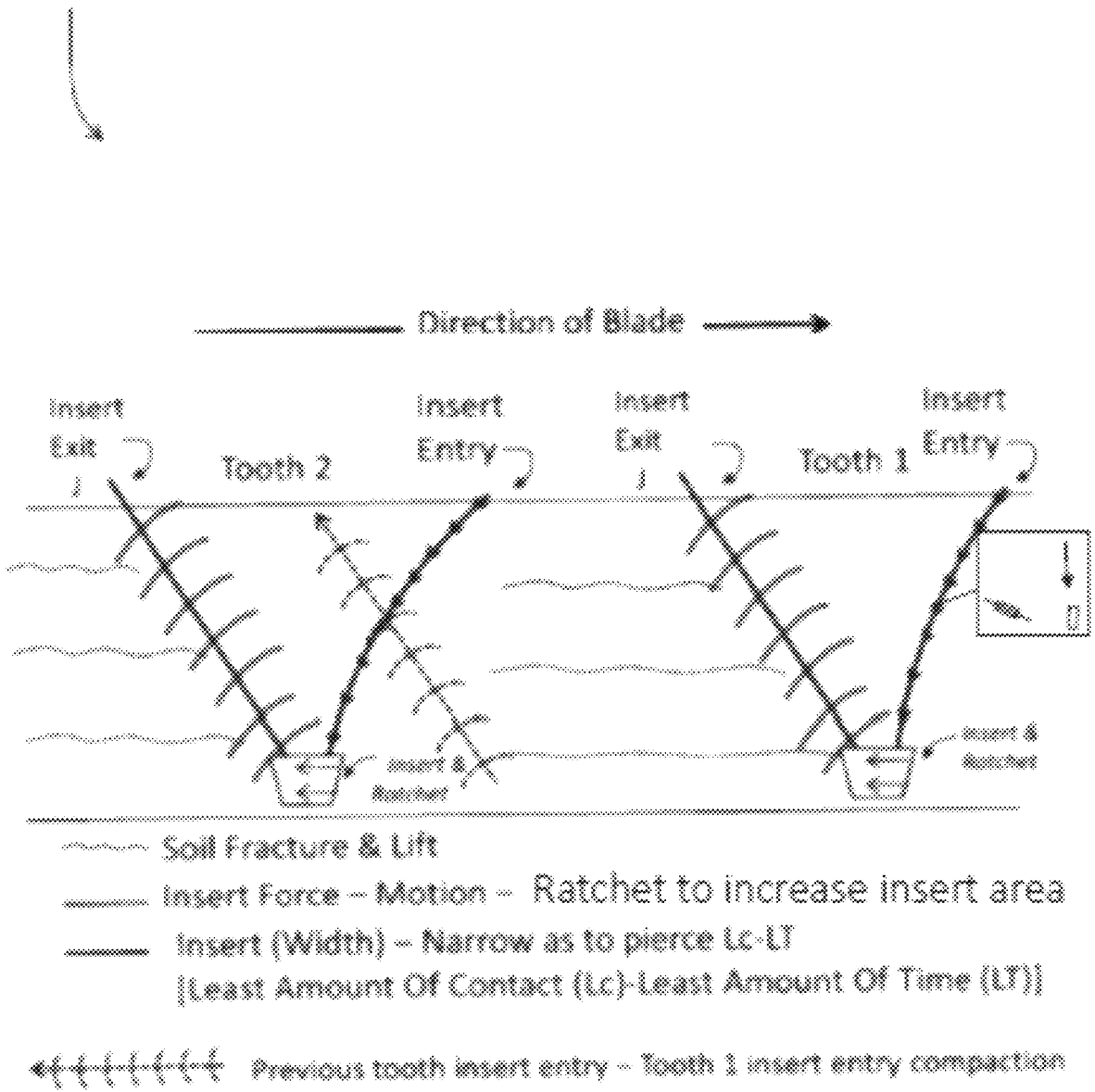
FIG. 42 is a diagram of an insert rotation or angle and insert area increase during insert ratchet action, lifting and fracturing soil profile example in accordance with an embodiment of the present invention.

FIG. 42 is a diagram generally shown at 4200 of an insert rotation or angle and insert area increase during insert ratchet action, lifting and fracturing soil profile example in accordance with an embodiment of the present invention. By changing insert angle, length or size more or less soil lift and or fracturing may be controlled by design.

FIGS. 43A and 43B are exemplary images of serrated edge embodiments in accordance with an embodiment of the present invention generally shown at 4300.

Scissor and Shearing

Figure 44A:
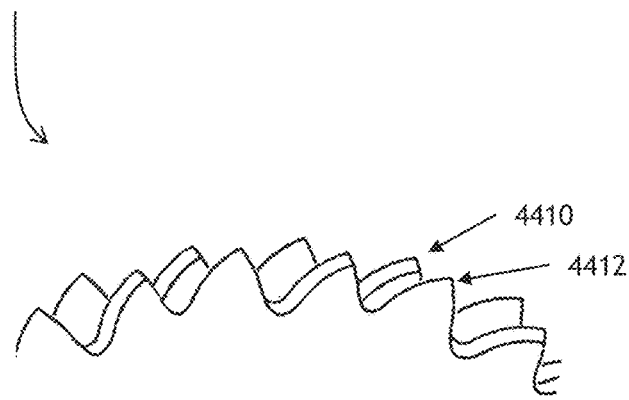
FIG. 44A depicts exemplary images of a pair of coulter blades of dissimilar size in accordance with one embodiment of the present invention.
Figure 59:
FIG. 59 is a diagram of characteristics of blades of dissimilar size exemplary of an embodiment of the present invention.

Referring to FIG. 44A, a pair of coulter blades of dissimilar size in accordance with one embodiment of the present invention is generally shown at 4400. In one embodiment, a pair of coulter blades of dissimilar size may be proximally mounted. In this manner, the smaller coulter blade may rotate at a faster rpm than would the larger coulter blade. In this manner, the teeth of the proximally mounted blades will maintain dissimilar relative position and cause a scissor motion to effectively cut surface residue. In one exemplary configuration, an outer blade 4410 may be approximately 15 inches in diameter while an inner blade 4420 may be approximately 14.75 inches in diameter. In another embodiment, each blade is the same size. Referring to FIG. 59, a diagram of characteristics of blades of dissimilar size exemplary of an embodiment of the present invention is shown. As the blades are mounted proximally, the teeth of each blade will rotate at dissimilar RPMs and act with a scissor effect to efficiently cut stubble material encountered by the dual blade configuration.

It is further contemplated herein that blades of a variety of sizes may operate effectively in concert to achieve the desired scissor effect.

Figure 44B:
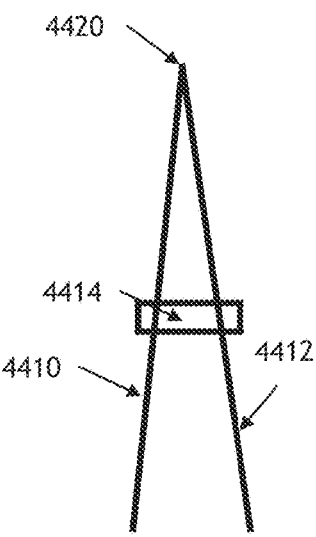
FIGS. 44B-44D are images of an alignment configuration of a pair of coulter blades exemplary of an embodiment of the present invention.
Figure 44C:
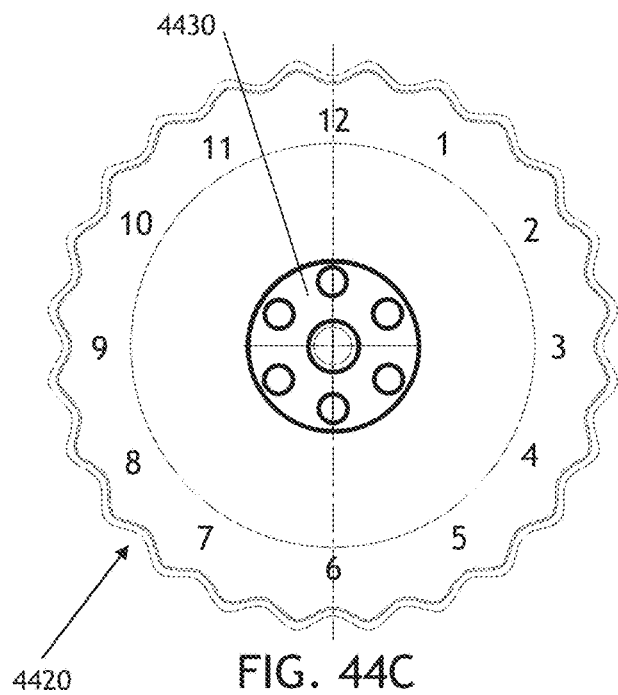
Figure 44D:
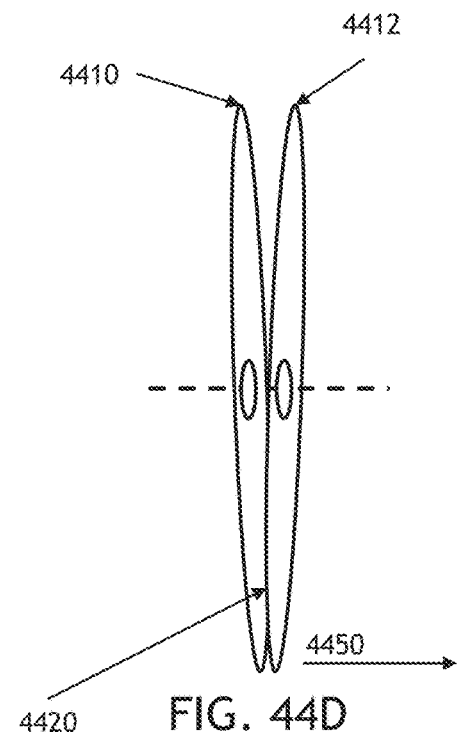

Referring to FIG. 44B through 44D, an alignment configuration of a pair of coulter blades exemplary of an embodiment of the present invention is shown. FIG. 44C is a lateral view, FIG. 44D is a longitudinal view, and FIG. 44B is a view from the 11 o'clock position referenced in FIG. 44C. Of note, an implement center 4450 may be the center of an implement (e.g., a corn planter). Each of the pair of coulter blades, the outer blade 4410 and the inner blade 4412, may be proximally mounted and also mounted with dissimilar planes of rotation. A blade mating point 4420 may be the point at which the plane of each blade intersects as properly mounted on the implement. In this manner, the blades form a cutting "V" with the blade mating point 4420 being the point at which the blade circumferences touch. On the opposite end of each blade, at approximately the 1:30 position in FIG. 44B, the blade circumferences are at their most distant laterally.

Blade Rigidity vs. Blade Flex

One goal of embodiments disclosed herein may include mounting a coulter blade which maintains rigidity while immersed within the soil.

In one embodiment of the present invention, a coulter blade of an exemplary thickness of approximately four millimeters may present a desirable blade rigidity to maintain blade shape as the blade is immersed in the soil. This desirable rigidity offers the operator a desirable furrow shape for increased root growth and increased yield. With a goal of zero flex between the blade bearing and the blade mating point 4420, embodiments herein may offer the operator a system eliminating variables that may increase blade flex and furrow degradation.

Bearings Substantial to Prevent Blade Flex

In one embodiment of the present invention, a coulter blade of substantial thickness is coupled to the implement via a bearing 4430 capable of resisting a radial force side pressure of the coulter blade 140 and eliminating blade flex. A coulter blade 140 may flex at any point between the bearing and the circumference. Also, should a bearing be unable to maintain the coulter blade at the proper angle to meet the opposite coulter blade at the blade mating point 4420, an undesirable distance may open between the blades at the blade mating point 4420. Substantial bearings 4430 may offer the operator a zero flex blade and a blade mating point which remains at a desired gap of near zero.

Double Bevel Blade Sharpening

Figure 45:
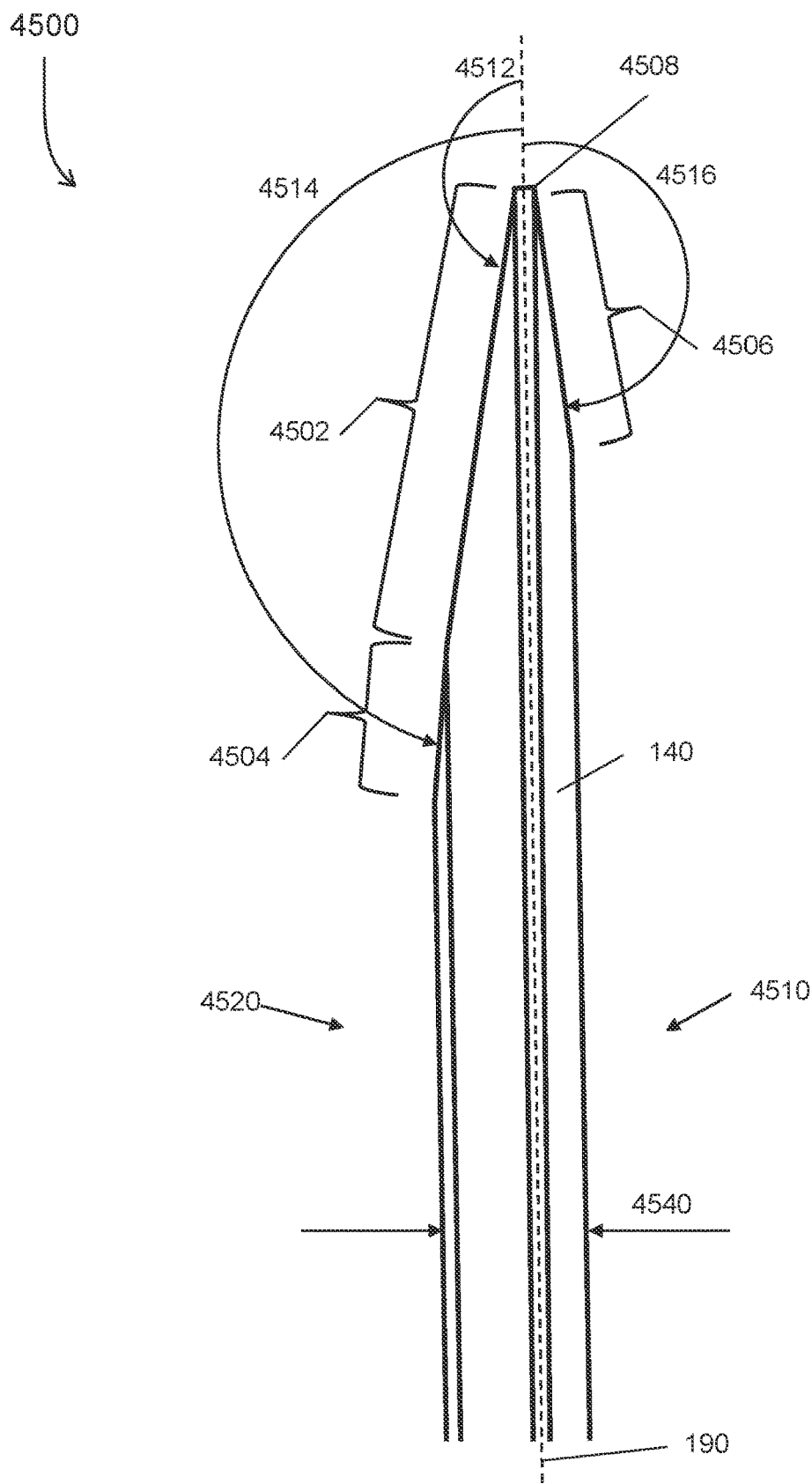
FIG. 45 is a diagram of a triple bevel sharpened coulter blade exemplary of an embodiment of the present invention.

Referring to FIG. 45, a diagram of a triple bevel sharpened coulter blade exemplary of an embodiment of the present invention is generally shown at 4500. Structurally, a coulter blade 140 sharpened with a triple bevel may offer: a first bevel 4502 proximal with a blade sharpened point 4508, an inner/second bevel 4504 between the first bevel and a blade outside 4520 that facilitates anti-stubbing, an optional counter or third bevel 4506 between the blade sharpened point and a blade inside 4510 located on the opposite lateral side of the blade. The first bevel 4502 being substantially longer than the second bevel 4504. Preferably, the first bevel 4502 has a greater length than the inner/second bevel 4504. More preferably, the first bevel 4502 is at least 2 times longer in length than the second bevel 4502. Most preferably, the first bevel 4502 is at least 3 times longer in length than the second bevel 4502. Herein, when referring to length it is meant (i) for the first bevel 4502, the distance from the blade outer circumference to the termination of the first bevel 4502 whereupon the first bevel 4502 terminates at and directly abuts the second bevel 4504, and (ii) the distance or length of the second bevel 4502 representing the length extending from the termination of the first bevel 4502/beginning of the second bevel 4504, to the termination of the second bevel 4504 extending along the same plane [extending from the outer blade circumference toward the blade center/hub]. The first bevel 4502 is longer in length than the second bevel 4504 and as a result, the second bevel 4504 facilitates anti-stubbing while providing erosion of the second bevel 4504 and maintaining the outer circumference and first bevel 4502 of the blade to extend the life of the blade. An exemplary length of the first bevel 4502 is approximately three times a length of the second bevel 4504. The blade width 4540 may offer increased and/or decreased blade strength when desired.

Anti-stubbing off-set bevel arrangement forces dirt into the inner bevel and erodes the metal at that inner bevel to outer/first bevel interface (where the bevels abut) at a higher rate to maintain the outer or first bevel—force dirt against inner/smaller second bevel and soil erodes that metal at a faster rate. This helps maintain the length of first or outer larger bevel. The outer or larger first bevel pushes dirt and dirt rolls over the second bevel and back of blade to release force at the thickest part of the second bevel 4504 (i.e. the second bevel to first bevel interface), and moving that force to erode the second bevel 4504. As metal of second bevel 4504 is eroded and wears down, the bevel length of the outer/first bevel 4502 is maintained so that the blade lasts longer. The outer/first bevel 4502 is always greater in length/depth than the inner/second bevel 4504.

The blade inside 4510 may be considered the side of the blade proximal with a desired implement attachment point 4414. The blade outside 4520 may be the side of the blade distal from the implement attachment point 4414 of the implement.

In operation, the double bevel sharpened coulter blade may offer a long sharpened lifespan to prevent undesirable premature stubbing and promote self-sharpening. As the coulter blade 140 wears at the long first bevel 4502, it maintains a sharp edge at the blade sharpened point 4508. Blade thickness at the blade sharpened point 4508 is directly proportional with the DP required to operate the blade through the soil. In one example, the blade sharpened point 4508 may be sharpened to 0.05 mm to 1.5 mm. With blades sharpened to this metric, the coulter blade 140 self-sharpens as time (e.g., 20-40 hours) in soil increases.

Each coulter blade 150 may be sharpened similarly but mounted oppositely. Each blade maintains a blade inside 4510 and a blade outside 4520. The blade inside 4510 being the side proximal to an implement attachment point 4414 and proximal with the oppositely mounted blade of the pair. Each coulter blade may include a first bevel angle 4512, a second bevel angle 4514 and a counter bevel angle 4516. Operationally, an exemplary set of angles may include an approximate relationship from the plane 190 of motion to the first bevel an angle of 160 degrees, a second bevel angle of 175 degrees and a counter bevel of 160 degrees. Each of these bevel angles may be substantially modified for different soil types and variable furrow goals.

The first bevel 4502 and first bevel angle 4512 may operate to maintain a sharpened cutting edge over the life of the blade. The sharp cutting edge may allow the operator flexibility in operation to increase or decrease the size and angle of the first bevel 4502 to match desired soil types. The variable length and angle of the first bevel 4502 may offer the operator a desirable DP required to immerse the blade within the soil, a desirable forward force required to move the blade through the soil, a desirable ability to cut surface residue on the surface and a more accurate furrow in which to plant a seed. The first bevel length may extend from the circumference to any length between the blade hub and the blade circumference. For example, depending on a number of variables including blade diameter and blade width 4540, one desirable first bevel length may be an exemplary 6-20 mm to offer a balance to the operator for continued self-sharpening of the blade while maintaining impact resistance with a submerged obstacle.

In another example, an operator in very soft or moist soils may desire a long life blade without worry about submerged rock damage or impact with an underground obstacle. In this case, is it contemplated herein, a first bevel length may extend an exemplary 150 mm from the circumference to the end of the first bevel 4502. In this example, the operator may maintain a sharp blade for a longer period without concern for rock impact.

The second bevel 4504 and second bevel angle 4514 may also allow the operator flexibility in operation to increase or decrease the size and angle of the second bevel 4504 to accommodate variable soil types and moisture content. The second bevel 4504 may offer structural support to the first bevel 4502 as well as maintaining as sharp of a cutting edge as possible as the blade may wear.

For example, a second bevel 4504 of an exemplary 4-20 mm length may offer the operator a balance between in-soil resistance and an appropriate transition from the first bevel 4502 to the blade outside 4520.

The optional counter bevel 4506 and counter bevel angle 4516 may provide flexibility to an operator to vary each to a specific desired outcome. In single blade operations, the operator may determine a single blade may suffice for a desired outcome. In this case, a coulter blade 140 with no counter bevel 4506 may be appropriate.

Depending on a number of factors including the blade width 4540 and angle at which the blade is mounted on the implement, the counter-bevel angle 4516 may be adjusted by a manufacturer to allow the oppositely mounted blades to accurately mate at the blade mating point 4420. For example, a blade width 4540 of 25 mm may require a counter bevel length much greater than that required for a blade of 4 mm in width. Variables including desired furrow width and depth, implement attachment angle, anticipated soil type and soil moisture content may determine a desired counter bevel length and angle.

Bevel length may also remain variable to account for different sharpening goals based on soil types, anticipated blade life, expected GMO material to be cut and expected seed type and placement. For example, an operator planting primarily in softer moist soils may opt for a sharper blade with a longer first bevel 4502 and a greater first bevel angle 4512. In this manner, an operator within a certain area of agriculture may tailor each variable (first bevel, second bevel, counter bevel, width, diameter and metal construction) of the coulter blade 140 for specific goals.

Counter Bevel Sharpening

Figure 46:
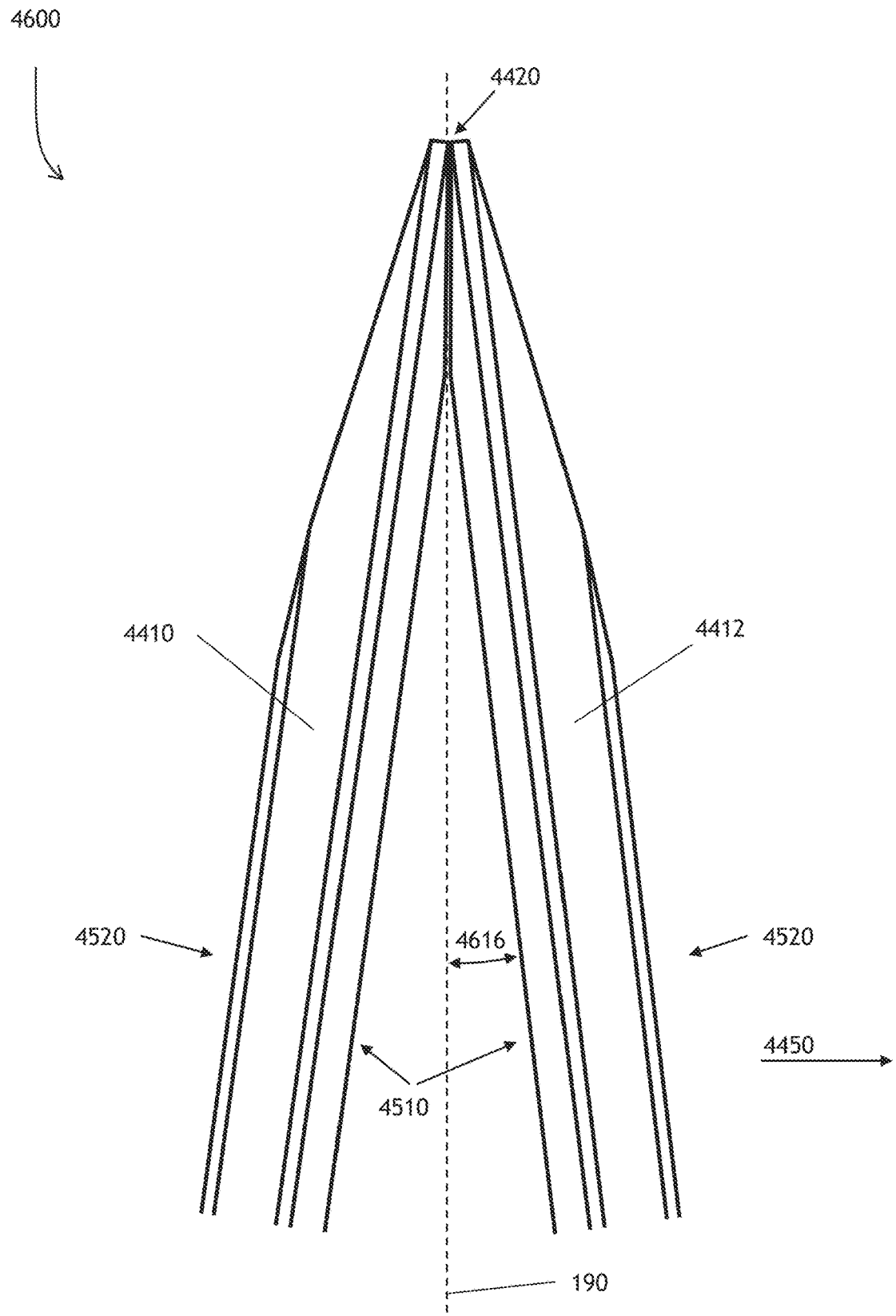
FIG. 46 is an image of an alignment configuration of a pair of coulter blades exemplary of an embodiment of the present invention.

Referring to FIG. 46, an image of an alignment configuration of a pair of coulter blades exemplary of an embodiment of the present invention is generally shown at 4600. As the blades meet at the blade mating point 4420, the counter-bevel of each may mate at an angle causing the minimum gap between the two blades. The counter bevel angle 4516 may be the same for each blade and approximately equal to a mating angle 4616 each blade's plane 190 may make with the longitudinal axes as each blade is mounted on the implement.

In some implementations, the mating angle 4616 may be an exemplary 0-25 degrees for optimal performance. For example, a potato planter may require a wide furrow requiring a furrow of a width of 4 inches. The mating angle 4616 may be variable from an exemplary 3-20 degrees based on desired performance. In a case of offset blades, a mating angle 4616 of an exemplary 4-10 degrees may be appropriate.

During operation, each blade may wear at the same rate allowing for the counter-bevel 4506 mating point 4420 to remain intact and at a constant angle. In this manner, the wearing blades still maintain continuous contact with each other maintaining a sharp blade mating point 4420. Should the blades wear at different rates, the operator may periodically adjust the blades to form a near zero gap at the blade mating point 4420. In the configuration with dissimilar sized blades mounted proximally, each counter bevel angle 4516 may be slightly dissimilar as well to ensure the near-zero desirable gap between the blades. In one example, a counter bevel 4506 length of 2-20 mm may be appropriate for the specific goals.

With sharpened inside bevels, the blade mating point may operate as a sharpened single edge. This combination of 1) a sharpened blade inside counter bevel 4506, 2) an accurately mounted pair of exemplary four mm blades joined at the blade mating point 4420, 3) the double bevel sharpening 4502 4504, and 4) substantial sized bearings 4430 to counter blade flex may offer the operator a system creating a properly shaped furrow, a desirable DP for proper depth, and eventual desirable crop yields.

Blade Types

Figure 47:
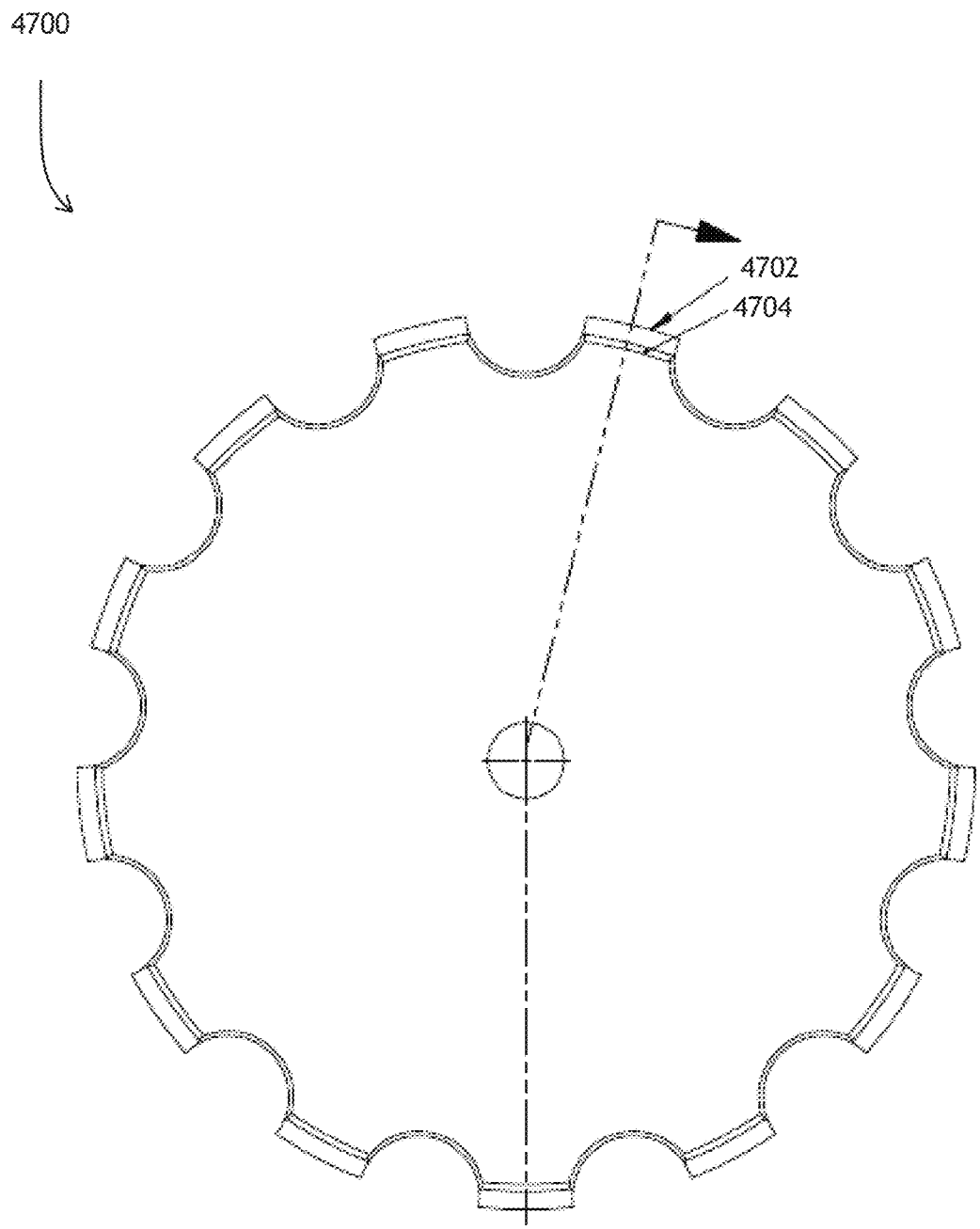
FIG. 47 depicts an image of a notch coulter blade with anti-stubbing beveling exemplary of an embodiment of the present invention.
Figure 48A:
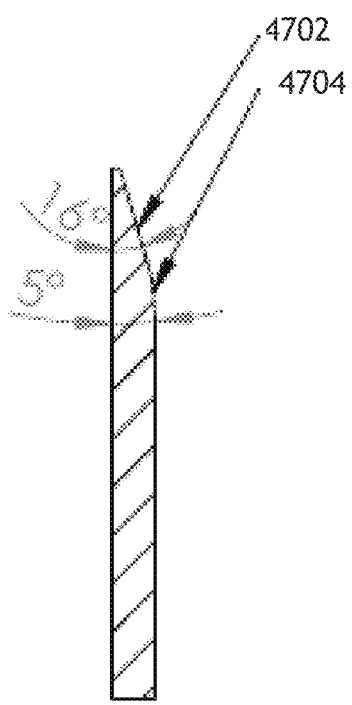
FIGS. 48A-48C are images of a notch coulter blade with anti-stubbing beveling exemplary of an embodiment of the present invention.
Figure 48B:
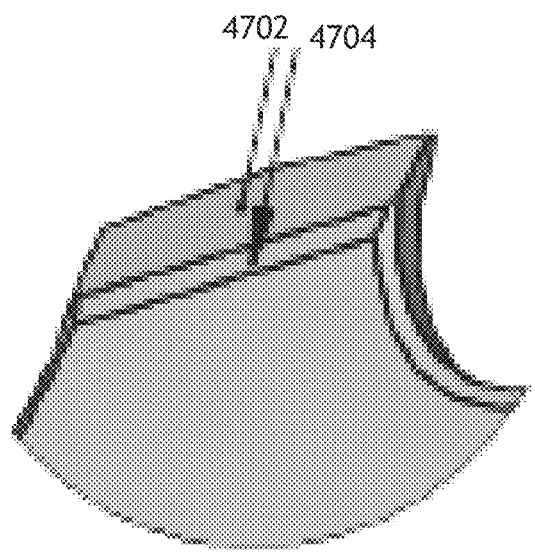
Figure 48C:
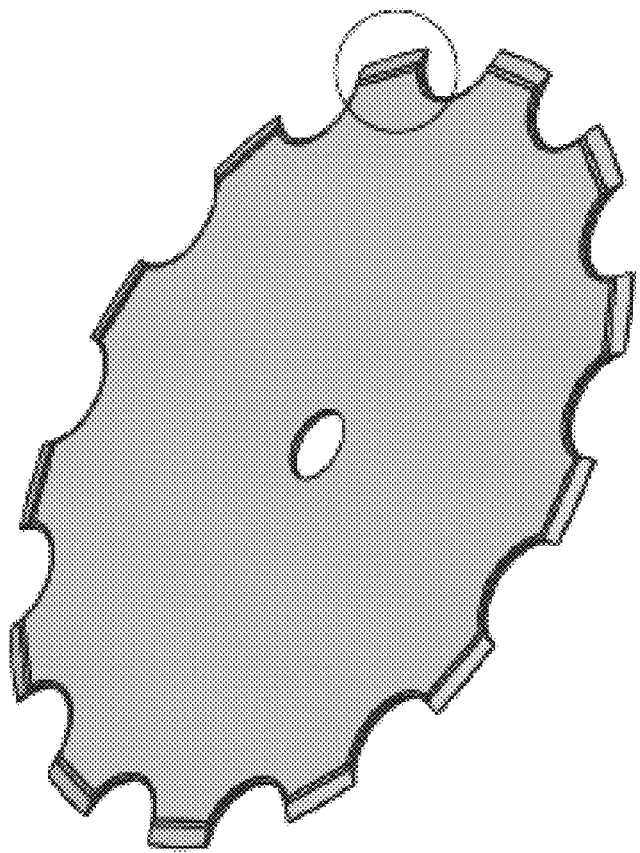

Referring to FIG. 47-48C, images of a notch coulter blade exemplary of an embodiment of the present invention are generally shown at 4700, having an inner/second bevel for anti-stubbing. An exemplary notch blade 4700 may offer an operator flexibility in stubble type and soil type. Of note, variable first bevel angles 4702 of 0-180 degrees may offer the operator flexibility in choosing the correct blade for operation. In addition, smaller variable inner/second bevel angles 4704 of 0-180 degrees may offer additional flexibility to the operator for anti-stubbing. In addition, counter bevel angles of 0-180 degrees may offer flexibility in blade mounting on the implement. Blade thickness of an exemplary 4 mm to 25 mm and variable steel compositions may offer the operator flexibility in specific soil types.

Figure 49:
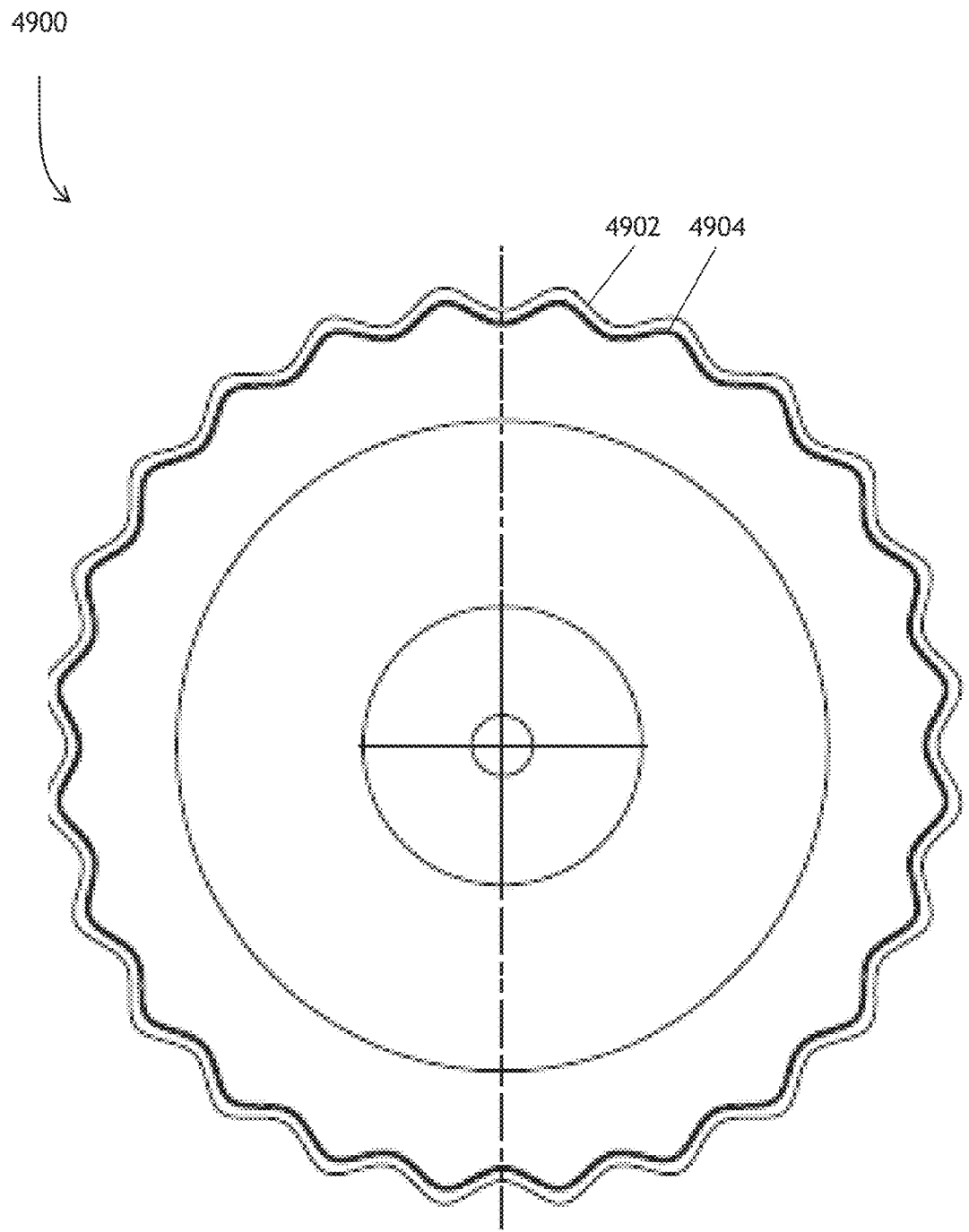
FIG. 49 is an image of a razor coulter blade with anti-stubbing beveling exemplary of an embodiment of the present invention.

Referring to FIG. 49, an image of a razor coulter blade exemplary of an embodiment of the present invention generally shown at 4900, having an inner/second bevel for anti-stubbing. An exemplary razor blade 4900 may offer an operator flexibility in stubble type and soil type. First bevel angles 4902 has a greater length than second bevel 4904. As the blade enters the soil outer bevel/first bevel 4902 penetrates the soil, and as inner/second bevel 4904 engages the soil and stubble it further cuts through the soil and stubble to prevent stubbing.

Figure 50:
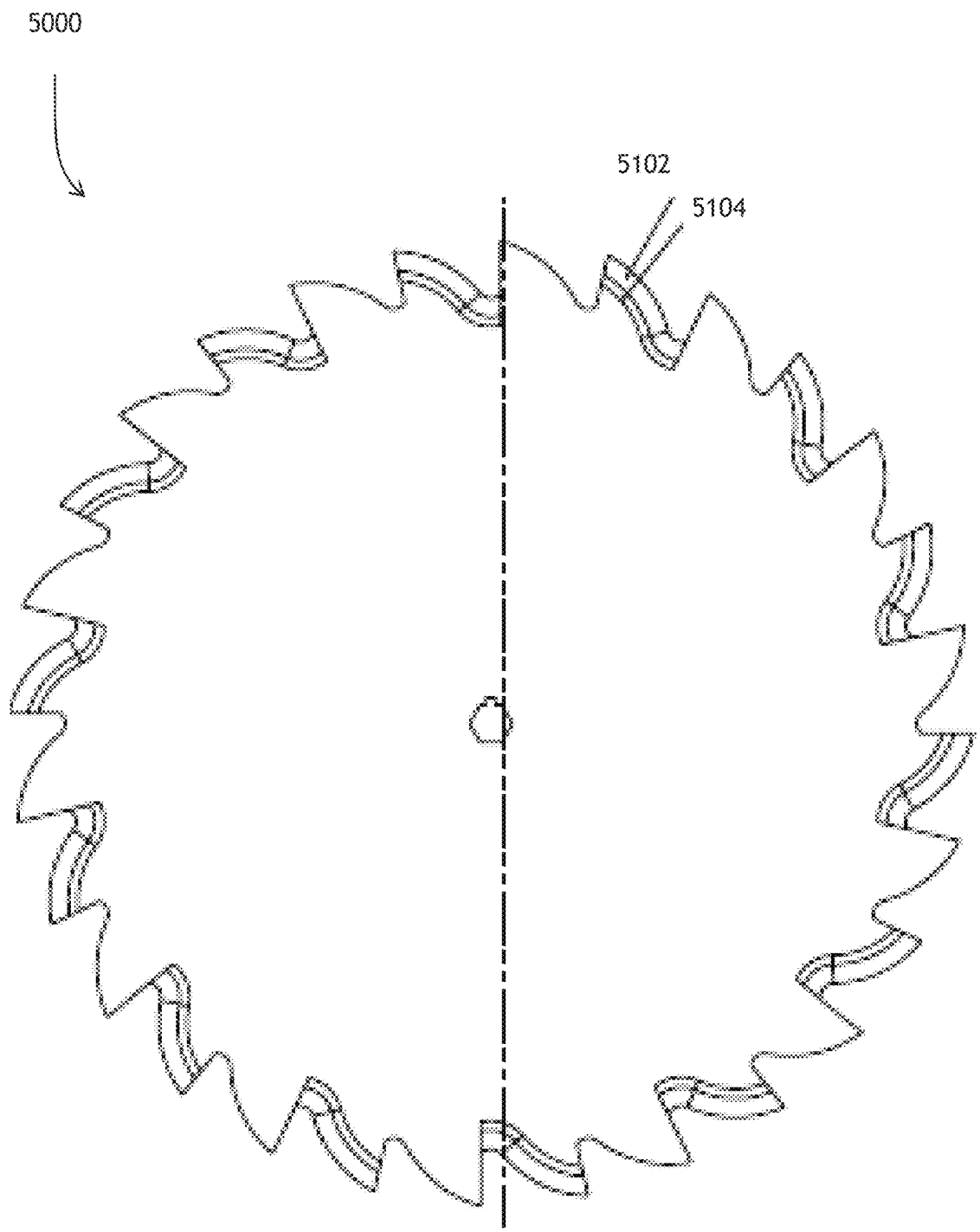
FIG. 50 is an image of a coulter blade having alternating bevel anti-stubbing exemplary of an embodiment of the present invention.
Figure 51A:
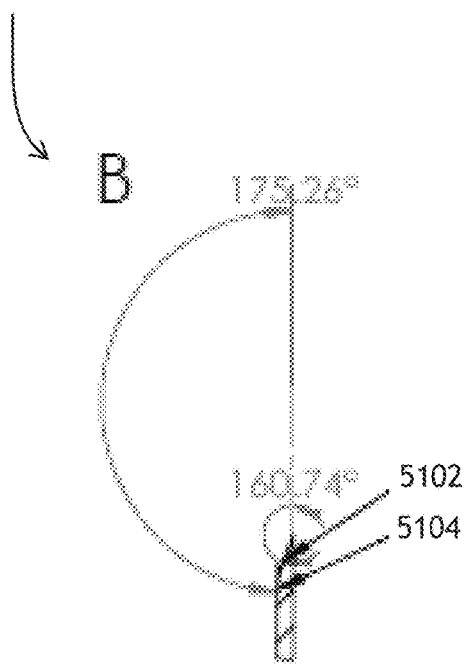
FIGS. 51A-51C are images of a coulter blade having alternating bevel anti-stubbing exemplary of an embodiment of the present invention.
Figure 51B:
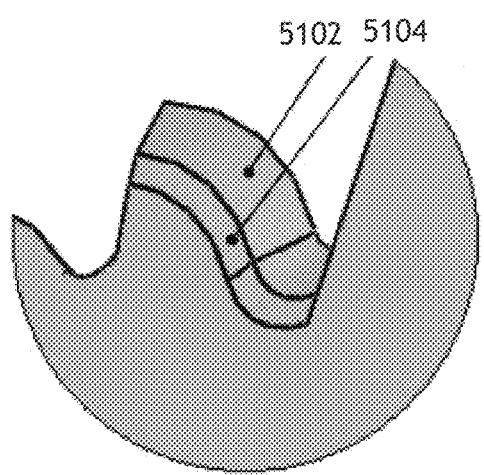
Figure 51C:
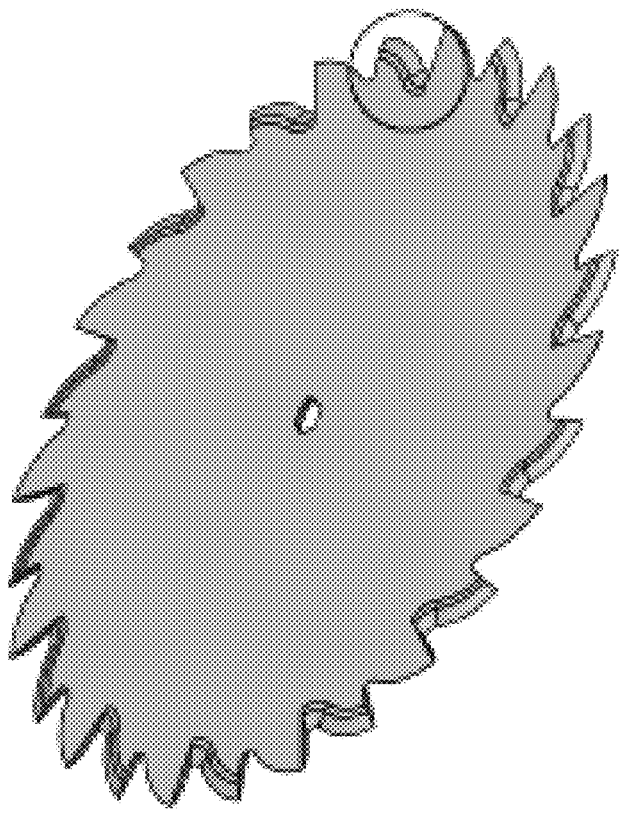

Referring to FIG. 50-51C, images of a coulter blade exemplary of an embodiment of the present invention are generally shown at 5000 and 5100. An exemplary STI blade 5000 may offer an operator flexibility in stubble type and soil type providing alternating bevel (alternating lateral side beveling) with anti-stubbing (an outer first bevel 5102 abutting a smaller in length inner second bevel 5104 for anti-stubbing).

Figure 52:
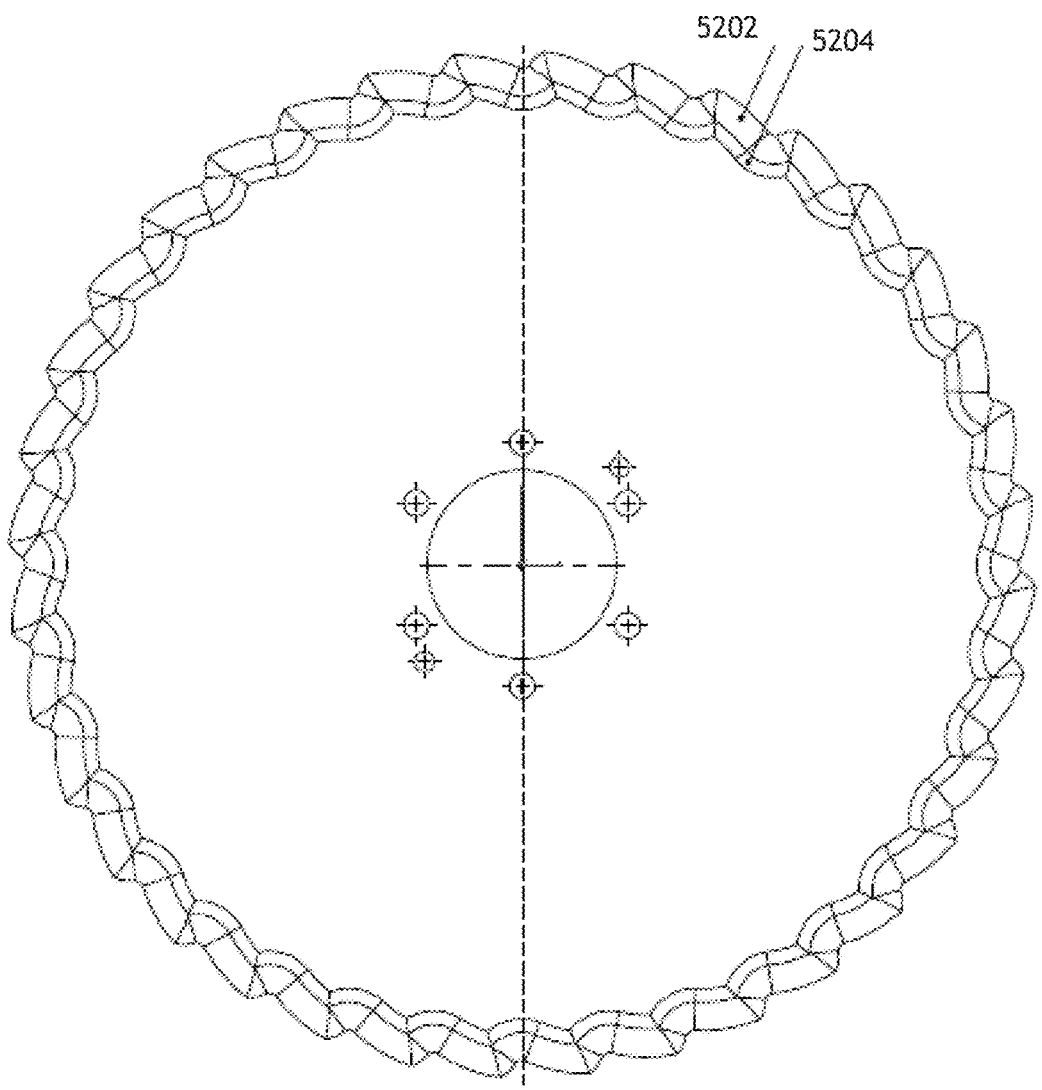
FIG. 52 is an image of a STP series coulter blade with anti-stubbing exemplary of an embodiment of the present invention.
Figure 53A:
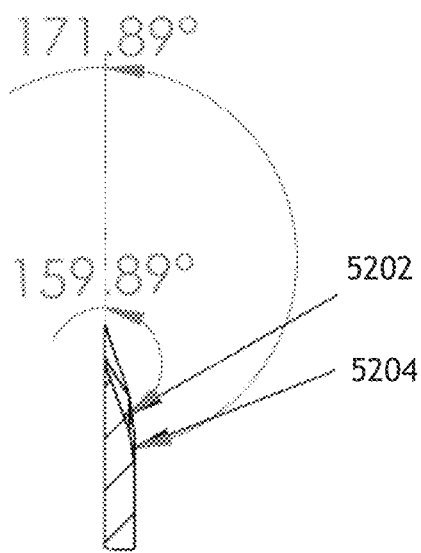
FIGS. 53A-53C are images of a STP series coulter blade with anti-stubbing exemplary of an embodiment of the present invention.
Figure 53B:
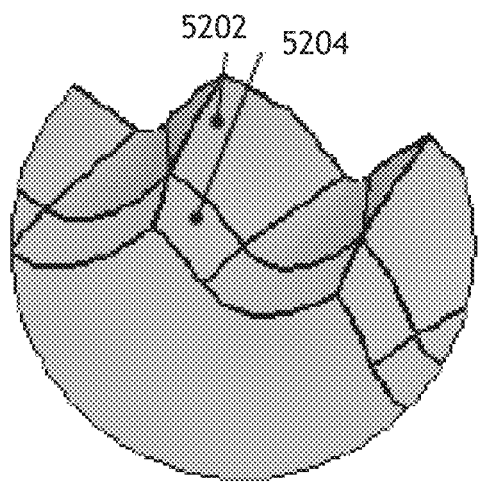
Figure 53C:
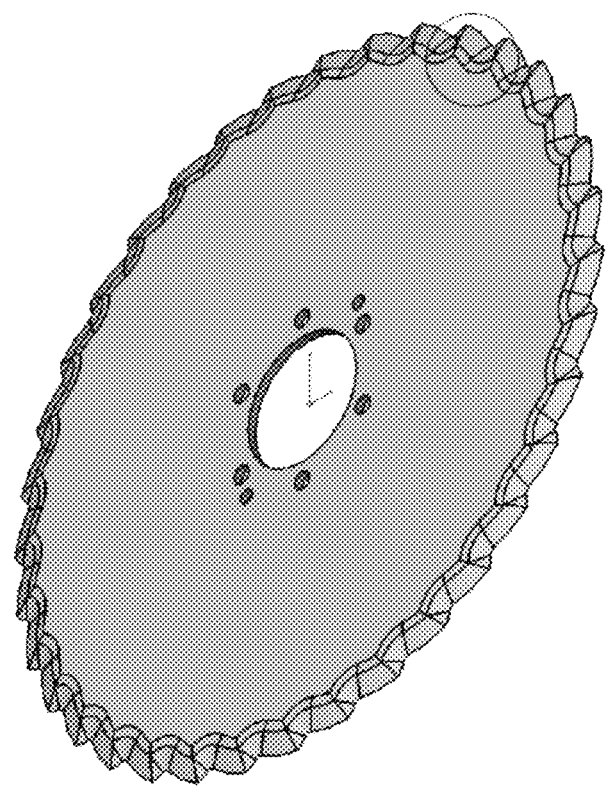

Referring to FIG. 52-53C, images of a coulter blade exemplary of an embodiment of the present invention are generally shown at 5200. An exemplary (Sabre Tooth Planter) STP blade 5200 with anti-stubbing (first outer bevel 5202 and smaller inner or second bevel 5204) may offer an operator flexibility in stubble type and soil type.

Figure 54:
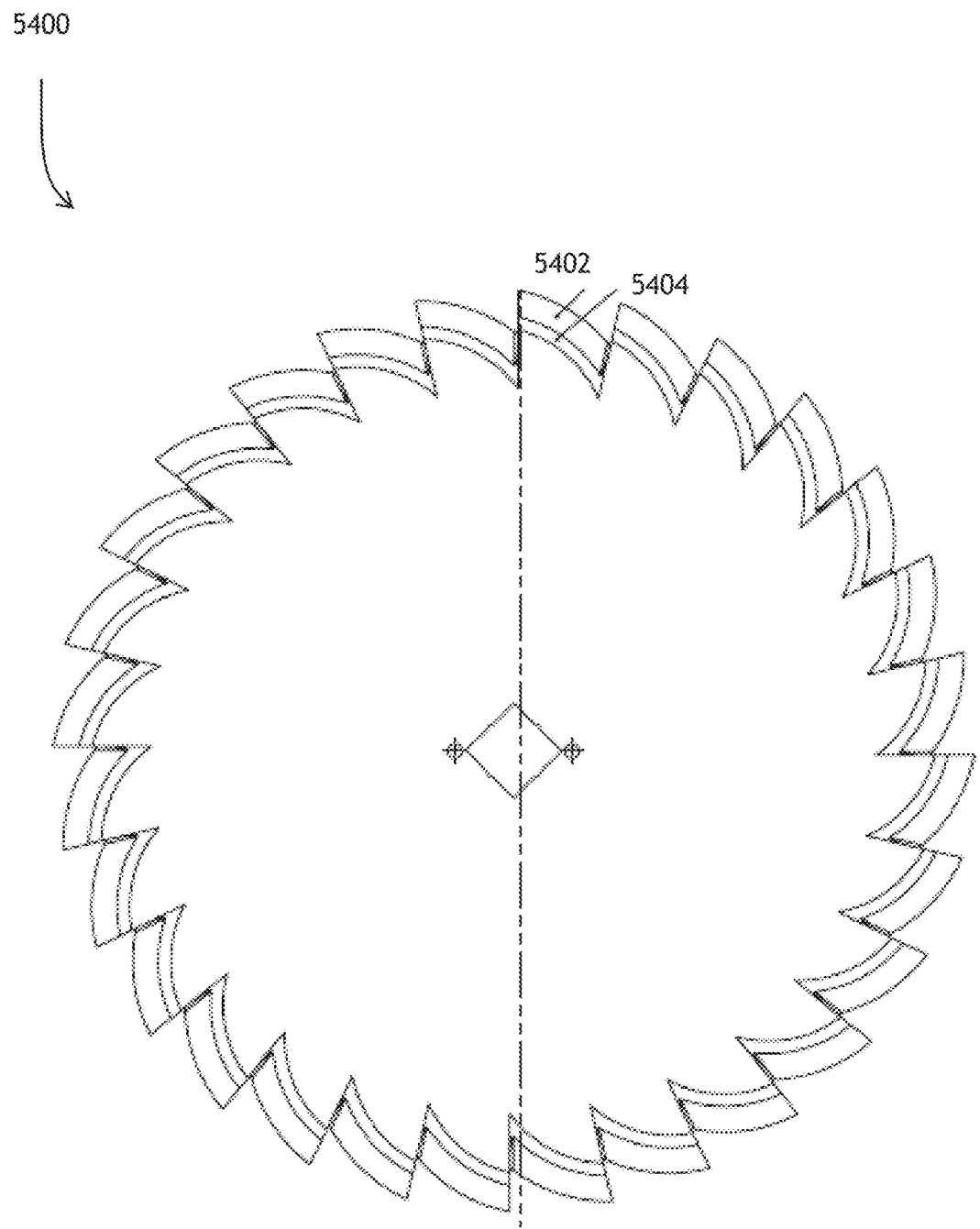
FIG. 54 is an image of a notch coulter blade with one sided bevel with anti-stubbing exemplary of an embodiment of the present invention.
Figure 55A:
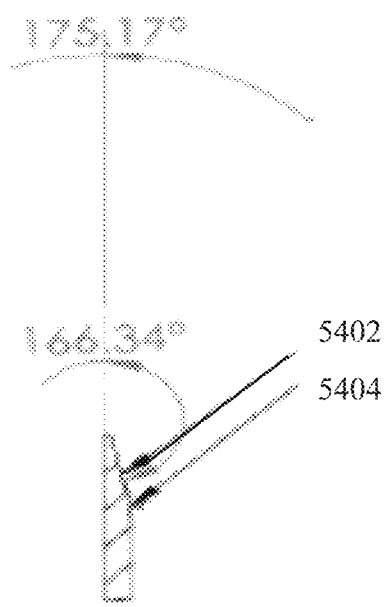
FIGS. 55A-55C are images of a notch coulter blade with one sided bevel with anti-stubbing exemplary of an embodiment of the present invention.
Figure 55B:
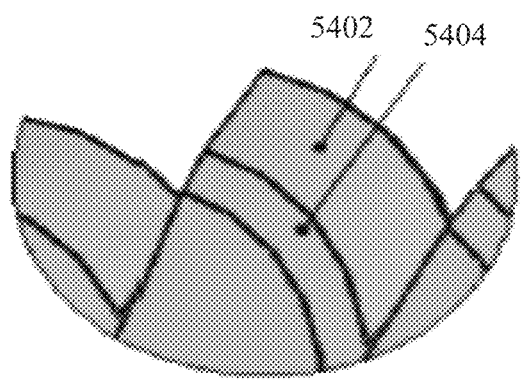
Figure 55C:
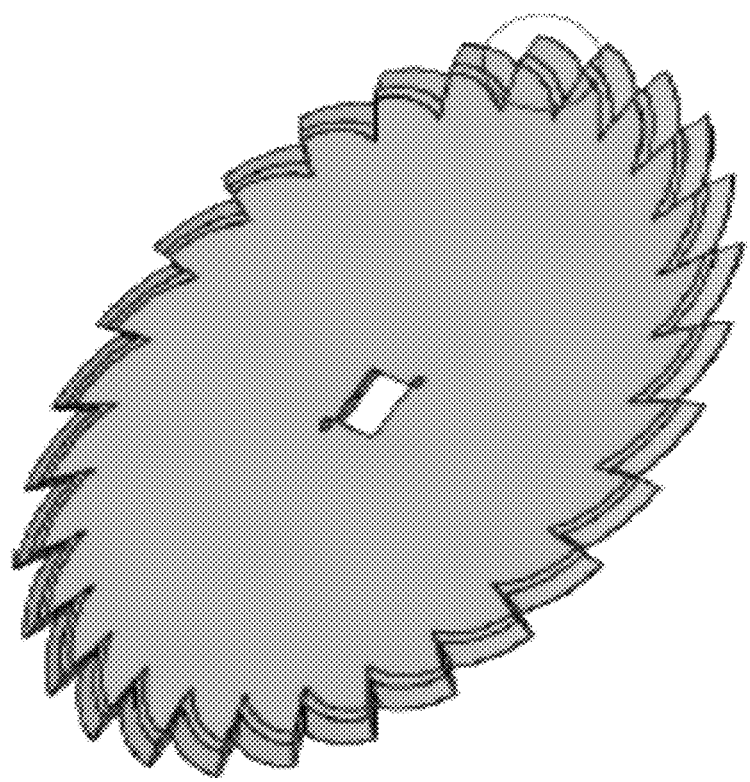
Figure 56:
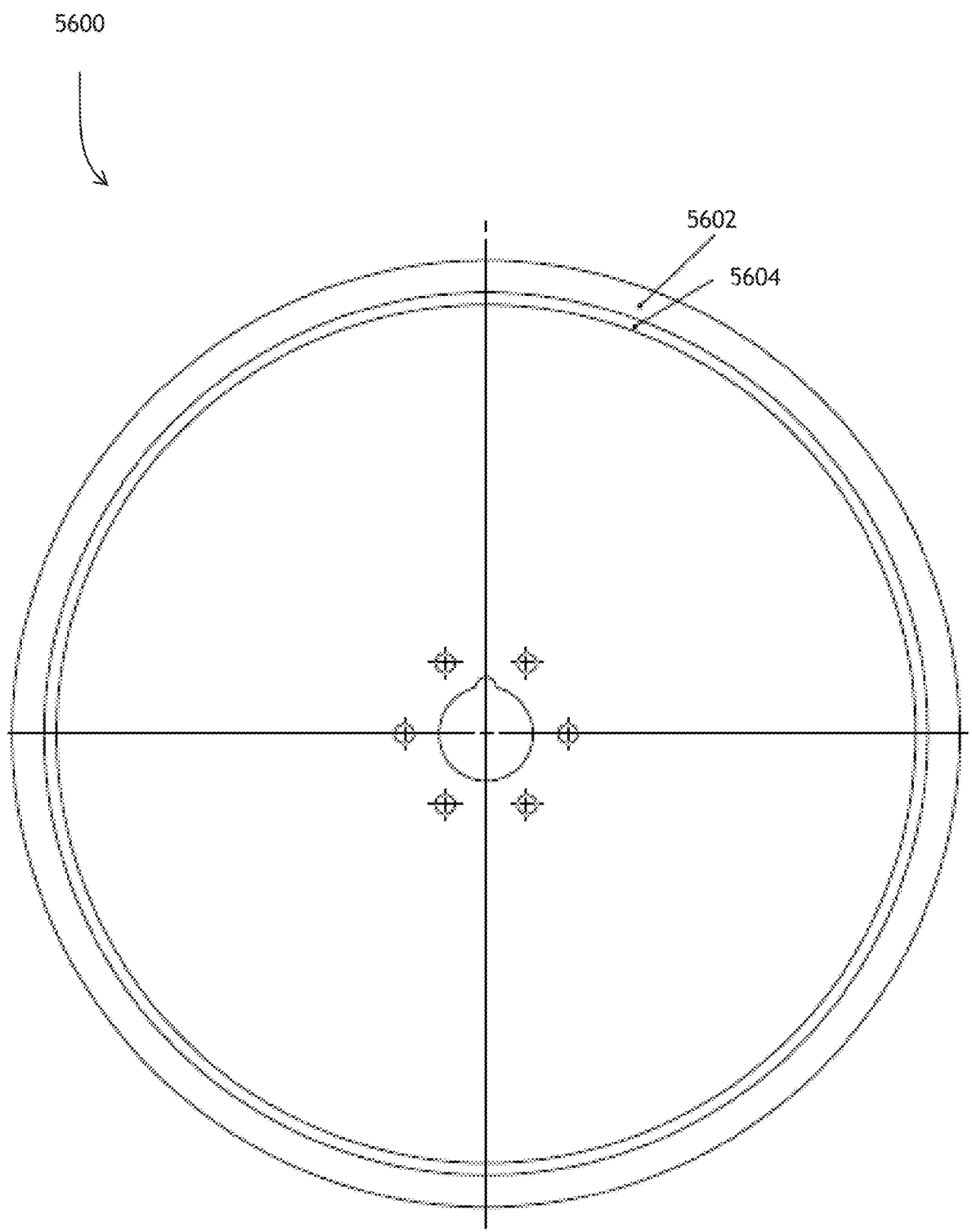
FIG. 56 is an image of a coulter blade with anti-stubbing beveling exemplary of an embodiment of the present invention.
Figure 57A:
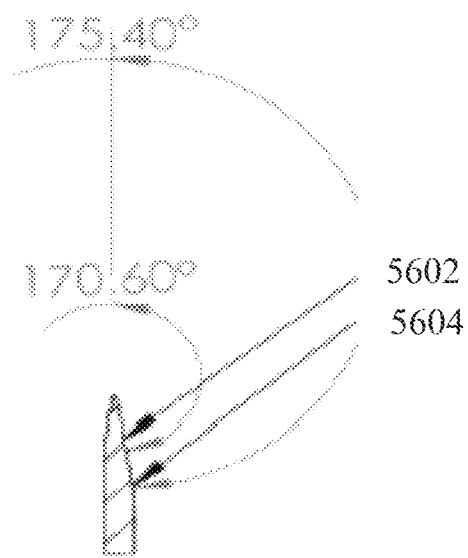
FIGS. 57A-57C are images of a coulter blade with anti-stubbing beveling exemplary of an embodiment of the present invention.
Figure 57B:
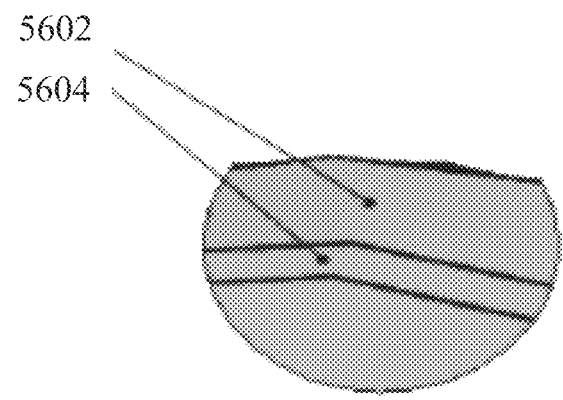
Figure 57C:
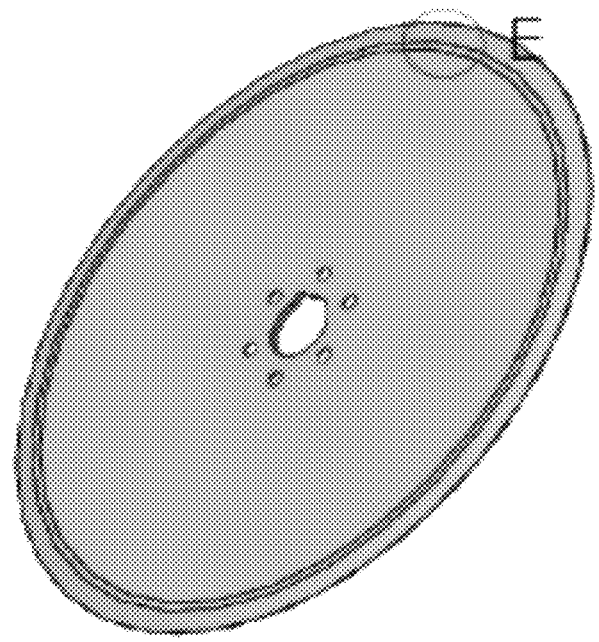

Referring to FIG. 54-55C, images of a notch coulter blade with one sided bevel with anti-stubbing exemplary of an embodiment of the present invention generally shown at 5400. An exemplary Alamo 2 blade 5400 may offer an operator flexibility in stubble type and soil type, constructed having a first outer bevel 5402 having a greater depth or bevel length than an inner second bevel 5404.

FIGS. 56 and 57A-57C are images of a coulter blade with anti-stubbing beveling exemplary of an embodiment of the present invention generally shown at 5600. An exemplary (Sabre Tooth V) STV blade 5600 may offer an operator flexibility in stubble type and soil type, constructed having a first outer bevel 5602 having a greater depth or bevel length than an inner second bevel 5604.

Figure 58A:
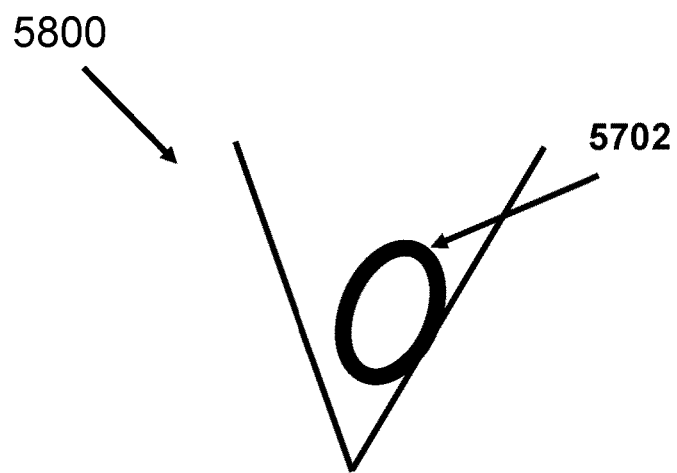
FIGS. 58A and 58B are images of a desirable seed furrow notch created by an embodiment of the present invention.
Figure 58B:
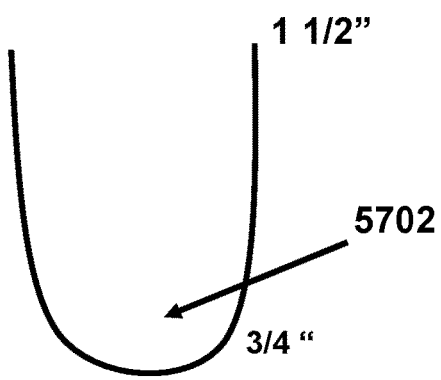

Referring to FIGS. 58A and 58B, images of a desirable seed furrow notch created by an embodiment of the present invention are generally shown at 5800. An additional goal of embodiments disclosed herein may include the creation of the "U" shaped furrow found in FIG. 58B. The seed 5702 may fall to the base of the "U" and be surrounded with granulated soil for growth. Conversely, the "V" shaped furrow of FIG. 58A may cause the seed 5702 to remain at a point undesirably distant from the base of the furrow. The blade may be a STP 2" blade at top and ¾" at bottom, for example.

FIG. 59 is a diagram of characteristics of blades of dissimilar size exemplary of an embodiment of the present invention, shown generally at 5900. The diagram 5900 shows, for representative example, coulter blade diameter, circumference, revolutions per 100 feet, cutting circumference, tooth count, tooth length and tooth cutting length. The STP example represents a centered planter unit/teeth and blade having a centered axis with 2 different blade sizes mating, seeder or standard series with inside counter bevel. The blades may be mounted together in an aligned/centered configuration and/or off-set with off-set alignment (angles) and/or off set blade sized. Off set blade sizes in centered axis applications can be applied with 2 different sized blades on a centered axis allowing the same theories of lessening blade outside linear diameter soil engagement and down pressure requirements as set forth herein. For example, mounting of 2 blades 15" in diameter may require 20" or 10" per blade, of linear soil engagement and down pressure requirement vs a lead blade using 10" of linear diameter of soil engagement and down pressure requirements as the trailing blade only has a side force vs a down force requirement.

Non-Insert Blades & Inside Bevel

Figure 60A:
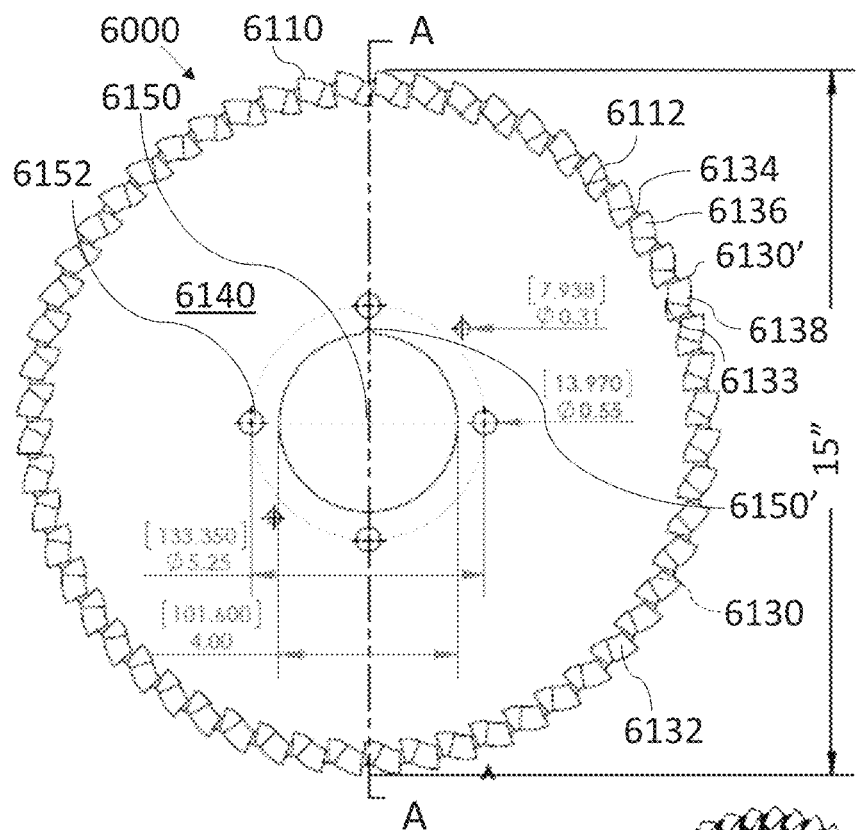
FIG. 60a is a top plan view of a coulter blade exemplary of an embodiment of the present invention.
Figure 60B:
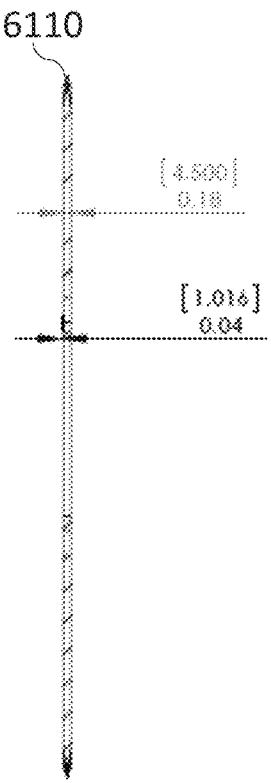
FIG. 60b is a side view of the coulter blade of FIG. 60a taken along cross-section A-A.
Figure 60C:
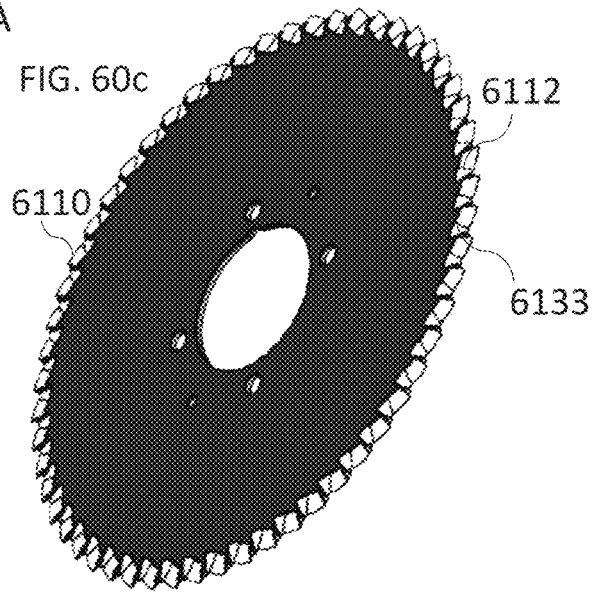

FIGS. 60a-60c illustrate an embodiment of the coulter blade. FIG. 60a is a top plan view of a coulter blade exemplary of an embodiment of the present invention, shown generally at 6000. FIG. 60b is a side view of the coulter blade of FIG. 60a taken along cross-section A-A. FIG. 60c is a top side view of the coulter blade of FIG. 60a.

Referring to FIGS. 60a-60c, the coulter blade 6000 is a circular coulter blade 6140 including a plurality of teeth 6110. Each tooth 6110 includes a tooth cutting edge 6136 and tooth back 6134. It is noted that both the tooth cutting edge 6136 and tooth back 6134 may be a cutting edge surface. Between each tooth 6110 is a fillet/gullet 6112 which provides qualities for tooth effectiveness.

Each tooth 6110 includes lateral sides 6132, 6130. Each tooth 6110 may be sharpened on opposite and alternate lateral sides 6132, 6130 for an alternating tooth sharpening arrangement. Preferably, as shown, each tooth 6110 lateral side 6132 and back side is sharpened for a continuous sharpened surface. The tooth 6110 structure effectively eliminates lateral sidewall pressure as the circular coulter blade cuts through soil. In embodiments, the circular coulter blade 6000 may be configured with a plurality of inserts (not shown). Preferably, the subject blade 6000 does not include inserts/insert openings.

Preferably, each tooth 6110 is structured having a concentrated saber tooth shape as shown generally at 6138 extending from a tooth tip 6130' to an inside bevel 6133 and continuing preferably through at least a portion of fillet/gullet 6112. Inside bevel 6133 herein intersects the fillet/gullet 6112 to cutting edge 6136 interface of tooth 6110. Tooth designs increase cutting length, holds and positions residue, creates shearing or scissor action, maintains bevel and fillet, and creates concentrated force and friction in forward motion. These structural advantageous maintain or increase tip speed utilizing higher percentages of rotation.

Fillet/gullet 6112 extends from cutting edge 6136 and continues to extend along at least a portion of the tooth back 6134. Fillet/gullet 6112 and cutting edge 6136 preferably include at least one inside bevel 6133 and together form a cupped bevel tooth construct provided for cutting, sizing, slicing, shredding, mowing and processing soil and stubble. In one embodiment, the circular coulter blade 6000 is detachably mountable to a tillage machine capable of mounting and operating multiple coulter blades via a central axis point 6150 (herein shown as an aperture/blade hub and drive holes 6152). In the embodiment shown, central axis point 6150/hub is constructed as an aperture with a notch 6150' for mounting the blade on an agricultural machine/device. It is contemplated herein; a bearing or other well-known rotatable device may allow for free rotation of the coulter blade 6000.

Inside bevel 6133 creates a joint turn effort between agricultural assemblies (such as seeders) with the blade assemblies mounted thereon, as to a centered or aligned blade unit. One or more blades 6000 align at a center point or rotational axis, herein the aperture/hub 6150, thereby maintaining joint rotation, lessening soil and stubble pushing, subsoil, side wall and surface compaction, soil smearing, unit plugging and pre-mature wear. Utilizing inside bevel 6133 lengthens joint blade contact during shallow planting applications and lessoning or preventing cut and uncut stubble or roots from attaching to the inside of the blade. What is more, the inside bevel 6133 prevents lodging of stubble and roots into the rotational point, unit inside scrapper or seed tube guard and seeding tube or seed delivery device. Furthermore, the inside bevel 6133 allows thicker blade materials to be used, which correlates to increased blade longevity, rigidity, less blade deflection, improved and maintained blade to depth contact, and improved seed trench or furrow formation. In conjunction multiple blade sizes and tooth designs, the inside bevel creates superior cutting, shearing or sizing action in multiple applications, such as No-Till, Cover crop, Green Planting, Bt stubble, stripper stubble, minimum till, strip till, soft soils, moist stubble, peat soils and conventional till.

Fillet/gullet 6112 is preferably a U-shaped furrow bottom, versus a V or W shaped furrow bottom. This U-shape of the fillet/gullet 6112, particularly in combination with the inside bevel, prevents seed lodging and improves soil to seed contact, improves soil and stubble removal from blade, and prevents and/or lessens soil and stubble build up between blade and depth wheel causing row plugging, bending and row unit failures and uneven depth control. Fillet/gullet 6112 U-shape results in a negative concavity/negative out-side diameter concavity that has been found to increase soil flow, soil lifting, soil fracturing while lessoning down pressure requirements. Utilizing a negative out-side diameter concavity allows tooth shearing or cutting, soil lodging or soil flowing actions similar to those encountered with inside bevel functionality. Negative tooth concavity angles as flat centered hole blade concavity and or outer diameter concavity, tooth or blade bevel area, increases soil lodging or soil flow by forcing more condensed soil into the tooth design.

FIG. 61a is a top plan view of a concave coulter blade exemplary of an embodiment of the present invention, shown generally at 61000. FIG. 61b is a side view of the coulter blade of FIG. 61a taken along cross-section B-B. FIG. 61c is a view of the teeth of the coulter blade of FIG. 61a taken along cross-section A. FIG. 61d is a top side view of the coulter blade of FIG. 61a. Referring to FIGS. 61a-61d, the coulter blade 61000 is a circular coulter blade 61140 having a concave shape and including a plurality of teeth 61110. Each tooth 61110 includes a tooth cutting edge 61136, a tip 61130', tooth back 61134 and a fillet/gullet 61112. Tooth 61110 includes lateral sides 61132, 61130. Preferably, as shown, each tooth 61110 lateral side 61132 is sharpened for a continuous sharpened surface. Preferably, each tooth 61110 is structured having a concentrated saber tooth shape as shown generally at 61138 extending from a tooth tip 61130' through a first outside bevel 61133' extending to an inside bevel 61133 and continuing preferably through at least a portion of fillet/gullet 61112 (61130/61132/61136 same side bevel/6112 straight fillet or bevel with unsharpened tooth backside). The circular coulter blade is appointed to be detachably mountable to a tillage machine capable of mounting and operating multiple coulter blades via a central axis point 61150 (herein shown as an aperture/blade hub).

Figure 62A:
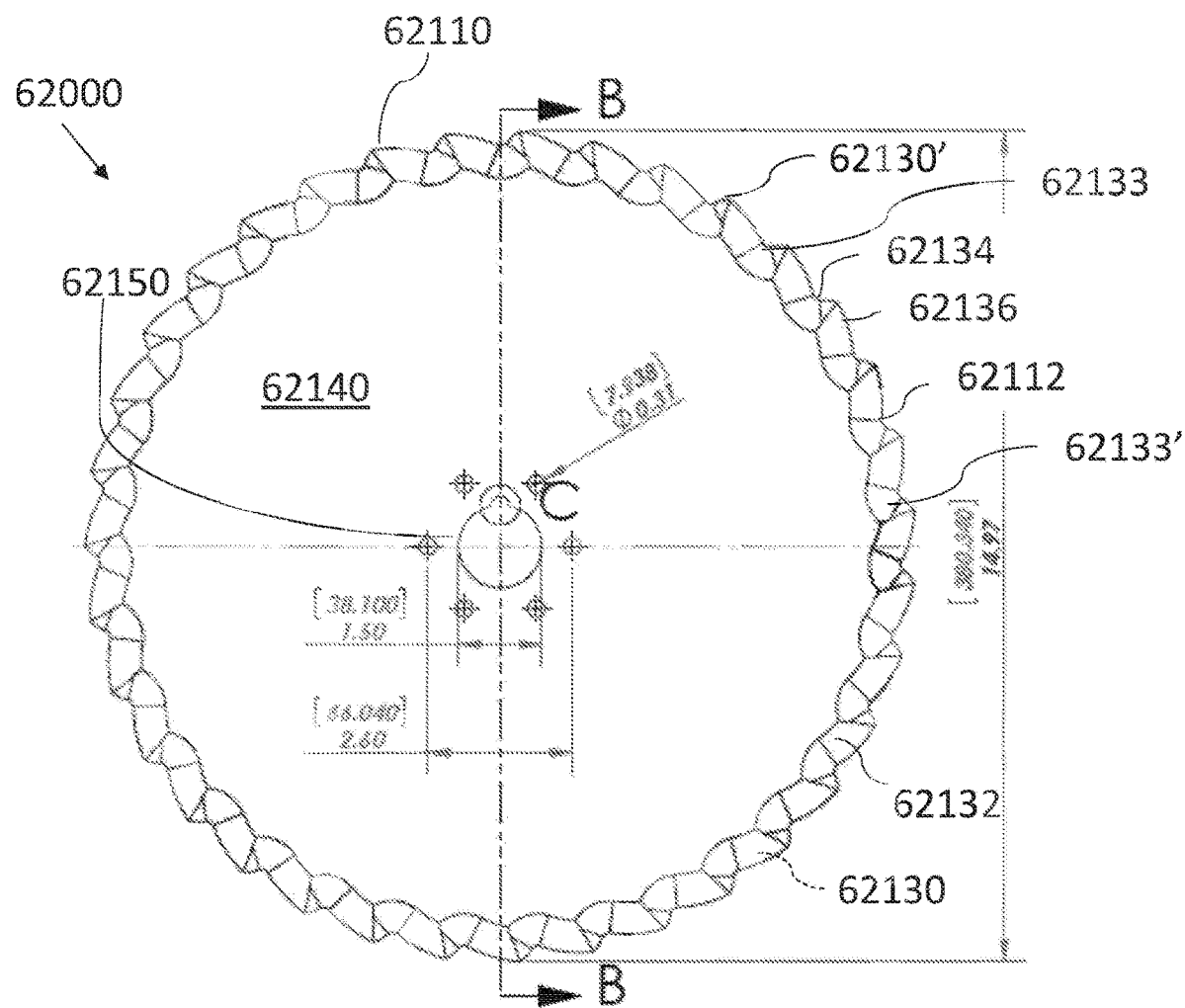
FIG. 62a is a top plan view of a coulter blade exemplary of an embodiment of the present invention.

FIGS. 62a-62d illustrate an embodiment of the subject coulter blade. FIG. 62a is a top plan view of a coulter blade exemplary of an embodiment of the present invention generally shown at 62000. FIG. 62b is a side view of the coulter blade of FIG. 62a taken along cross-section B-B. FIG. 62c is a view of the teeth of the coulter blade of FIG. 62a taken along cross-section C. FIG. 62d is a top side view of the coulter blade of FIG. 62a. Referring to FIGS. 62a-62d, the coulter blade 62000 is a circular coulter blade 62140 having a planar shape and including a plurality of teeth 62110 having a sharpened tooth backside. Each tooth 62110 includes a tooth cutting edge 62136, a tip 62130', tooth back 62134 and a U-shaped fillet/gullet 62112. Tooth 62110 includes lateral sides 62132, 62130. Preferably, as shown, each tooth 62110 lateral side 62132 is sharpened for a continuous sharpened surface. Preferably, each tooth 62110 is structured having a concentrated saber tooth shape as shown generally at 62130 extending from tooth tip 62130' to a first inside bevel 62133 and continuing preferably through at least a portion of fillet/gullet 62112. In the embodiment shown, the tooth back 62134 includes a second inside bevel 62133' proximal to the tooth back 62134 to fillet/gullet 62112 intersection. The circular coulter blade is appointed to be detachably mountable to an agricultural machine capable of mounting and operating multiple coulter blades via a central axis point 62150 (herein shown as an aperture/blade hub).

Figure 63A:
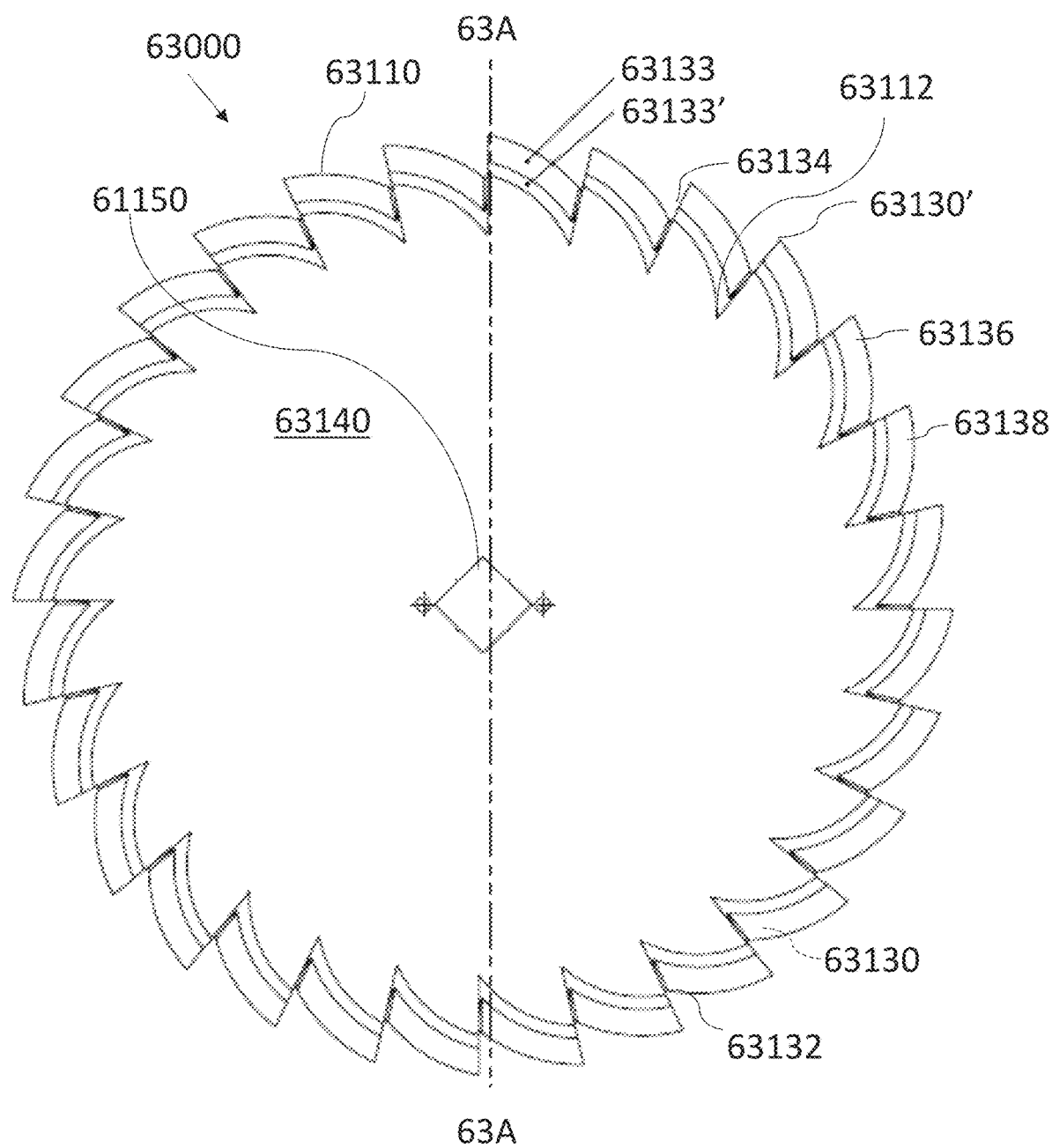
FIG. 63a is a top plan view of a coulter blade exemplary of an embodiment of the present invention.

FIG. 63a is a top plan view of a coulter blade exemplary of an embodiment of the present invention generally shown at 63000. FIG. 63b is a side view of the coulter blade of FIG. 63a taken along cross-section 63A-63A. FIG. 63c is a view of the teeth of the coulter blade of FIG. 63b taken along cross-section F. FIG. 63d is a top side view of the coulter blade of FIG. 63a. FIG. 63e is a view of the teeth of the coulter blade of FIG. 63b taken along cross-section D. Referring to FIGS. 63a-63d, coulter blade 63000 is a circular coulter blade 63140 having a plurality of teeth 63110. Each tooth 63110 includes a tooth cutting edge 63136, a tip 63130', tooth back 63134 and a fillet/gullet 63112, herein having a V shape (although, the gullet may be curved/rounded or U shape). Tooth 63110 includes lateral sides 63132, 63130. Preferably, as shown, each tooth 63110 lateral side 63132 is sharpened for a continuous sharpened surface. It is noted that lateral side 63130 may also be sharpened. Preferably, each tooth 63110 is structured having a concentrated saber tooth shape as shown generally at 63138 extending from tooth tip 63130'. A first inside bevel 63133 is provided that continues through at least a portion of fillet/gullet 63112. In the embodiment shown, there is a second inside bevel 63133' that extends from the tooth back 63134 tip through cutting edge 63136 and the gullet 631112. Inside bevel 63133 and fillet/gullet 63112 provide anti-stubbing straight fillet construction. The circular coulter blade is appointed to be detachably mountable to an agricultural machine capable of mounting and operating multiple coulter blades via a central axis point 63150 (herein shown as an aperture/blade hub).

Figure 64A:
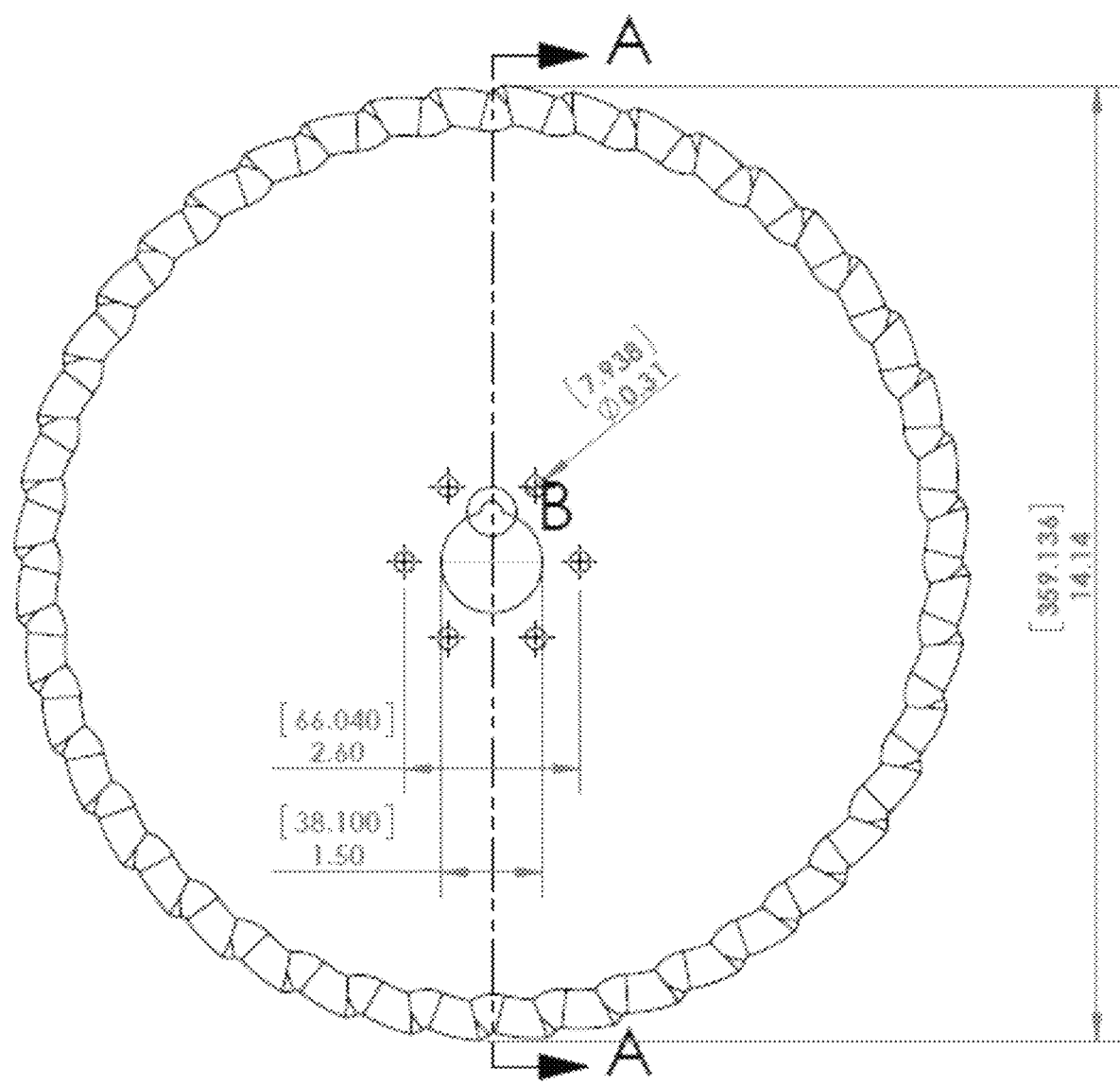
FIG. 64a is a top plan view of a coulter blade exemplary of an embodiment of the present invention.

FIG. 64a is a top plan view of a coulter blade exemplary of an embodiment of the present invention. FIG. 64b is a side view of the coulter blade of FIG. 64a taken along cross-section 64A-64A. FIG. 64c is a view of the hub of the coulter blade of FIG. 64a taken along cross-section B. FIG. 64d is a top side view of the coulter blade of FIG. 64a.

Figure 65A:
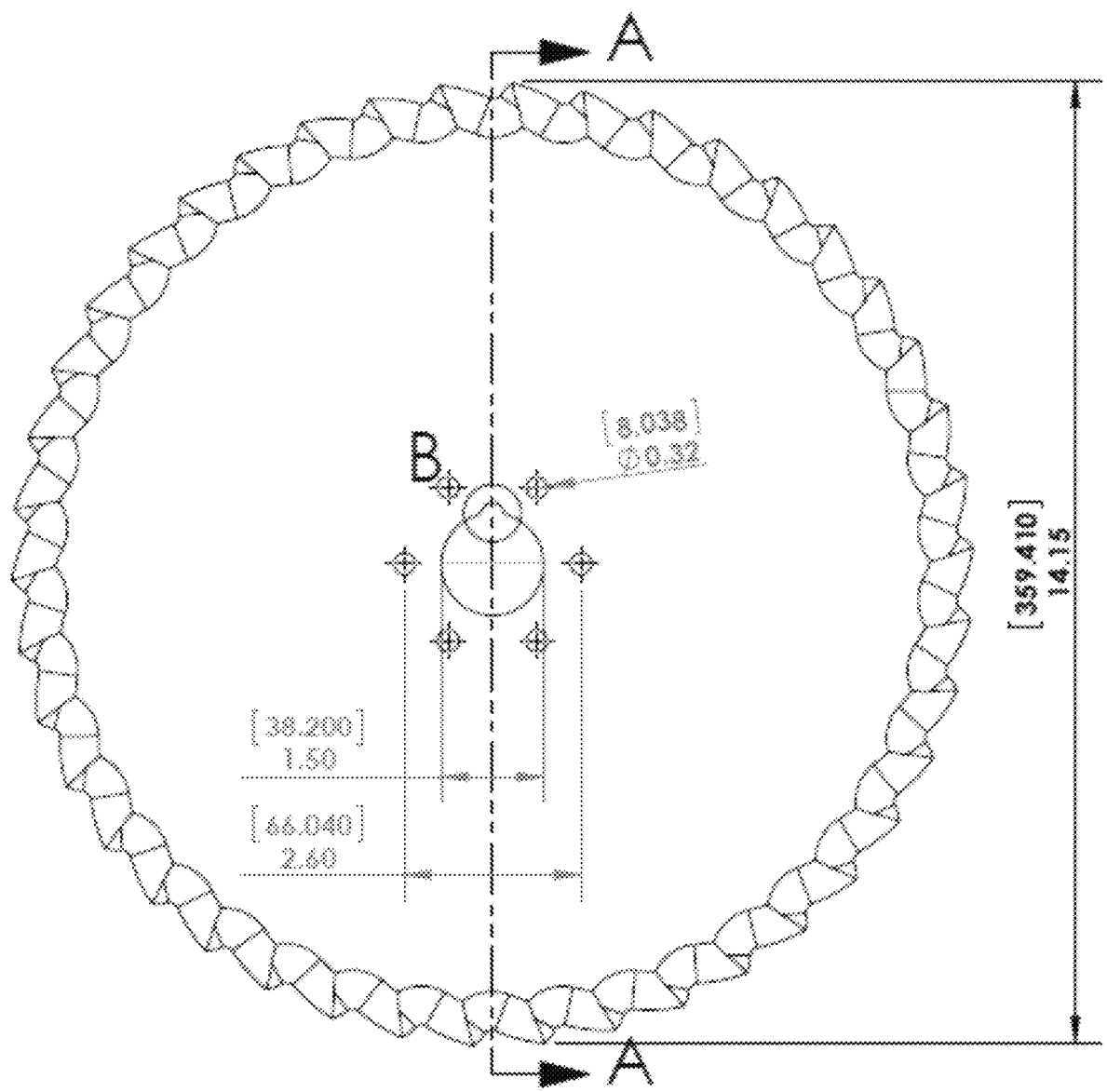
FIG. 65a is a top plan view of a coulter blade exemplary of an embodiment of the present invention.

FIG. 65b is a side view of the coulter blade of FIG. 65a taken along cross-section A-A positive or negative concavity option wherein negative concavity concaves away from tooth pattern/positive concavity concaves toward the tooth pattern. FIG. 65b is a side view of the coulter blade of FIG. 65a taken along cross-section A-A. FIG. 65c is a view of the hub of the coulter blade of FIG. 65a taken along cross-section B. FIG. 65d is a top side view of the coulter blade of FIG. 65a. + concavity more dense soil loading on teeth making blade flow more soil making wider furrows very aggressive; − concavity makes less condensed or forced soil inside the tooth pattern, and results in less aggressive soil flow and a narrower furrow. The degree of concavity depends on soil type and cover crops application. Negative concavity increases soil load. Increasing teeth (frequency) loosens soil off roots and flows more soil. Positive concavity creates more vibrations. Concavity used will depend on crop and soil applications.

FIG. 66 is a top plan view of a coulter blade exemplary of an embodiment of the present invention, shown generally at 66000. Coulter blade 66000 is a circular coulter blade 66140 having a planar shape and including a plurality of teeth 66110 having a tooth cutting edge 66136, tip 66130', tooth back 66134 and a U-shaped fillet/gullet 66112. Tooth 66110 includes lateral sides 66132, 66130. Preferably, each tooth 66110 is structured having a concentrated saber tooth shape 66130 extending from tooth tip 66130' to a first inside bevel 66133 and continuing preferably through at least a portion of fillet/gullet 66112. The circular coulter blade is appointed to be detachably mountable to an agricultural machine capable of mounting and operating multiple coulter blades via a central axis point 66150 (herein shown as an aperture/blade hub). The subject blade makes contact 1-2.5", clearing more dense stubble and leaving a more even path for planting or seeding. Consequently, soil and stubble shedding is effected efficiently, without need for a scraper.

Figure 67A:
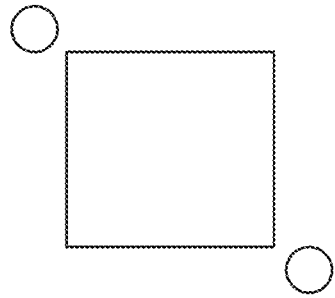
FIG. 67a is a top plan view of a blade hub exemplary of an embodiment of the present invention.
Figure 67B:
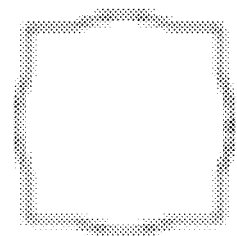
FIG. 67b is a top plan view of a blade hub exemplary of an embodiment of the present invention.
Figure 67C:
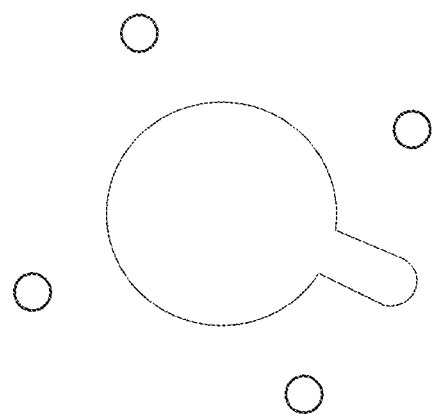
FIG. 67c is a top plan view of a blade hub with one or more alignment slot and/or hole exemplary of an embodiment of the present invention.
Figure 67D:
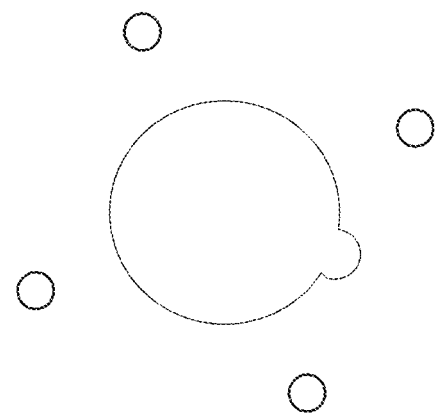
FIG. 67d is a top plan view of a blade hub with one or more alignment slot and/or hole exemplary of an embodiment of the present invention.
Figure 67E:
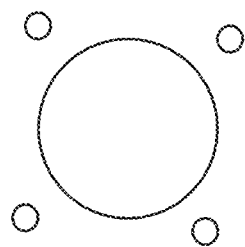
FIG. 67e is a top plan view of a blade hub exemplary of an embodiment of the present invention.

FIG. 67a is a top plan view of a blade hub exemplary of an embodiment of the present invention. FIG. 67b is a top plan view of a blade hub exemplary of an embodiment of the present invention. FIG. 67c is a top plan view of a blade hub exemplary of an embodiment of the present invention having alignment slots/shapes/notches and/or holes for precise bevel and tooth shaping/cutting. FIG. 67d is a top plan view of a blade hub exemplary of an embodiment of the present invention. FIG. 67e is a top plan view of a blade hub exemplary of an embodiment of the present invention.

Figure 68B:
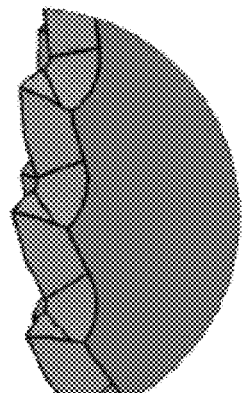
FIG. 68b is a cross-section view of the coulter blade of FIG. 68a taken along cross-section C.
Figure 68D:
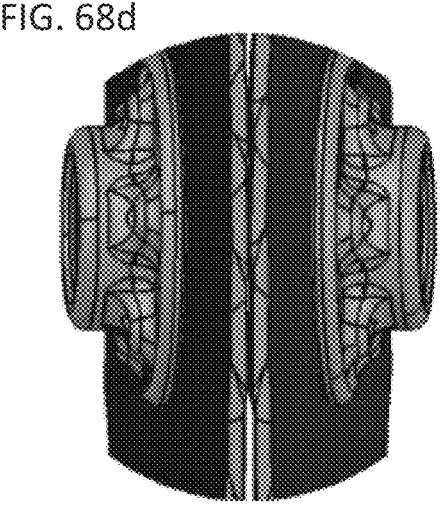
FIG. 68d is a cross-section view of the coulter blades of FIG. 68c taken along cross-section A.
Figure 68A:
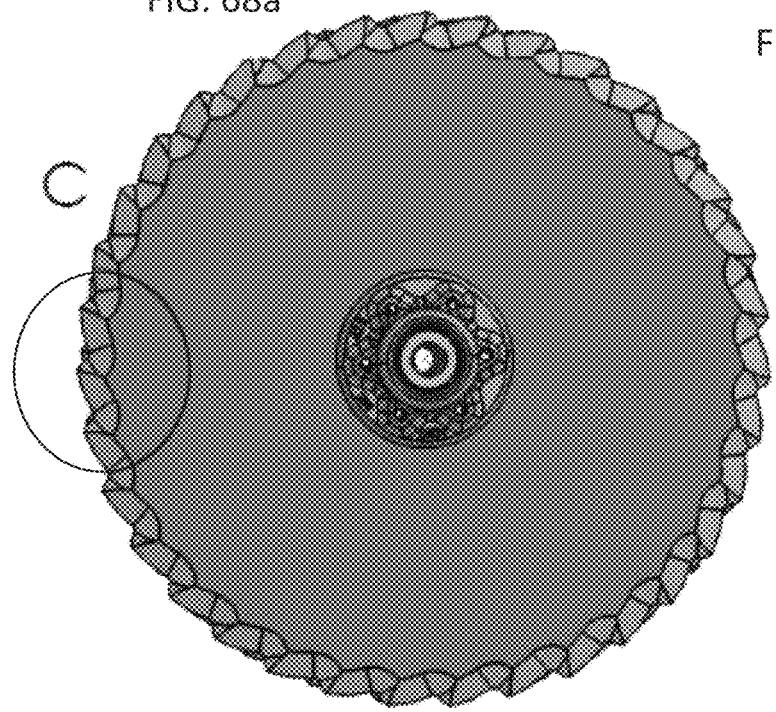
FIG. 68a is a top plan view of a coulter blade exemplary of an embodiment of the present invention.
Figure 68C:
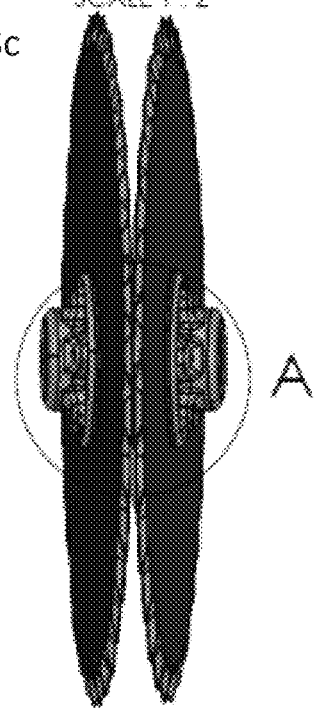
FIG. 68c is a top plan view of the coulter blade of FIG. 68a placed in line, in parallel relation, with another blade.
Figure 68F:
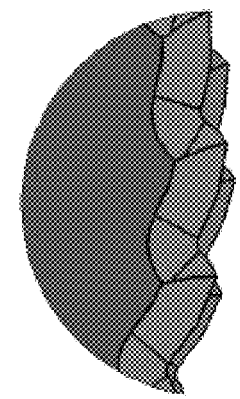
FIG. 68f is a cross-section view of the coulter blades of FIG. 68e taken along cross-section B.
Figure 68E:
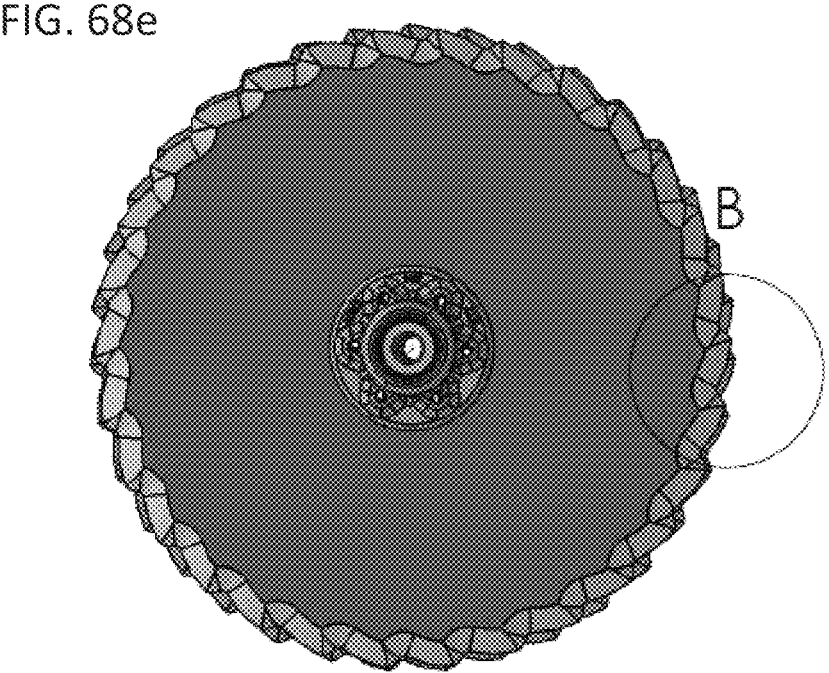
FIG. 68e is a top plan view of the blades of FIG. 68c.

FIG. 68a is a top plan view of a coulter blade exemplary of an embodiment of the present invention resulting in tooth interaction and shearing action on centered mounted applications. FIG. 68b is a cross-section view of the coulter blade of FIG. 68a taken along cross-section C. FIG. 68c is a top plan view of the coulter blade of FIG. 68a placed in line, in parallel relation, with another blade with inside tooth bevel or tooth mating for tooth shearing action on center mounted application. FIG. 68d is a cross-section view of the coulter blades of FIG. 68c taken along cross-section A. FIG. 68e is a top plan view of the blades of FIG. 68c with 2 different sizes of blades on centered axis utilizing off set tooth shearing action. FIG. 68f is a cross-section view of the coulter blades of FIG. 68e taken along cross-section B.

Figure 69A:
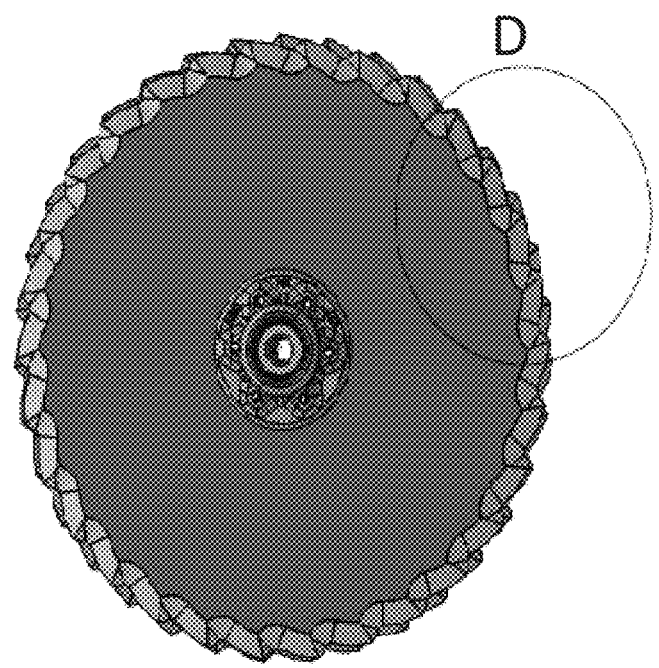
FIG. 69a is a top plan view of a coulter blade exemplary of an embodiment of the present invention.
Figure 69B:
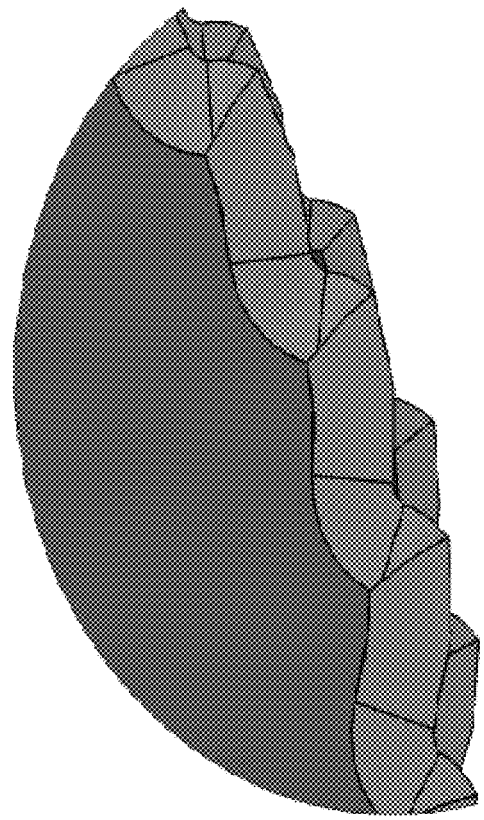
FIG. 69b is a cross-section view of the coulter blade of FIG. 69a taken along cross-section D.

FIG. 69a is a top plan view of a coulter blade exemplary of an embodiment of the present invention. FIG. 69b is a cross-section view of the coulter blade of FIG. 69a taken along cross-section D. STPS or Shallow fillet series blades are shown with same size diameter blades and tooth design utilizing tooth exchange and shearing action/in a centered application. Applications, for example, include Shallow planting, Sharp shale and or rocky conditions, highly erosive or abrasive soils and high-speed applications. STP has a 0.250 fillet depth and a longer tooth [0.250"-2" ]. STPS has a 0.110 fillet depth and a shorter tooth [0.250"-1" ], example [fillet depth will range as to application and blade diameter [0.050-0.2" ] or density of stubble or soil requiring movement or flow or lodging needs.

Figure 70A:
FIG. 70a is an image of an alignment configuration of a pair of coulter blades exemplary of an embodiment of the present invention.
Figure 70B:
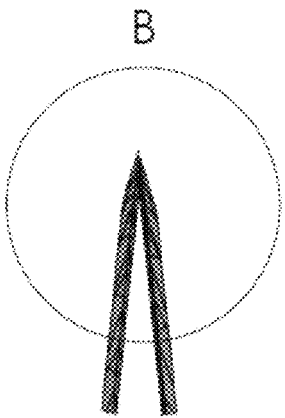
FIG. 70b is an image of an alignment configuration of a pair of coulter blades exemplary of an embodiment of the present invention.
Figure 70C:
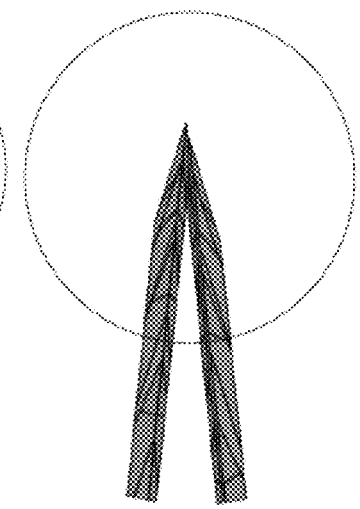
FIG. 70c is an image of an alignment configuration of a pair of coulter blades exemplary of an embodiment of the present invention.
Figure 70D:
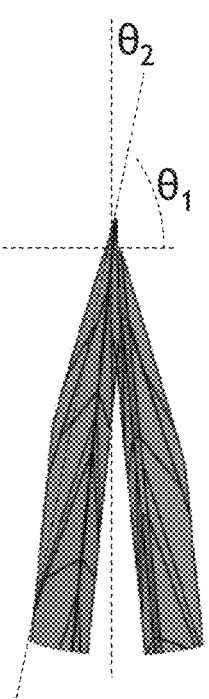
FIG. 70d is an image of an alignment configuration of a pair of coulter blades exemplary of an embodiment of the present invention.

FIG. 70a is an image of an alignment configuration of a pair of coulter blades exemplary of an embodiment of the present invention, 2 blade sizes on a centered axis. FIG. 70b is an image of an alignment configuration of a pair of coulter blades exemplary of an embodiment of the present invention. FIG. 70c is an image of an alignment configuration of a pair of coulter blades exemplary of an embodiment of the present invention. FIG. 70d is an image of an alignment configuration of a pair of coulter blades exemplary of an embodiment of the present invention. Mated or unmated tooth designs in centered or jointed blade applications create rotational and or non-rotational shearing or scissor actions during rotation. Shearing or scissor actions result from the subject blades multiple tooth structure during rotational tooth exchanges of multiple tooth designs and blade sizes. Multiple tooth designs, create increased and concentrated directed forced soil erosion in the fillet and inside tooth bevel, thereby maintaining tooth bevel and fillet length or self-sharpening actions for increased longevity. Fracturing and Flowing Soil into furrow and on top of placed seed increases seed to soil contact and early even emergence. Centered axis with 2 different blade sizes mating for seeders or standard series with inside counter bevel with off-set blade sizes in centered axis applications [2 different sized blades on a centered axis allowing the same theories of lessening blade outside linear diameter soil engagement and down pressure requirements]. For example, 2 blades 15" in diameter may require 20" or 10" per blade of linear soil engagement and down pressure requirement vs a lead blade using 10" of linear diameter of soil engagement and down pressure requirements, as the trailing blade only encounters a side force, as opposed to a down force requirement.

The degree of off-set between the two blades, blade #1 shown at 70301, blade #2 shown at 70302 is represented (see FIG. 70*d*) $\Theta_1=\theta_T-\theta_2$, wherein $\Theta_1$ represents the off-set angle between blades, 70301, 70302, $\theta_T$ represents the total angle from the centerline via blade 70301 (tooth tip) at the horizontal x-axis off-set from the vertical y-axis, and $\theta_2$ represents the off-set angle between blade 70302 (tooth tip) from the vertical y-axis. Accordingly, approximately: $\Theta_1=\theta_T-\theta_2$=offset $\Theta_1=90°-15°$; offset $\Theta_1=\sim 75°$.

Figure 71A:
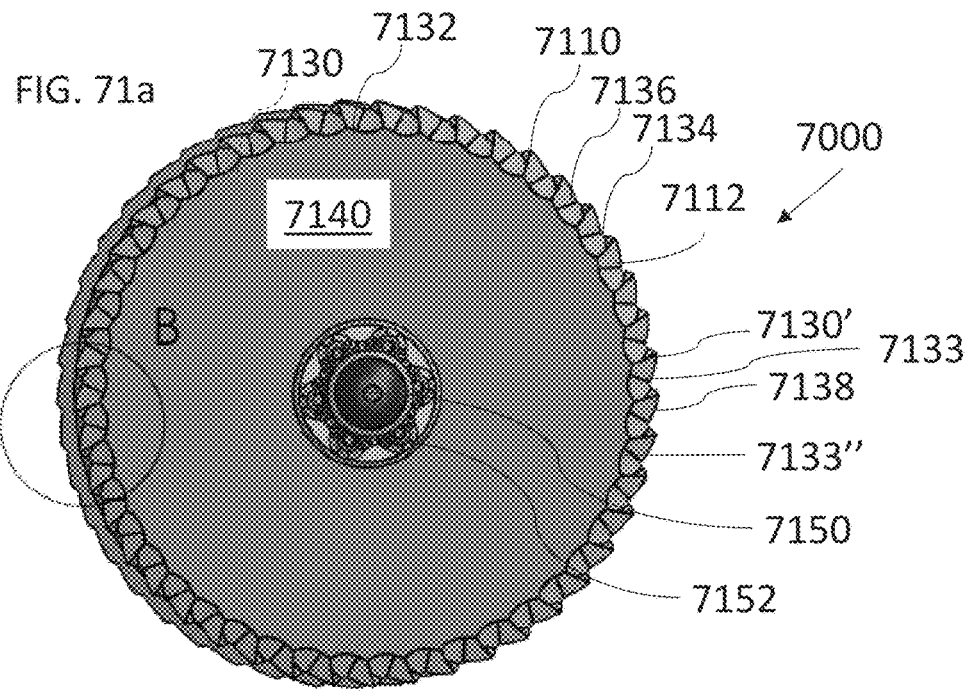
FIG. 71a is a top plan view of a first side of coulter blades exemplary of an embodiment of the present invention wherein two or more blades are mounted in an off-set blade configuration in an off set axis blade application.
Figure 71B:
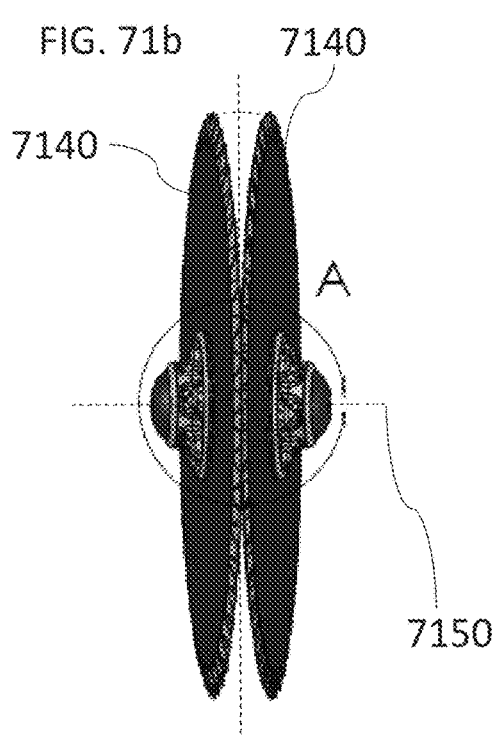
Figure 71C:
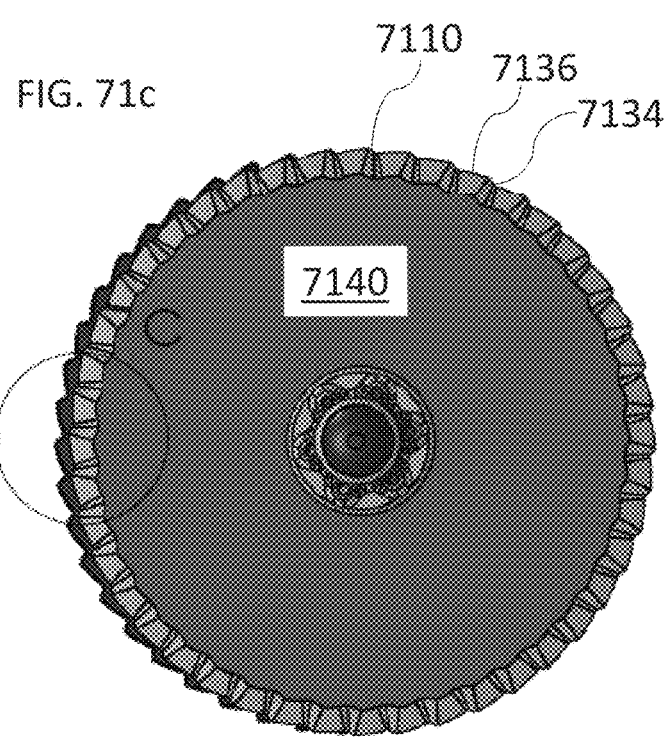
Figure 71D:
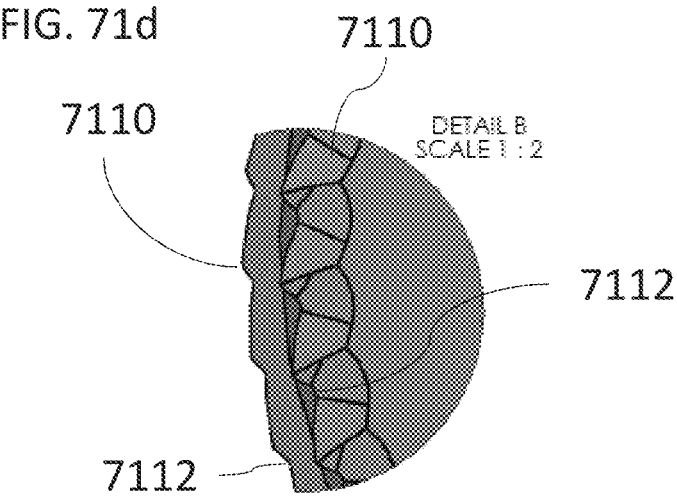
FIG. 71d is a cross-section view of the coulter blades of FIG. 71a taken along cross-section B.
Figure 71E:
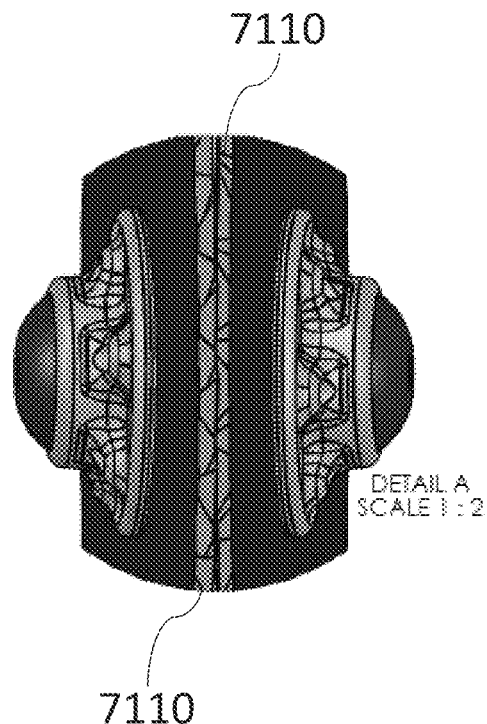
FIG. 71e is a cross-section view of the coulter blades of FIG. 71b taken along cross-section A.
Figure 71F:
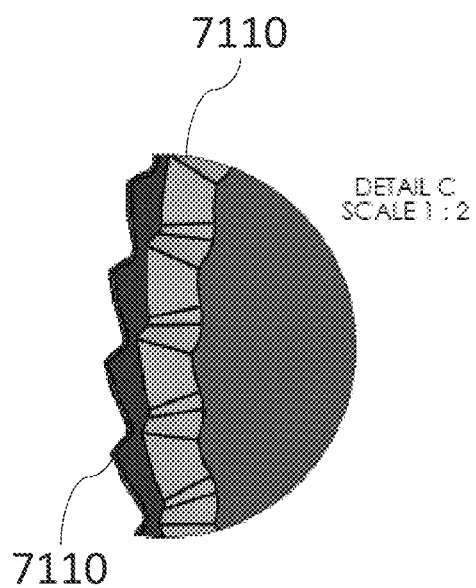
FIG. 71f is a cross-section view of the coulter blades of FIG. 71c taken along cross-section C.

FIG. 71*a* is a top plan view of a first side of coulter blades exemplary of an embodiment of the present invention wherein two or more blades are mounted in an off-set blade configuration in a centered axis blade application, shown generally at 7000. FIG. 71*b* is a side view of the off-set coulter blades of FIG. 71*a* (inside bevel blade mating).0 FIG. 71*c* is a top plan view of a second side of the coulter blades of FIG. 71*a*. FIG. 71*d* is a cross-section view of the coulter blades of FIG. 71*a* taken along cross-section B. FIG. 71*e* is a cross-section view of the coulter blades of FIG. 71*b* taken along cross-section A. FIG. 71*f* is a cross-section view of the coulter blades of FIG. 71*c* taken along cross-section C.

Referring to FIGS. 71*a*-71*f*, coulter blades 7000 include two or more blades mounted in an off-set blade configuration along a centered axis for use on agricultural implements, including for nonlimiting example, planters, drills and/or applications shallow planting, sharp gravel and shale rock conditions. Off-set as used herein generally refers to a consideration or amount that diminishes or balances the effect of a contrary one, the amount or distance by which something is out of line, place out of line, or counteract by having an opposing force or effect [i.e. blades counteract one another]. The line herein generally refers to a centered axis of the blades and is determined from the centered axis along the horizontal x-axis and vertical y-axis. Off-set between one or more blades, blades 1, 2, is determined by $\Theta_1=\theta_T-\theta_2$, wherein i represents the off-set angle between blades, $\theta_T$ represents the total angle from the centerline via blade 1 (tooth tip) at the horizontal x-axis off-set from the vertical y-axis, and $\theta_2$ represents the off-set angle between blade 2 (tooth tip) from the vertical y-axis.

Blades 7000 are each preferably sabre tooth and are appointed to receive a forged heavy-duty double roller bearing. Blades 7000 provide a revolutionary planting and seeding blade capable of running in challenging soils, residues and climate conditions. The furrow opener blades 7000 create optimal seeding conditions with agronomic geometric tooth design by: rotation and cutting action, decreased sidewall and furrow compaction, and granulation of moist soil into furrow by increased soil flow, achieving maximum soil to seed contact.

Blades 7000 are constructed as circular coulter blades 7140 having a plurality of teeth 7110 including a tooth cutting edge 7136 and tooth back 7134 with a fillet/gullet 7112 located therebetween. Each tooth 7110 includes lateral sides 7132, 7130 which may be sharpened in an alternating arrangement or as a continuous sharpened surface. Tooth 7110 is structured having a concentrated saber tooth shape as shown generally at 7138 extending from a tooth tip 7130' to an inside bevel 7133 and continuing preferably through at least a portion of fillet/gullet 7112, inside bevel mating for less friction and premature failure.

Inside bevel 7133 herein intersects the fillet/gullet 7112 to cutting edge 7136 interface of tooth 7110. Fillet/gullet 7112 is shown arched or curved and extends from cutting edge 7136 and continues to extend along at least a portion of the tooth back 7134. Fillet/gullet 7112 and cutting edge 7136 preferably include at least one inside bevel 7133 and together form a cupped bevel tooth construct provided for cutting, sizing, slicing, shredding, mowing and processing soil and stubble. The coulter blade 7140 is detachably mountable to an agricultural machine/device capable via a central axis point 7150 (herein shown via blade hub/bearing hub configuration 7152). Inside bevel 7133 creates a joint turn effort between agricultural assemblies (such as seeders) with the blade assemblies mounted thereon, as to a centered or aligned blade unit. One or more blades 7000 align at a center point or rotational axis. Another circumferential bevel 7133" is provided that runs along the inner circumference of the blade and teeth.

Fillet/gullet 7112 is preferably a U-shaped furrow bottom, versus a V or W shaped furrow bottom and, in combination with the inside bevel, prevents seed lodging and improves soil contact and flow. Fillet/gullet 7112 U-shape results in a negative concavity/negative out-side diameter concavity that has been found to increase soil flow, soil lifting, soil fracturing while lessening down pressure requirements. The inside bevel 7133 allows off-set blade 7000 configurations in a centered axis blade application and allows multiple sized blades arranged on a centered axis without or lessened pre-mature blade failure. It also off set blade and standard blade configurations in a centered axis blade application with standard OEM blade thickness, lessening down pressure requirements, lessening soil push in forward motion, sub soil, sidewall and surface compaction. Additionally, the inside bevel 7133 allows a lead and trailing blade configuration on a centered axis application utilizing different blade diameters.

Figure 72B:
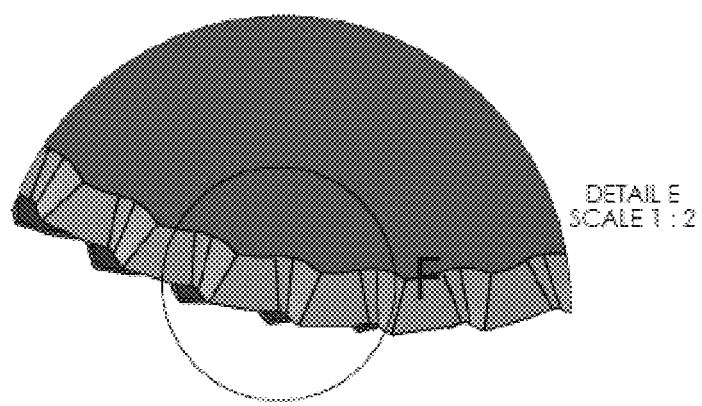
FIG. 72b is a cross-section view of the coulter blades of FIG. 72a taken along cross-section E.

FIG. 72*a* is a top plan view of coulter blades exemplary of an embodiment of the present invention wherein two or more blades are mounted in another example of an off-set blade configuration in a centered axis blade application. FIG. 72*b* is a cross-section view of the coulter blades of FIG. 72*a* taken along cross-section E. FIG. 72*c* is a cross-section view of the coulter blades of FIG. 72*d* taken along cross-section G. FIG. 72*d* is a cross-section view of the coulter blades of FIG. 72*a* taken along cross-section D. FIG. 72*e* is a cross-section view of the coulter blades of FIG. 72*b* taken along cross-section F. The blade configuration is discussed herein above and is similar in construct to that of FIG. 71*a*-71*n* this embodiment, with a slightly adjusted blade off-set. Off-set can be achieved through blades having different blade aperture/blade hub diameters and/through blade hub adjustment (see for example see FIGS. 71*a*-71*f* for different aperture/blade hub diameters and configurations). Opposing blade teeth act like a backing plate soil loading the opposing tooth.

FIG. 73*a* is an image of an alignment configuration of a pair of coulter blades exemplary of an embodiment of the present invention illustrating another embodiment of an off-set configuration. FIG. 73b is a cross-section view of the off-set of FIG. 73a taken along cross-section L. FIG. 73c is a cross-section view of the off-set of FIG. 73b taken along cross-section K. FIG. 73d is a cross-section view of the off-set of FIG. 73d taken along cross-section L. The degree of off-set between the two blades, blade #1 shown at 7301, blade #2 shown at 7302 is determined based on the hub mounting arrangement on the centerline axis point 7350 of the blades. The Off-set is represented by (see FIG. 73d) the equation $\Theta_1 = \theta_T \times -\theta_2$, wherein $\Theta_1$ represents the off-set angle between blades, 7301, 7302, $\theta_T$ represents the total angle from the centerline via blade 7301 (tooth tip) at the horizontal x-axis off-set from the vertical y-axis, and $\theta_2$ represents the off-set angle between blade 7302 (tooth tip) from the vertical y-axis. Accordingly, approximately: $\Theta_1 = \theta_T - \theta_2$ = offset $\theta_1 = 90° - 10°$; offset $\Theta_1 = \sim 80°$ (off set axis and blade inside bevel mating).

Figure 74A:
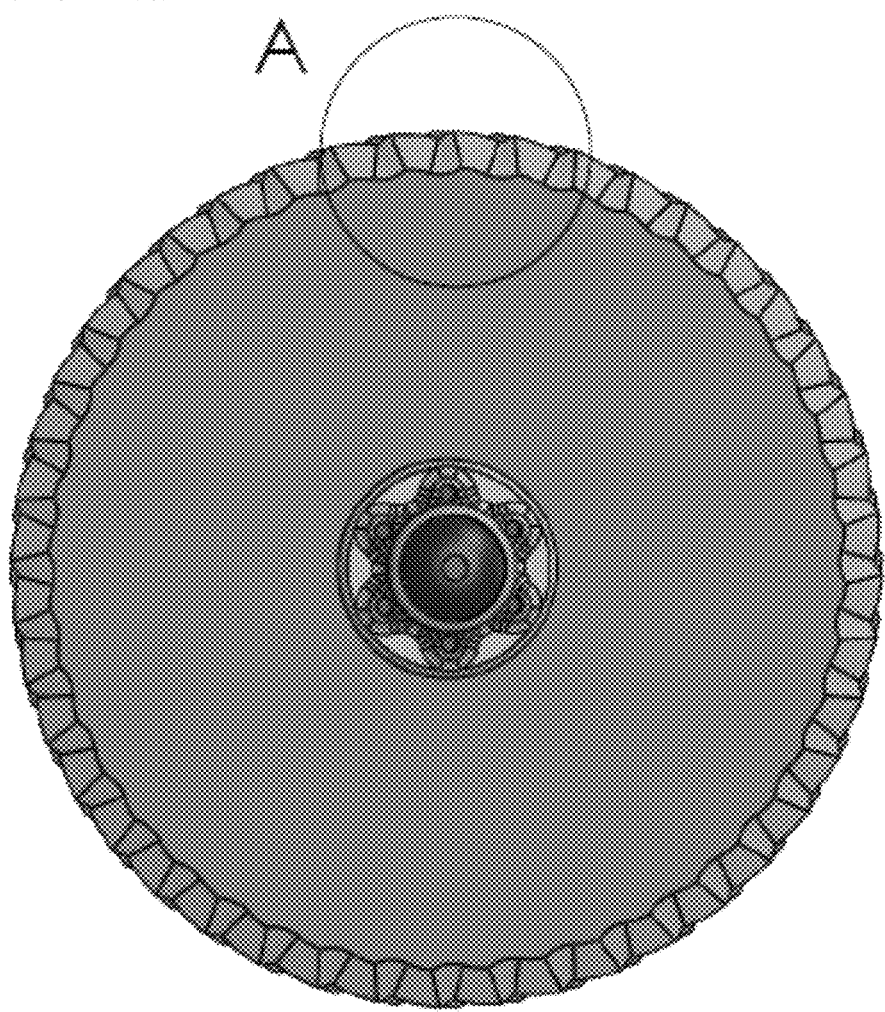
FIG. 74a is a top side plan view of coulter blades exemplary of an embodiment of the present invention.
Figure 74B:
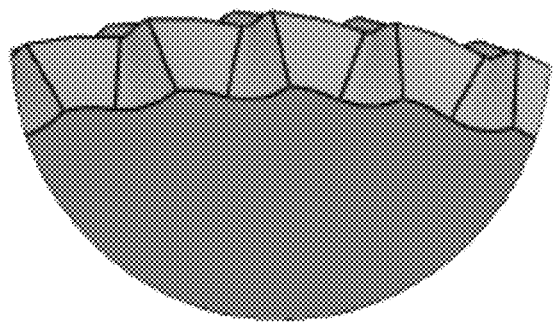
Figure 74C:
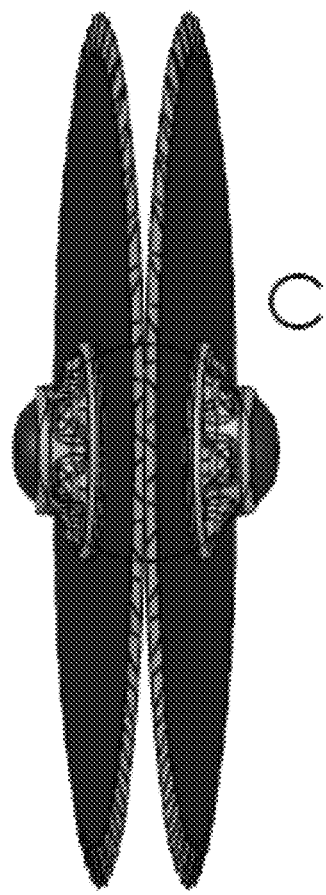
Figure 74D:
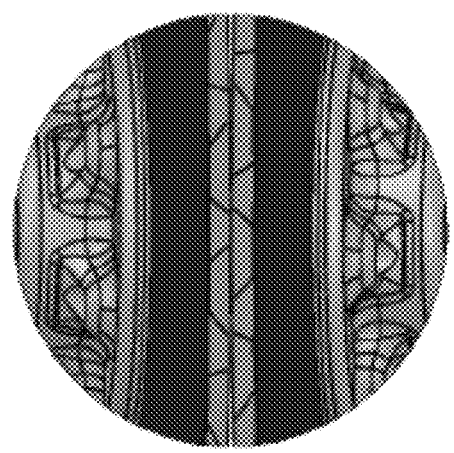
Figure 74E:
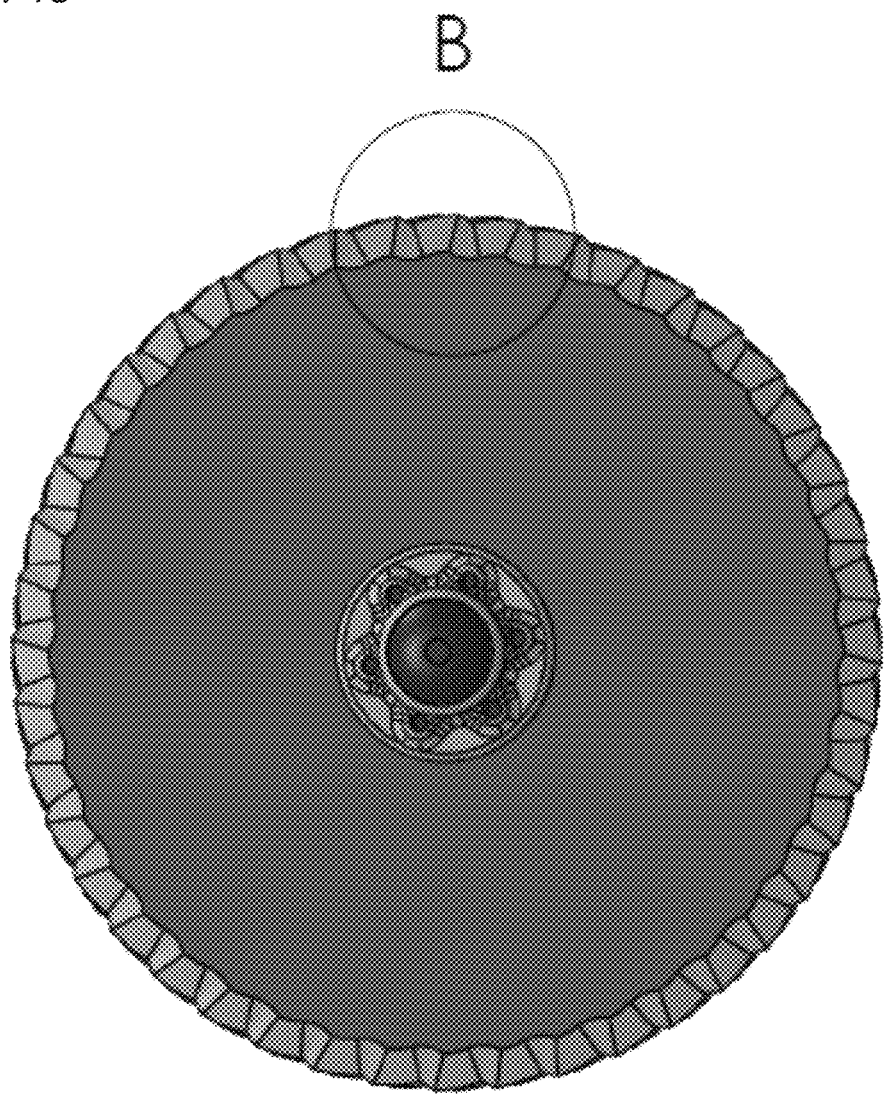
Figure 74F:
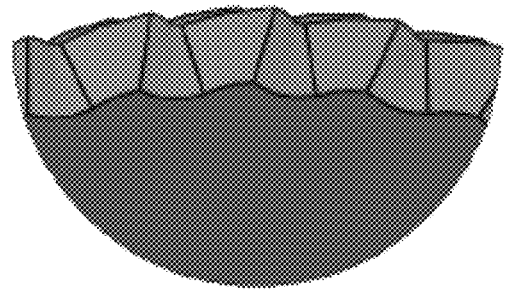

FIG. 74a is a top side plan view of coulter blades exemplary of an embodiment of the present invention. FIG. 74b is a cross-section view of the coulter blades of FIG. 74a taken along cross-section A. FIG. 74c is a top plan view of the coulter blade of FIG. 74a wherein two or more blades are mounted in an off-set blade configuration in a centered axis blade application. FIG. 74d is a cross-section view of the coulter blades of FIG. 74c taken along cross-section C. FIG. 74e is a bottom side plan view of the coulter blades. FIG. 74f is a cross-section view of the coulter blades of FIG. 74e taken along cross-section B. Off-set can be achieved through blades having different blade aperture/blade hub diameters and/through blade hub adjustment (see for example see FIGS. 71a-71f for different aperture/blade hub diameters and configurations). STPS or shallow fillet series same sized blade on centered axis and same tooth design exchanging teeth and shearing action during rotation (STPS or shallow tooth series showing same tooth design and blade size). STPS or Shallow fillet series inside bevel blade mating for shearing.

Figure 75A:
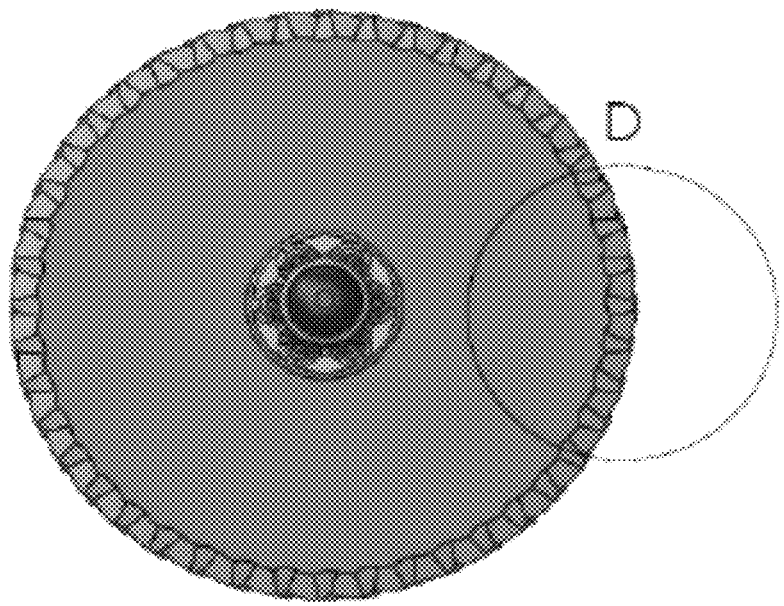
Figure 75B:
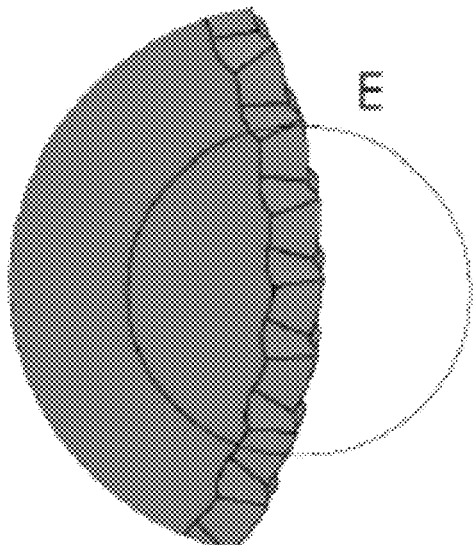
Figure 75C:
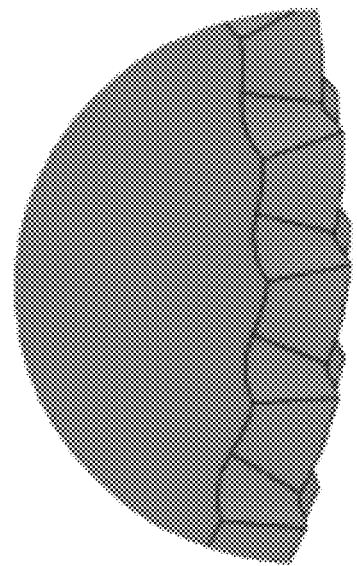

FIG. 75a is a top side plan view of coulter blades exemplary of an embodiment of the present invention. FIG. 75b is a cross-section view of the coulter blades (STPS or shallow tooth) of FIG. 75a taken along cross-section D. FIG. 75c is a cross-section view of the coulter blades of FIG. 75b taken along cross-section E. Off-set can be achieved through blades having different blade aperture/blade hub diameters and/through blade hub adjustment (see for example see FIGS. 71a-71f for different aperture/blade hub diameters and configurations).

FIG. 76a is an image of an alignment configuration of a pair of coulter blades exemplary of an embodiment of the present invention. FIG. 76b is a cross-section view of the off-set of FIG. 76a taken along cross-section F. FIG. 76c is a cross-section view of the off-set of FIG. 76b taken along cross-section G. FIG. 76d is a cross-section view of the off-set of FIG. 76c taken along cross-section H. The degree of off-set between the two blades, blade #1 shown at 76301, blade #2 shown at 76302 is represented (see FIG. 76d) $\Theta_1 = \theta_T - \theta_2$, wherein i represents the off-set angle between blades, 76301, 76302, $\theta_T$ represents the total angle from the centerline via blade 76301 (tooth tip) at the horizontal x-axis off-set from the vertical y-axis, and $\theta_2$ represents the off-set angle between blade 76302 (tooth tip) from the vertical y-axis. Accordingly, approximately: $\Theta_1 = \theta_T - \theta_2$ = offset $\Theta_1 = 90° - 0°$; offset $\theta_1 = \sim 90°$.

FIG. 77a is a top plan view of coulter blades exemplary of an embodiment of the present invention wherein two or more blades are mounted in an off-set blade configuration in a centered axis blade application. FIG. 77b is a cross-section view of the coulter blades of FIG. 72a taken along cross-section J. Off-set can be achieved through blades having different blade aperture/blade hub diameters and/through blade hub adjustment (see for example see FIGS. 71a-71f for different aperture/blade hub diameters and configurations). In this embodiment, both lateral sides of the blade include a bevel or sharpened edge, including the tooth configuration as discussed as well as the opposite lateral side of the blade including a beveled or sharpened edge. The blade includes an inside blade mating bevel.

FIG. 78a is an image of an alignment configuration of a pair of coulter blades exemplary of an embodiment of the present invention. FIG. 78b is a cross-section view of FIG. 78a taken along cross-section B. FIG. 78c is a cross-section view of the centered blades of FIG. 78b taken along cross-section C. FIG. 78d is a cross-section view of FIG. 78c taken along cross-section D. The degree between the two blades, blade #1 shown at 78301, blade #2 shown at 78302 is represented (see FIG. 78d) $\Theta_1 = \theta_T - \theta_2$, wherein $\Theta_1$ represents the centered/0 off set angle between blades, 78301, 78302, $\theta_T$ represents the total angle from the centerline via blade 78301 (tooth tip) at the horizontal x-axis off-set from the vertical y-axis, and $\theta_2$ represents the off-set angle between blade 78302 (tooth tip) from the vertical y-axis. Accordingly, approximately: $\Theta_1 = \theta_T - \theta_2$ = offset $\Theta_1 = 90° - 0°$; offset $\Theta_1 = -90°$. 0° offset=centered blade arrangement, and/or same size blades and/or same angled blades. Seeder or standard series with inside counter bevel with off-set blade sizes in centered axis applications [2 different sized blades on a centered axis allowing the same theories of lessening blade outside linear diameter, soil engagement and down pressure requirements]. For example, 2 blades 15" in diameter may require 20" or 10" per blade of linear soil engagement and down pressure requirement vs a lead blade using 10" of linear diameter of soil engagement and down pressure requirements, as the trailing blade only has a side force vs a down force requirement.

One goal of embodiments disclosed herein may include a system offering the least amount of soil contact, the least amount of soil engagement area and the least amount force over time. With use of rotation speed and percentage of rotation versus push slide, embodiments herein may keep the coulter blade 140 engaged within the soil and successfully cutting surface residue.

Embodiments herein may concentrate friction and force in forward motion using multiple tooth designs and angles to cut the substantial GMO residue and produce the desirable "U" shaped furrow. As the disclosed coulter blades remain within the soil, they flow and lift soil vs. push and compact. The disclosed embodiments may maximize soil-moisture capillary action and nutrient biological and chemical equilibrium to improve and maintain soil structure. The Sabre Tooth Planter (STP) blade disclosed herein may cut, turn, rotate, granulate, and flow, moist granulated soil around each seed within the furrow, eliminating hair pinning, slide, smear, side wall, surface, and sub furrow compaction.

The STP blade may cut a "U" shaped furrow preventing seed lodging while flowing moist granulated soil on top of the placed seed. The granulated soil may create excellent soil to seed contact enhancing early root development, creating a root zone for deep vertical elongated roots while reducing rootless corn syndrome, uneven emergence, reducing planter device requirements and cost, reducing planter challenges.

CONCLUSION

Specific blocks, sections, devices, functions, processes and modules may have been set forth. However, a skilled technologist will realize that there are many ways to partition the system and that there are many parts, components, processes, modules or functions that may be substituted for those listed above.

While the above-detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive, and the scope of the invention is, therefore, indicated by the appended claims rather than by the foregoing description. All changes which come within the meaning and range of equivalency of the claims are to be embraced within their scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein, and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A coulter blade for altering soil and surface stubble, comprising:
   a discoidal coulter blade having a blade circumference forming a blade outer edge, lateral sides and a blade center point and being configured for detachably mounting to an implement;
   a plurality of teeth configured proximal to and integral with the blade circumference, each one of the plurality of teeth having a rounded gullet and an intersecting bevel adjacent thereto, each one of the plurality of teeth, gullet and bevel having a cutting edge and a back edge; extending outward toward the blade circumference to a point so that each one of the plurality of teeth forms a cupped bevel tooth for piercing the soil and rotating the discoidal coulter blade, the back edge longitudinally opposite the cutting edge, the cutting edge extending away from the blade circumference continuing to the adjacent gullet, the back edge extending away from the blade circumference continuing to an adjacent gullet, the cutting edge configured to cut the surface stubble and the soil, the back edge configured for driving the discoidal coulter blade parallel to the surface as the soil acts on the back edge, the cutting edge continuing through the gullet, the gullet being rounded to continue the cut begun by the cutting edge;
   one or more of the lateral sides having said bevel sharpened at a first bevel angle, the bevel being an inside bevel located at a location between the blade center point and the blade outer edge;
   the cutting edge having a curved shape extending from a tooth tip into the gullet and along at least a portion of the back edge;
   a linear tooth area and a blade circumference area, said linear tooth area being longer than said blade circumference area to increase shearing and cutting action per revolution of said coulter blade blade versus linear distance traveled;
   whereby said discoidal coulter blade rotationally interacts with the soil to translate in a forward direction.

2. The coulter blade for altering soil and surface stubble of claim 1, wherein the bevel is an inside bevel that extends along the cutting edge through the gullet.

3. The coulter blade for altering soil and surface stubble of claim 1, wherein the bevel is an inside bevel located proximal to the outer edge of the coulter blade.

4. The coulter blade for altering soil and surface stubble of claim 1, wherein there are at least two bevels comprising the first bevel and a second inner bevel.

5. The coulter blade for altering soil and surface stubble of claim 4, wherein first bevel has a first bevel depth or bevel length and the second inner bevel has a second bevel depth or second bevel length, wherein the first bevel depth or length is greater than the second bevel length or depth.

6. The coulter blade for altering soil and surface stubble of claim 5, wherein the first bevel depth or length is at least 2 times larger than the second bevel length or depth.

7. The coulter blade for altering soil and surface stubble of claim 5, wherein the first bevel depth or length is at least 3 times larger than the second bevel length or depth.

8. The coulter blade for altering soil and surface stubble of claim 1, wherein there are at least three bevels.

9. The coulter blade for altering soil and surface stubble of claim 8 comprising the first bevel, a second inner bevel and a backside bevel.

10. The coulter blade for altering soil and surface stubble of claim 1, wherein the gullet has a U-shape.

11. The coulter blade for altering soil and surface stubble of claim 1, wherein the gullet has a V-shape.

12. The coulter blade for altering soil and surface stubble of claim 1, wherein the bevel is an inside bevel that extends from the cutting edge of the teeth through the gullet.

13. The coulter blade for altering soil and surface stubble of claim 1, wherein the inside bevel extends from the cutting edge of the teeth, through the gullet and through at least a portion of the back edge of the teeth.

14. The coulter blade for altering soil and surface stubble of claim 1, wherein a first discoidal coulter blade is mated with a second discoidal coulter blade at a blade mating point, each of the first and second discoidal coulter blades is mounted to the implement.

15. The coulter blade for altering soil and surface stubble of claim 14, wherein the circumference of the first discoidal coulter blade is not equal to the circumference of the second discoidal coulter blade.

16. The coulter blade for altering soil and surface stubble of claim 14, wherein the circumference of the first discoidal coulter blade is equal to the circumference of the second discoidal coulter blade.

17. The coulter blade for altering soil and surface stubble of claim 14, wherein the first and second discoidal coulter blades are arranged on a centered axis, as defined by an imaginary line centered between said first and second discoidal coulter blades, to result in an off-set.

18. The coulter blade for altering soil and surface stubble of claim 17, wherein the off-set is represented by $\Theta_1 = \theta_T - \theta_2$, wherein $\Theta_1$ represents an off-set angle between blades 1 and 2, $\theta_T$ represents a total angle from the centerline of the blades at a horizontal x-axis off-set from a vertical y-axis, and $\theta_2$ represents a blade 2 off-set angle between blade 2 from the vertical y-axis.

19. The coulter blade for altering soil and surface stubble of claim 17, wherein the off-set results from angling the coulter blades along the centerline.

20. The coulter blade for altering soil and surface stubble of claim 17, wherein the off-set results from blades having different unequal diameters from one another.

21. The coulter blade for altering soil and surface stubble of claim 1, wherein the discoidal coulter blade is further configured with a plurality of insert openings and mountable inserts.

22. The coulter blade for altering soil and surface stubble of claim 1, wherein the discoidal coulter blade has a concave shape.

23. The coulter blade for altering soil and surface stubble of claim 1, wherein the discoidal coulter blade has a substantially flat shape.

24. The coulter blade for altering soil and surface stubble of claim 1, wherein the discoidal coulter blade has positive concavity.

25. The coulter blade for altering soil and surface stubble of claim 1, wherein the discoidal coulter blade has negative concavity.

26. A method for altering surface stubble and soil aeration, comprising:
- embedding a discoidal coulter blade within the soil, the discoidal coulter blade having a blade circumference forming a blade outer edge, lateral sides and a blade center point and being configured for detachably mounting to an implement;
- translating the discoidal coulter blade through the soil at a depth via the implement;
- translating the soil as the discoidal coulter blade translates through the soil;
- driving the discoidal coulter blade rotationally parallel to the blade circumference as the soil acts on a back edge of a plurality of teeth configured proximal to and integral with the blade circumference, each one of the plurality of teeth having a rounded gullet and an intersecting bevel adjacent thereto, each one of the plurality of teeth, gullet and bevel having a cutting edge and a back edge; extending outward toward the blade circumference to a point so that each one of the plurality of teeth forms a cupped bevel tooth for piercing the soil and rotating the discoidal coulter blade, the back edge longitudinally opposite the cutting edge, the cutting edge extending away from the blade circumference continuing to the adjacent gullet, the back edge extending away from the blade circumference continuing to an adjacent gullet, the cutting edge configured to cut the surface stubble and the soil, the back edge configured for driving the discoidal coulter blade as the soil acts on the back edge, the cutting edge continuing through the gullet, the cutting edge having a curved shape extending from a tooth tip into the gullet and along at least a portion of the back edge, the gullet being rounded to continue the cut begun by the cutting edge;
- driving the discoidal blade rotationally parallel to the blade circumference as the soil acts on one or more of the lateral sides having said bevel sharpened at a first bevel angle, the bevel being an inside bevel located at a location between the blade center point and the blade outer edge;
- cutting the surface stubble and the soil as the soil acts on the cutting edge of the teeth and the inside bevel;
- providing said coulter blade with a linear tooth area and a blade circumference area, said linear tooth area being longer than said blade circumference area to increase shearing and cutting action per revolution of said coulter blade versus linear distance traveled;
- whereby said discoidal coulter blade rotationally interacts with the soil to translate in a forward direction.

27. The method of claim 26, wherein a first discoidal coulter blade is mated with a second discoidal coulter blade at a blade mating point, each of the first and second discoidal coulter blades is mounted to the implement.

28. The method of claim 27, wherein the circumference of the first discoidal coulter blade is dissimilar to the circumference of the second discoidal coulter blade.

29. The method of claim 27, wherein the circumference of the first discoidal coulter blade is equal to the circumference of the second discoidal coulter blade.

30. The method of claim 27, wherein the first and second discoidal coulter blades are arranged on a centered axis, as defined by an imaginary line centered between said first and second discoidal coulter blades, to result in an off-set.

31. The method of claim 30, wherein the off-set is represented by $\Theta_1 = \theta_T - \theta_2$, wherein $\Theta_1$ represents an off-set angle between blades 1 and 2, $\theta_T$ represents a total angle from the centerline of the blades at a horizontal x-axis off-set from a vertical y-axis, and $\theta_2$ represents a blade 2 off-set angle between blade 2 from the vertical y-axis.

32. The method of claim 30, wherein the off-set results from angling the coulter blades along the centerline.

33. The method of claim 30, wherein the off-set results from blades having different unequal diameters from one another.

34. The method of claim 30, wherein there are at least two bevels comprising the first bevel and a second inner bevel, the first bevel having a first bevel depth or bevel length and the second inner bevel having a second bevel depth or second bevel length, wherein the first bevel depth or length is greater than the second bevel length or depth.

35. The method of claim 34, wherein the coulter blade maximizes soil tooth lodging creating soil flow and specific soil particle size and granulation to create a soil to soil contact lessening blade wear, extending blade longevity and bevel and fillet length.

36. The method of claim 34, wherein the soil particle placement in the fillet and bevels flow soil in opposing blade engagement directions utilizing more soil area in two directions lessoning soil area or volume, wherein applied soil pressure is thereby lessened through continued flow of soil from the cutting edge away from the blade, and in a wedged flow or V flow, outward flow and upward motion, whereby down pressure requirements are lessened.

* * * * *